United States Patent
Kawasaki et al.

(10) Patent No.: US 11,723,100 B2
(45) Date of Patent: Aug. 8, 2023

(54) USER EQUIPMENT, COMMUNICATION CONTROL METHOD OF USER EQUIPMENT, CORE NETWORK DEVICE, COMMUNICATION CONTROL METHOD OF CORE NETWORK, SMF, AND COMMUNICATION CONTROL METHOD OF SMF

(71) Applicants: SHARP KABUSHIKI KAISHA, Sakai (JP); FG Innovation Company Limited, Tuen Mun (HK)

(72) Inventors: Yudai Kawasaki, Sakai (JP); Yasuo Sugawara, Sakai (JP); Masafumi Aramoto, Sakai (JP); Tsuyoshi Takakura, Sakai (JP)

(73) Assignees: SHARP KABUSHIKI KAISHA, Sakai (JP); FG Innovation Company Limited, Tuen Mun (HK)

( * ) Notice: Subject to any disclaimer, the term of this patent is extended or adjusted under 35 U.S.C. 154(b) by 38 days.

(21) Appl. No.: 16/624,295

(22) PCT Filed: Jun. 19, 2018

(86) PCT No.: PCT/JP2018/023203
§ 371 (c)(1),
(2) Date: Dec. 19, 2019

(87) PCT Pub. No.: WO2018/235795
PCT Pub. Date: Dec. 27, 2018

(65) Prior Publication Data
US 2020/0120738 A1    Apr. 16, 2020

(30) Foreign Application Priority Data
Jun. 19, 2017   (JP) .................... 2017-119517

(51) Int. Cl.
*H04W 76/38* (2018.01)
*H04W 12/72* (2021.01)
(Continued)

(52) U.S. Cl.
CPC ............ *H04W 76/18* (2018.02); *H04W 80/10* (2013.01)

(58) Field of Classification Search
CPC ....... H04W 76/38; H04W 88/06; H04W 8/08; H04W 76/18; H04W 84/042;
(Continued)

(56) References Cited

U.S. PATENT DOCUMENTS

2017/0086118 A1    3/2017  Vrzic
2017/0288972 A1*  10/2017  Li ...................... H04W 40/205
(Continued)

FOREIGN PATENT DOCUMENTS

AU    2018289655 B2    10/2022
EP       3481109 A1     5/2019
(Continued)

OTHER PUBLICATIONS

"3rd Generation Partnership Project;Technical Specification Group Services and System Aspects;System Architecture for the 5G System;Stage 2(Release 15)" 3GPP TS 23.501 V1.0.0 (Jun. 2017).
(Continued)

*Primary Examiner* — Khaled M Kassim
*Assistant Examiner* — Jason A Harley
(74) *Attorney, Agent, or Firm* — ScienBiziP, P.C.

(57) ABSTRACT

A terminal apparatus or a device in a core network exchanges capability information for each function in a registration procedure or a PDU session establishment procedure, and in user data communication additional information is added into an uplink packet to implement terminal apparatus-initiated RQoS control, and additional informa-
(Continued)

tion is added into a downlink packet to implement network device-initiated RQoS control. A dedicated control message and information for an authentication and/or authorization function by a DN are defined to implement the authentication and/or authorization function by the DN. Furthermore, the terminal apparatus and the device in the core network have a timer or a control process for each network slice to implement a management process such as congestion management for each network slice. This provides a communication control method in order to implement the terminal apparatus-initiated or network-initiated RQoS control, implement the authentication and/or authorization function by the DN, and implement the management process such as congestion management for each network slice.

2 Claims, 12 Drawing Sheets

(51) Int. Cl.
| | | |
|---|---|---|
| *H04M 15/00* | (2006.01) | |
| *H04W 52/42* | (2009.01) | |
| *H04W 48/18* | (2009.01) | |
| *H04W 12/06* | (2021.01) | |
| *H04L 65/1066* | (2022.01) | |
| *H04L 67/63* | (2022.01) | |
| *H04W 76/18* | (2018.01) | |
| *H04W 80/10* | (2009.01) | |

(58) Field of Classification Search
CPC ... H04W 76/10; H04W 76/34; H04W 60/005; H04W 8/02; H04M 15/8228; H04M 15/8038; H04L 47/28
USPC .................................................. 370/329, 230
See application file for complete search history.

(56) References Cited

U.S. PATENT DOCUMENTS

| | | | | |
|---|---|---|---|---|
| 2017/0303259 | A1* | 10/2017 | Lee | H04W 28/16 |
| 2018/0198867 | A1* | 7/2018 | Dao | H04W 36/0033 |
| 2018/0199398 | A1* | 7/2018 | Dao | H04L 41/5019 |
| 2018/0227872 | A1* | 8/2018 | Li | H04W 48/16 |
| 2018/0227873 | A1* | 8/2018 | Vrzic | H04W 76/27 |
| 2018/0234876 | A1* | 8/2018 | Jheng | H04W 28/26 |
| 2018/0324877 | A1* | 11/2018 | Tiwari | H04W 76/18 |
| 2018/0367980 | A1* | 12/2018 | Lee | H04W 48/16 |
| 2019/0223093 | A1* | 7/2019 | Watfa | H04W 36/24 |
| 2020/0037386 | A1* | 1/2020 | Park | H04W 80/10 |
| 2020/0178196 | A1* | 6/2020 | Wang | H04W 48/18 |

FOREIGN PATENT DOCUMENTS

| | | |
|---|---|---|
| EP | 3641424 A1 | 4/2020 |
| WO | 2018034924 A1 | 2/2018 |

OTHER PUBLICATIONS

"3rd Generation Partnership Project;Technical Specification Group Services and System Aspects;Procedures for the 5G System;Stage 2(Release 15)" 3GPP TS 23.502 V0.4.0 (May 2017).
Qualcomm Incorporated,"TS 23.502: handling of PDU sessions at slice unavailability" SA WG2 Meeting #121; S2-173106; May 15-19, 2017, Hangzhou, P.R. China.
LG Electronics,"Congestion control for session management (SM)" SA WG2 Meeting #116bis; S2-164548; Aug. 29-Sep. 2, 2016, Sanya, China.
Qualcomm Incorporated: "TS 23.502: handling of PDU sessions at slice unavailability", S2-173106, SA WG2 Meeting #121, May 15-19, 2017, Hangzhou, P.R. China.
LG Electronics: "Congestion control for session management (SM)", S2-164548, SA WG2 Meeting #116bis, Aug. 29-Sep. 2, 2016, Sanya, China.
NTT DOCOMO: "Update of Network Slicing Solution 1.3", S2-165131, SA WG2 Meeting #116-BIS, Aug. 29-Sep. 2, 2016, Sanya, CN.
Huawei, HiSilicon: "UE Slice Association/Overload control Procedure", S2-162981, 3GPP TSG SA WG2 Meeting #115, May 23-27, 2016, Nanjing, China.
Ericsson: "5G SM—PDU session establishment authentication and authorization procedure", C1-172634, 3GPP TSG-CT WG1 Meeting #104, Zhangjiajie, P.R of China, May 15-19, 2017.
Qualcomm Incorporated, TS 23.502: handling of PDU sessions at slice unavailability, 3GPP TSG SA WG2 Meeting #121 S2-173106, Internet URL:http://www.3gpp.org/ftp/tsg_saA/WG2_Ar, May 15, 2017, pp. 4-5.

* cited by examiner

USER EQUIPMENT, COMMUNICATION CONTROL METHOD OF USER EQUIPMENT, CORE NETWORK DEVICE, COMMUNICATION CONTROL METHOD OF CORE NETWORK, SMF, AND COMMUNICATION CONTROL METHOD OF SMF

TECHNICAL FIELD

The present invention relates to a user equipment and the like. This application claims priority based on JP 2017-119517 filed on Jun. 19, 2017 in Japan, the contents of which are incorporated herein in its entirety by reference.

BACKGROUND ART

The 3rd Generation Partnership Project (3GPP), which undertakes activities for standardizing recent mobile communication systems, discusses System Architecture Evolution (SAE), which is system architecture of Long Term Evolution (LTE). The 3GPP is in the process of creating specifications for the Evolved Packet System (EPS) as a communication system for realizing an all-Internet Protocol (IP) architecture. Note that a core network constituting the EPS is called an Evolved Packet Core (EPC).

In recent years, the 3GPP also has been discussing the next generation communication technology or system architecture of the 5th Generation (5G) mobile communication system that is the next generation mobile communication system, and in particular, is in the process of creating specifications for the 5G System (5GS) as a system for realizing the 5G mobile communication system (see NPL 1 and NPL 2). In the 5GS, technical problems for connecting various terminals to a cellular network are extracted to create specifications for solutions.

For example, requirement conditions include optimization and diversification of a communication procedure for supporting a continual mobile communication service depending on a terminal supporting various access networks, optimization of a system architecture suitable for the optimization and diversification of the communication procedure, and the like.

CITATION LIST

Non Patent Literature

NPL 1: 3GPP TS 23.501 v1.0.0; 3rd Generation Partnership Project; Technical Specification Group Services and System Aspects; System Architecture for the 5G System; Stage 2 (Release 15)

NPL 2: 3GPP TS 23.502 v0.4.0; 3rd Generation Partnership Project; Technical Specification Group Services and System Aspects; Procedures for the 5G System; Stage 2 (Release 15)

SUMMARY OF INVENTION

Technical Problem

In the 5GS, Reflective Quality of Service (RQoS), which provides special QoS for certain user data communications, is also discussed in addition to the mechanism to provide quality of service for user data communication, such as the QoS in the 4G. Furthermore, as a new function, an authentication and/or authorization function by a Data Network for a PDU session, and a Network Slice are also discussed (see NPL 1 and NPL 2).

However, while some of mechanisms for controlling an RQoS in a network-initiated manner are defined in such a special RQoS as described above, the details of the mechanism for controlling an RQoS in a network-initiated manner have not clearly defined, and mechanisms for controlling an RQoS in a terminal apparatus-initiated manner have not yet been defined. Additionally, in the authentication and/or authorization function by the data network, although a summary of functions is defined, the details of the authentication and/or authorization function by the data network also have not been clearly defined such as contents of messages transmitted and/or received by a terminal apparatus devices in a core network, or devices in a data network to implement the authentication and/or authorization function. Furthermore, in the network slice, while it is defined that the terminal apparatus is connectible to multiple network slices, a management process performed in a case that the terminal apparatus connects to multiple network slices has not been clearly defined.

The present invention has been made in light of the foregoing, and has an object to provide a mechanism and communication control method for terminal apparatus-initiated or network-initiated RQoS control, provide a mechanism and communication control method for implementing an authentication and/or authorization function by a data network, and provide a mechanism and communication control method for implementing a management process such as congestion management for each network slice.

Solution to Problem

A user equipment of the present invention includes: a transmission and/or reception unit configured to receive a PDU session establishment reject message including at least one of first to fourth identification information, in a registration procedure or a PDU session establishment procedure for a core network; and a controller configured to determine whether to reestablish a PDU session, based on at least one of the first to fourth identification information, in the registration procedure or the PDU session establishment procedure for the core network, wherein the first identification information is information indicating that a request to establish a PDU session belonging to a network slice is rejected, the second identification information is information indicating a cause of rejection of the request to establish the PDU session, the third identification information is information indicating a value of a backoff timer that manages a session management behavior of the user equipment, and the fourth identification information is information indicating the network slice to which the PDU session belongs, the request to establish the PDU session being rejected.

A communication control method of a user equipment of the present invention includes: receiving, by the user equipment, a PDU session establishment reject message including at least one of first to fourth identification information, in a registration procedure or a PDU session establishment procedure for a core network, wherein the first identification information is information indicating that a request to establish a PDU session belonging to a network slice is rejected, the second identification information is information indicating a cause of rejection of the request to establish the PDU session, the third identification information is information indicating a value of a backoff timer that manages a session management behavior of the user equipment, and the fourth identification information is information indicating the network slice to which the PDU session belongs, the request to establish the PDU session being rejected.

A core network device of the present invention includes: a transmission and/or reception unit configured to transmit a PDU session establishment reject message including at least one of first to fourth identification information, in a registration procedure or a PDU session establishment procedure for a core network, wherein the first identification information is information indicating that a request to establish a PDU session belonging to a network slice is rejected, the second identification information is information indicating a cause of rejection of the request to establish the PDU session, the third identification information is information indicating a value of a backoff timer that manages a session management behavior of a user equipment, and the fourth identification information is information indicating the network slice to which the PDU session belongs, the request to establish the PDU session being rejected.

A communication control method of a core network device of the present invention includes: transmitting a PDU session establishment reject message including at least one of first to fourth identification information, in a registration procedure or a PDU session establishment procedure for a core network, wherein the first identification information is information indicating that a request to establish a PDU session belonging to a network slice is rejected, the second identification information is information indicating a cause of rejection of the request to establish the PDU session, the third identification information is information indicating a value of a backoff timer that manages a session management behavior of a user equipment, and the fourth identification information is information indicating the network slice to which the PDU session belongs, the request to establish the PDU session being rejected.

An SMF of the present invention includes: a transmission and/or reception unit configured to transmit a PDU session establishment reject message including at least one of first to fourth identification information, in a registration procedure or a PDU session establishment procedure for a core network, wherein the first identification information is information indicating that a request to establish a PDU session belonging to a network slice is rejected, the second identification information is information indicating a cause of rejection of the request to establish the PDU session, the third identification information is information indicating a value of a backoff timer that manages a session management behavior of a user equipment, and the fourth identification information is information indicating the network slice to which the PDU session belongs, the request to establish the PDU session being rejected.

A communication control method of an SMF of the present invention includes: transmitting a PDU session establishment reject message including at least one of first to fourth identification information, in a registration procedure or a PDU session establishment procedure for a core network, wherein the first identification information is information indicating that a request to establish a PDU session belonging to a network slice is rejected, the second identification information is information indicating a cause of rejection of the request to establish the PDU session, the third identification information is information indicating a value of a backoff timer that manages a session management behavior of a user equipment, and the fourth identification information is information indicating the network slice to which the PDU session belongs, the request to establish the PDU session being rejected.

Advantageous Effects of Invention

According to the present invention, the terminal apparatus and the device in the core network constituting the 5GS can control the RQoS in a terminal apparatus-initiated manner or in a network-initiated manner. The terminal apparatus, the device in the core network, and the device in the data network constituting the 5GS may implement the authentication and/or authorization function by the data network. Furthermore, the terminal apparatus and the device in the core network constituting the 5GS may perform the management process such as the congestion management for each network slice.

DESCRIPTION OF EMBODIMENTS

A preferred embodiment for carrying out the present invention will be described below with reference to the drawings. Note that as an example, the present embodiment describes an embodiment of a mobile communication system to which the present invention is applied.

1. Embodiment 1.1. System Overview

Figure 1:
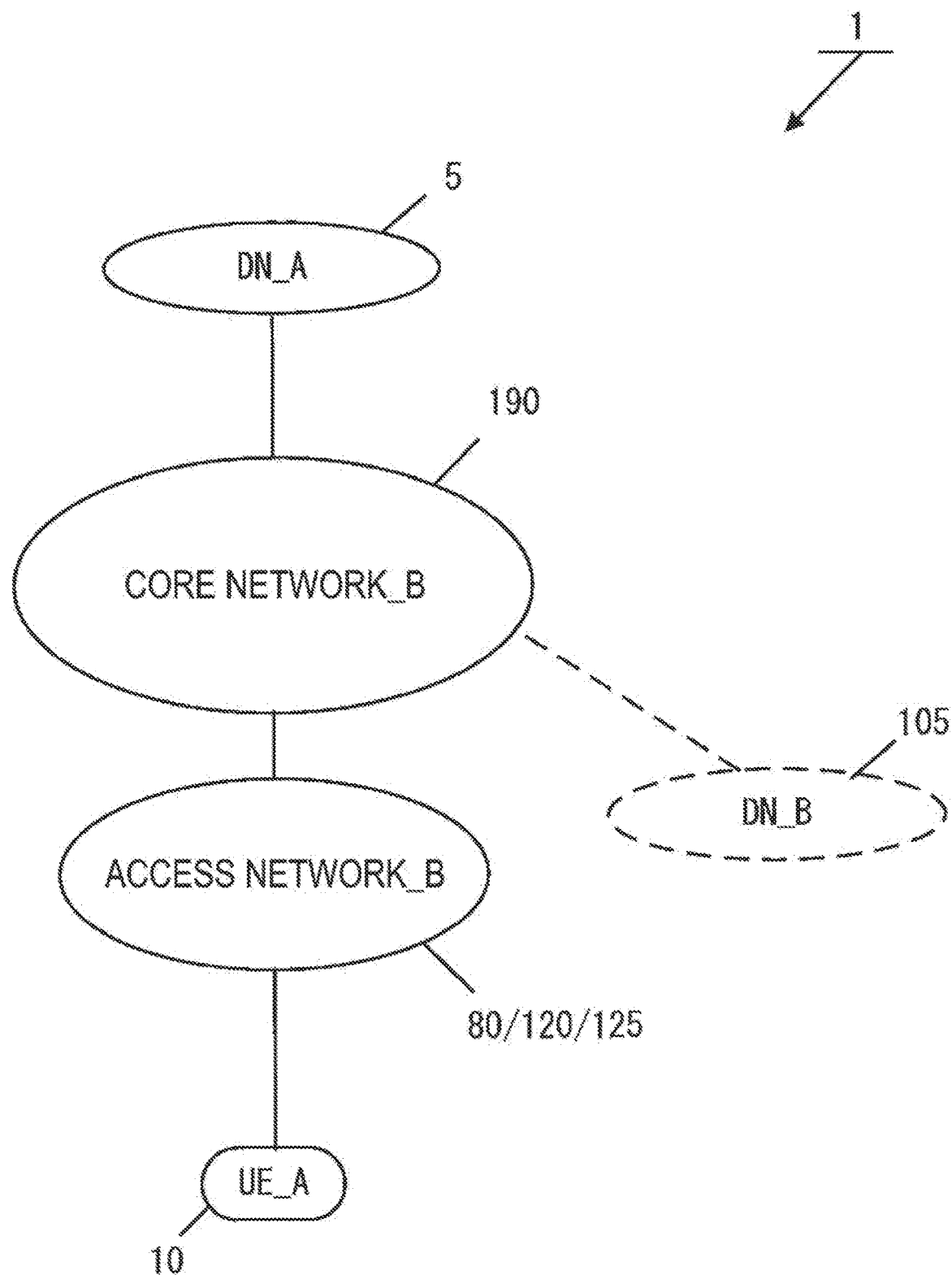
FIG. 1 is a diagram illustrating an overview of a mobile communication system.
Figure 2:
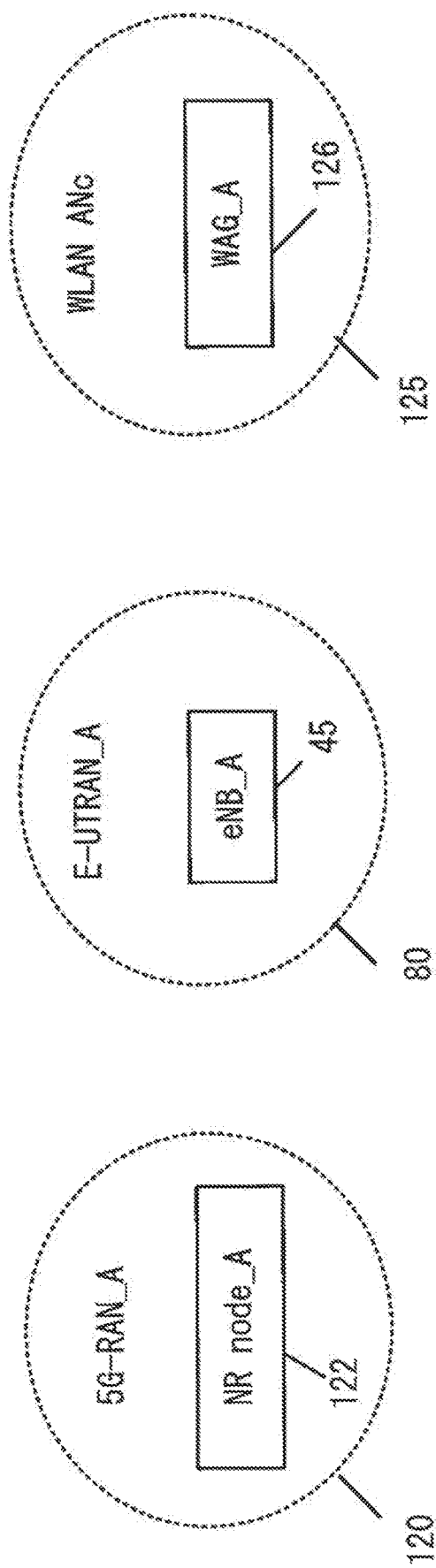
FIG. 2 is a diagram illustrating an example of a configuration of an access network and the like in the mobile communication system.
Figure 3:
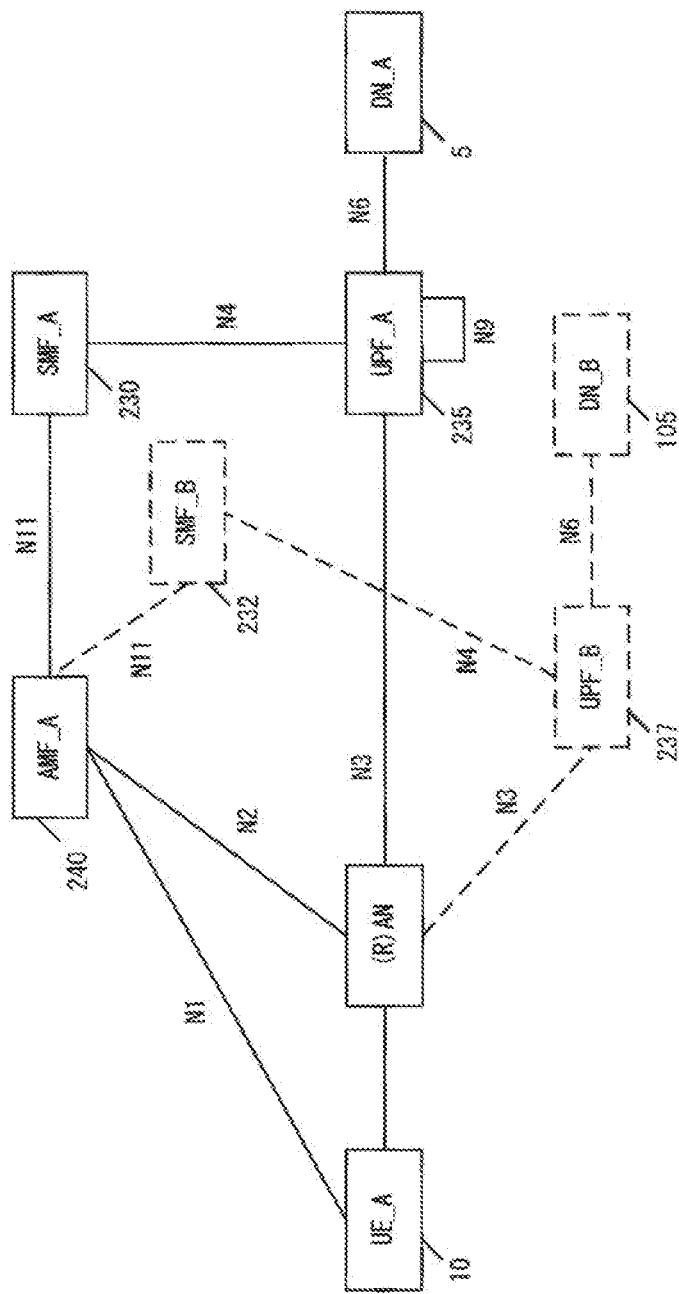
FIG. 3 is a diagram illustrating an example of a configuration of a core network and the like in the mobile communication system.

An overview of the mobile communication system according to the present embodiment will be described with reference to FIGS. 1, 2, and 3. FIG. 2 is a diagram illustrating details of an access network in the mobile communication system of FIG. 1. FIG. 3 is a diagram mainly illustrating details of a core network in the mobile communication system of FIG. 1. As illustrated in FIG. 1, a mobile communication system 1 (also referred to as 5GS) according to the present embodiment includes a terminal apparatus (also referred to as a user equipment, a mobile terminal apparatus, or the like) UE (User Equipment)_A 10, an Access Network (AN)_B, a Core Network (CN)_B 190, and a Data Network (DN)_A 5 and a DN_B 105.

Here, the UE_A 10 may an apparatus connectible to a network service via a 3GPP access (also referred to as 3GPP access network) and/or a non-3GPP access (also referred to as a non-3GPP access network). The UE_A 10 may also include a Universal Integrated Circuit Card (UICC) and an Embedded UICC (eUICC). The UE_A 10 may be a wirelessly connectible terminal apparatus, and may be a Mobile Equipment (ME), a Mobile Station (MS), a Cellular Internet of Things (CIoT) terminal (CIoT UE), or the like.

The UE_A 10 is capable of connecting to the access network and/or the core network. The UE_A 10 is capable of connecting to the DN_A 5 via the access network and/or the core network. The UE_A 10 transmits and/or receives (communicates) user data by using a Protocol Data Unit (or Packet Data Unit, PDU) session to and from (with) the DN_A 5. Furthermore, the communication of the user data may not be limited to Internet Protocol (IP) communication, but may be non-IP communication.

Here, the IP communication is communication of data using the IP, and is data communication achieved through transmitting and/or receiving an IP packet which is given an IP header. Note that a payload part constituting an IP packet may contain the user data transmitted and/or received by the UE_A 10. The non-IP communication is communication of data without using the IP, and is data communication achieved through transmitting and/or receiving data which is not given an IP header. For example, the non-IP communication may be the data communication achieved through transmitting and/or receiving application data not given the IP packet, or may transmit and/or receive the user data transmitted and/or received by the UE_A 10 to which another header such as a MAC header and an Ethernet (trade name) frame header is given.

The PDU session is connectivity established between UE_A 10 and DN_A 5 and/or DN_B 105 in order to provide a PDU connection service. To be more specific, the PDU session may be connectivity established between the UE_A 10 and an external gateway. Here, the external gateway may be a UPF, a Packet Data Network Gateway (PGW), or the like. The PDU session may be a communication path established for transmitting and/or receiving the user data between the UE_A 10 and the core network and/or the DN (the DN_A 5 or the DN_B 105), or a communication path for transmitting and/or receiving the PDU. Furthermore, the PDU session may be a session established between the UE_A 10 and the core network and/or the DN (the DN_A 5 or the DN_B 105), or may be a logical communication path including a transfer path such as one or more bearers and the like between the devices or apparatuses in the mobile communication system 1. To be more specific, the PDU session may be a connection established by the UE_A 10 with the core network_B 190 and/or the external gateway, or may be a connection established between the UE_A 10 and the UPF (a UPF_A 235 and/or a UPF_B 237). The PDU session may be connectivity and/or a connection between the UE_A 10 and the UPF (the UPF_A 235 and/or the UPF_B 237) via an NR node_A 122. Furthermore, the PDU session may be identified by a PDU session ID and/or an EPS bearer ID.

Note that the UE_A 10 can transmit and/or receive the user data to and/or from a device located in the DN_A 5 and/or the DN_B 105 such as an application server by using the PDU session. In other words, the PDU session can transfer the user data transmitted and/or received between the UE_A 10 and the device located in the DN_A 5 and/or the DN_B 105 such as an application server. Furthermore, each device (the UE_A 10, the devices within the access network, and/or the devices in the core network, and/or the devices in the data network) may associate one or more identification information with the PDU session for management. Note that these identification information may include at least one of an Access Point Name (APN), a Traffic Flow Template (TFT), a session type, application identification information, identification information of the DN_A 5 and/or the DN_B 105, Network Slice Instance (NSI) identification information, and Dedicated Core Network (DCN) identification information, and access network identification information, or may further include other information. Furthermore, in a case that multiple PDU sessions are established, respective identification information associated with the PDU sessions may have the same content or different contents. Furthermore, the NSI identification information is information for identifying an NSI, and hereinafter may be an NSI ID or a Slice Instance ID.

The access network_B may be any of an Evolved Universal Terrestrial Radio Access Network (E-UTRAN)_A 80, a 5G-RAN_A 120, and a WLAN ANc 125, as illustrated in FIG. 2. Note that the E-UTRAN_A 80 and/or the 5G-RAN_A 120 may be referred to as a 3GPP access network, and the WLAN ANc 125 may be referred to as a non-3GPP access network. Each radio access network includes devices to which the UE_A 10 is actually connected (such as a base station apparatus and an access point), and the like.

For example, the E-UTRAN_A 80 is an access network for LTE and includes one or more eNBs A 45. The eNB_A 45 is a radio base station to which the UE_A 10 connects through an Evolved Universal Terrestrial Radio Access (E-UTRA). In a case that the E-UTRAN_A 80 includes multiple eNBs, the eNBs may be connected to each other.

The 5G-RAN_A 120 is a 5G access network, and includes one or more New Radio Access Technology nodes (NR nodes)_A 122. The NR node_A 122 is a radio base station to which UE_A 10 is connected through a 5G radio access (5G Radio Access). In a case that the 5G-RAN_A 120 includes multiple NR nodes_A 122, the NR nodes_A 122 may be connected to each other.

Note that the 5G-RAN_A 120 may be an access network including the E-UTRA and/or the 5G-Radio Access. In other words, the 5G-RAN_A 120 may include the eNB_A 45, the NR node_A 122, or both of them. In this case, the eNB_A 45 and the NR node_A 122 may be similar devices. Therefore, the NR node_A 122 can be substituted with the eNB_A 45.

The WLAN ANc 125 is a radio LAN access network, and includes one or more WLAN Access Gateway (WAG)s_A 126. The WAG_A 126 is a radio base station to which UE_A 10 connects through a radio LAN access. Furthermore, the WAG_A 126 may serve as a gateway between the core network_B 190 and the WLAN ANc 125. The WAG_A 126 may include a function unit for the radio base station and a function unit for the gateway which are configured as different devices.

Note that herein, the expression "the UE_A 10 is connected to each radio access network" is equivalent to "the UE_A 10 is connected to a base station apparatus, an access point, or the like included in each radio access network," and is equivalent to "data, signals, and the like transmitted and/or received also pass through the base station apparatus and the access point." Note that a control message transmitted and/or received between the UE_A 10 and the core network_B 190 may be the same control message, irrespective of a type of the access network. Therefore, the expression "the UE_A 10 and the core network_B 190 transmit and/or receive a message to and/or from each other via the NR node_A 122" may be equivalent to "the UE_A 10 and the core network_B 190 transmit a message to each other via the eNB_A 45 and/or the WAG_A 126."

Furthermore, the access network is a radio network connecting with the UE_A 10 and/or the core network. The access network may be a 3GPP access network, or a non-3GPP access network. Note that the 3GPP access network may be the E-UTRAN_A 80 or the 5G-radio access network (5G-RAN)_A 120, and the non-3GPP access network may be the WLAN ANc 125. Note that the UE_A 10 may connect with the access network in order to connect to the core network, or may connect to the core network via the access network.

The DN_A 5 and the DN_B 105 are Data Networks that provide communication services to UE_A 10 and may be configured as packet data service networks, or may be configured for each service. Furthermore, the DN_A 5 and the DN_B 105 each may include a connected communication terminal. Therefore, connecting with DN_A 5 and/or the DN_B 105 may be connecting with the communication terminal or a server device located in the DN_A 5 and/or the DN_B 105. Furthermore, transmitting and/or receiving the user data to and/or from DN_A 5 and the DN_B 105 may be transmitting and/or receiving the user data to and/or from the communication terminal or server device located in the DN_A 5 and the DN_B 105. The DN_A 5 and/or DN_B 105 are outside the core network in FIG. 1, but may be in the core network.

The core network_B 190 may be configured as one or more devices in the core network. Here, the device in the core network may be a device that performs some or all of processes or functions of each device included in the core network_B 190. Note that the device in the core network may be referred to as a core network device.

Furthermore, the core network is an IP mobile communication network run by a Mobile Network Operator (MNO) to which the access network and/or the DN_A 5 connects. The core network may be a core network for the mobile network operator that runs and manages the mobile communication system 1, or may be a core network for a virtual mobile network operator or a virtual mobile communication service provider such as a Mobile Virtual Network Operator (MVNO) or a Mobile Virtual Network Enabler (MVNE). Note that the core network_B 190 may be an Evolved Packet Core (EPC) constituting an Evolved Packet System (EPS), or may be a 5G Core Network (5GC) constituting the 5GC. Furthermore, the core network_B 190 may be a core network for a system providing the 5G communication service. Note that the core network_B 190 is not limited to that above described, but may be a network for providing a mobile communication service.

Next, the core network_B 190 will be described. The core network_B190 may include at least one of an Authentication Server Function (AUSF), an Access and Mobility Management Function (AMF)_A 240, a Structured Data Storage network function (SDSF), an Unstructured Data Storage network function (UDSF), a Network Exposure Function (NEF), an NF Repository Function (NRF), a Policy Control Function (PCF), a Session Management Function (SMF)_A 230, a Session Management Function (SMF)_B 232, a Unified Data Management (UDM), a User Plane Function (UPF)_A 235, a User Plane Function (UPF)_B 237, an Application Function (AF), and a Non-3GPP InterWorking Function (N3IWF). These may also be configured as Network Functions (NFs). The NFs may refer to processing functions included in a network.

Among these, the AMF (AMF_A 240), the SMFs (SMF_A 230 and SMF_B 232), and the UPFs (UPF_A 235 and UPF_B 237) only are illustrated in FIG. 3 for simplicity, not meaning exclusion of others (devices and/or NFs). Note that, for simplicity, the UE_A 10 may be referred to as the UE; the AMF_A 240, the AMF; the SMF_A 230 and the SMF_B 232, the SMF; the UPF_A 235 and the UPF_B 237, the UPF; and the DN_A 5 and the DN_B 105, the DN.

FIG. 3 illustrates an N1 interface (hereinafter, also referred to as reference point), an N2 interface, an N3 interface, an N4 interface, an N6 interface, an N9 interface, and an N11 interface. Here, the N1 interface is an interface between the UE and the AMF, the N2 interface is an interface between an (R)AN (access network) and the AMF, the N3 interface is an interface between the (R)AN (access network) and the UPF, the N4 interface is an interface between the SMF and the UPF, the N6 interface is an interface between the UPF and the DN, the N9 interface is an interface between the UPF and the UPF, and the N11 interface is an interface between the AMF and the SMF. The devices or apparatuses can perform communication with each other using these interfaces.

Note that FIG. 3 is a system configuration diagram in a case that the UE simultaneously accesses two DNs using multiple PDU sessions. Two SMFs are selected for two different PDU sessions. Two SMFs_A 230 and two UPFs_A 235 are illustrated in FIG. 3.

Hereinafter, the devices included in the core network_B190 are briefly described.

First, the AMF_A 240 is connected to another AMF, the SMF (the SMF_A 230 and/or the SMF_B 232), the access networks (i.e., the E-UTRAN_A 80, the 5G-RAN_A 120, and the WLAN ANc125), the UDM, the AUSF, and the PCF. The AMF_A 240 may serve to perform functions such as Registration management, Connection management, Reachability management, Mobility management of the UE_A 10 or the like, Session Management message transfer between the UE and the SMF, Access Authentication/Access Authentication, Security Anchor Function (SEA), Security Context Management (SCM), N2 interface support for the N3IWF, support of NAS signal transmission and/or reception with the UE over the N3IWF, authentication of the UE connected over the N3IWF, Registration Management States (RM states) management, and Connection Management states (CM states) management. One or more AMFs_A 240 may be located in the core network_B 190. Alternatively, the AMF_A 240 may be an NF that manages one or more Network Slice Instances (NSIs). The AMF_A 240 may be a common CP function (Common Control Plane Network Function (Common CPNF(CCNF)) common to multiple NSIs.

The RM state includes a deregistered state (RM-DEREGISTERED state) and a registered state (RM-REGISTERED state). In the RM-DEREGISTERED state, since the UE is not registered with the network, the UE context in the AMF holds nor valid location information or routing information for the UE, and therefore, the AMF is in a state incapable of reaching the UE. In the RM-REGISTERED state, since the UE is registered with the network, the UE may receive services that requires registration with the network.

The CM state includes a disconnected state (CM-IDLE state) and a connected state (CM-CONNECTED state). In the CM-IDLE state, the UE is in the RM-REGISTERED state but has no NAS signaling connection established with the AMF over the N1 interface. In the CM-IDLE state, the UE has no N2 interface connection (N2 connection) nor N3 interface connection (N3 connection). On the other hand, in the CM-CONNECTED state, the UE has a NAS signaling connection established with the AMF over the N1 interface.

In the CM-CONNECTED state, the UE may have an N2 interface connection (N2 connection) and/or an N3 interface connection (N3 connection).

The SMF_A 230 is connected to the AMF_A 240, the UPF_A 235, the UDM, and the PCF. The SMF_B 232 is connected to the AMF_A 240, the UPF_B 237, the UDM, and PCF. The SMF_A 230 and the SMF_B 232 may serve to perform functions such as Session Management of a PDU session or the like, IP address allocation for the UE, selection and control of the UPF, configuration of the UPF to route a traffic to a proper destination, a function to notify that downlink data arrives (Downlink Data Notification), identifier of AN-specific SM information (SM information for each AN) transmitted via the AMF over the N2 interface to the AN, determination of Session and Service Continuity mode (SSC mode) for a session, and roaming functionality. Although the SMF_A 230 and the SMF_B 232 are described as separate devices or NFs, they may be the same device or function.

The UPF_A 235 is connected to the DN_A 5, the SMF_A 230, another UPF, and the access networks (i.e., the E-UTRAN_A 80, the 5G-RAN_A 120, and the WLAN ANc 125). The UPF_B 237 is connected to the DN_B 105, the SMF_B 232, another UPF, and the access networks (i.e., the E-UTRAN_A 80, the 5G-RAN_A 120, and the WLAN ANc 125). The UPF_A 235 and the UPF_B 237 may serve to perform functions such as anchor for intra-RAT mobility or inter-RAT mobility, Packet routing & forwarding, an Uplink Classifier (UL CL) function to support routing multiple traffic flows to one DN, a Branching point function to support a multi-homed PDU session, QoS processing for a user plane, uplink traffic verification, downlink packet buffering, and a triggering function of downlink data notification. The UPF_A 235 and the UPF_B 237 may be relay devices configured to transfer the user data by functioning as gateways between the DN_A 5 and the core network_B 190, and between the DN_B 105 and the core network_B 190, respectively. Note that the UPF_A 235 and the UPF_B 237 may serve as gateways for the IP communication and/or the non-IP communication. Furthermore, the UPF_A 235 and the UPF_B 237 may have functions to transfer the IP communication, or may have functions to convert between the non-IP communication and the IP communication. The multiple gateways located may serve as gateways connecting the core network_B 190 with a single DN. Note that the UPF_A 235 and the UPF_B 237 may have connectivity with another NF to connect to each apparatus via another NF.

Note that, although the UPF_A 235 and the UPF_B 237 are described as separate devices or NFs, but a common UPF_C 239 (also referred to as branching point or uplink classifier) that is a UPF different from the UPF_A 235 and the UPF_B 237 may be present between the UPF_A 235 and the access network, and between the UPF_B 237 and the access network. In a case that the UPF_C 239 is present, the PDU session between the UE_A 10 and the DN_A 5 is established via the access network, the UPF_C 239, and the UPF_A 235, and the PDU session between the UE_A 10 and the DN_B 105 is established via the access network, the UPF_C 239, and the UPF_B 237.

Note that a User Plane (U-Plane) may be a communication path for transmitting and/or receiving the user data, and may include multiple bearers. Furthermore, a Control Plane (C-Plane) may be a communication path for transmitting and/or receiving a control message, and may include multiple bearers.

The AUSF is connected to the UDM and the AMF_A 240. The AUSF functions as an authentication server.

The SDSF provides a function for the NEF to store or acquire information as structured data.

The UDSF provides a function for all NFs to store or acquire information as unstructured data.

The NEF provides measures to securely provide service and capabilities provided by the 3GPP network. The NEF stores the information received from another NF as structured data.

The NRF, in a case of receiving an NF Discovery Request from an NF instance, provides information of the discovered NF instances to the NF, and holds information of available NF instances and services supported by those instances.

The PCF is connected to the SMF (the SMF_A 230, the SMF_B 232), the AF, and the AMF_A 240. The PCF provides a policy rule or the like.

The UDM is connected to the AMF_A 240, the SMF (the SMF_A 230, the SMF_B 232), the AUSF, and the PCF. The UDM includes an application front end (UDM FE) and a User Data Repository (UDR). The UDM FE performs processing of credentials, location management, subscriber management, and the like. The UDR stores data required for the UDM FE to provide, and policy profiles required by the PCF.

The AF is connected to the PCF. The AF applies influence on traffic routing, and participates in policy control.

The N3IWF provides functions such as is IPsec tunnel establishment with the UE, relaying NAS (N1) signaling between the UE and the AMF, processing of N2 signaling transmitted from the SMF and relayed by the AMF, establishment of IPsec Security Association (IPsec SA), relaying user plane packets between the UE and the UPF, and AMF selection.

1.2. Device Configuration

The configuration of each device or apparatus will be described below. Note that some or all of devices or apparatuses described below and functions of units in the devices or apparatus may operate on physical hardware, or logical hardware which is virtually configured on general-purpose hardware.

1.2.1. Configuration of UE

Figure 4:
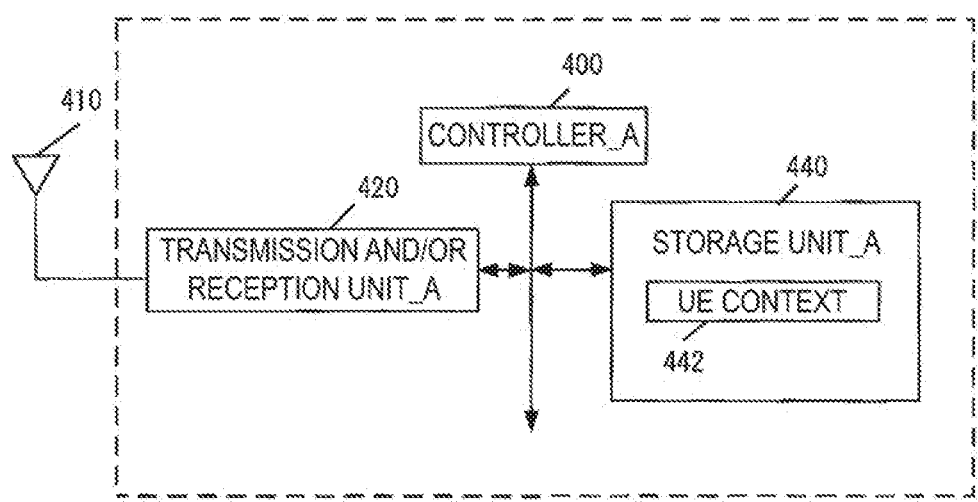
FIG. 4 is a diagram illustrating a device configuration of a UE.

First, FIG. 4 illustrates a device configuration example of the UE_A 10. As illustrated in FIG. 4, the UE_A 10 includes a controller_A 400, a transmission and/or reception unit_A 420, and a storage unit_A 440. The transmission and/or reception unit_A 420 and the storage unit_A 440 are connected to the controller_A 400 via a bus. An external antenna_A 410 is connected to the transmission and/or reception unit_A 420. The storage unit_A 440 stores a UE context 442.

The controller_A 400 is a function unit for controlling the whole of the UE_A 10 and implements various processes of the whole of the UE_A 10 by reading out various information and programs stored in the storage unit_A 440 and executing the programs.

The transmission and/or reception unit_A 420 is a function unit for the UE_A 10 to connect to the base station (the E-UTRAN_A 80 and the 5G-RAN_A 120) and/or the access point (the WLAN ANc 125) within the access network to connect to the access network. In other words, the UE_A 10 can connect to the base station and/or the access point within the access network via the external antenna_A 410 connected to the transmission and/or reception unit_A 420. Specifically, the UE_A 10 can transmit and/or receive the user data and/or the control information to and/or from the base station and/or the access point within the access network via the external antenna_A 410 connected to the transmission and/or reception unit_A 420.

The storage unit_A 440 is a function unit configured to store programs, data, and the like necessary for each operation of UE_A 10, and includes, for example, a semiconductor memory, a Hard Disk Drive (HDD), a Solid State Drive (SSD), and the like. The storage unit_A 440 stores identification information, control information, a flag, a parameter, and the like included in a control message which is transmitted and/or received in a communication procedure described later. The UE context 442 stored in the storage unit_A 440 may include a UE context used to connect to the access networks_B 80/120/125, and a UE context used to connect to the core network_B 190. The UE context 442 may include a UE context stored for each UE, a UE context stored for each PDU session, and a UE context stored for each bearer. The UE context stored for each UE may include IMSI, EMM State, GUTI, and ME Identity. The UE context stored for each PDU session may include APN in Use, Assigned Session Type, IP Address(es), and Default Bearer. The UE context stored for each bearer may include EPS Bearer ID, TI, and TFT.

1.2.2. Configuration of eNB/NR node/WAG

Figure 5:
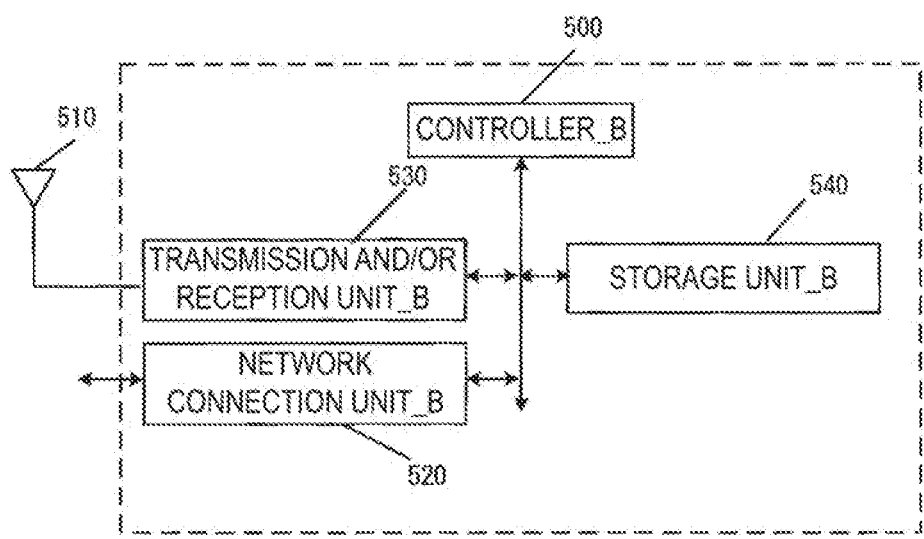
FIG. 5 is a diagram illustrating a device configuration of eNB/NR node/WAG.

Next, a device configuration example of the eNB_A 45, the NR node_A 122, and the WAG_A 126 is illustrated in FIG. 5. As illustrated in FIG. 5, the eNB_A 45, the NR node_A 122, and the WAG_A 126 include a controller_B 500, a network connection unit_B 520, a transmission and/or reception unit_B 530, and a storage unit_B 540. The network connection unit_B 520, the transmission and/or reception unit_B 530, and the storage unit_B 540 are connected to the controller_B 500 via a bus. An external antenna_B 510 is connected to the transmission and/or reception unit_B 530.

The controller_B 500 is a function unit for controlling the whole of the eNB_A 45, NR node_A 122, and WAG_A 126, and implements various processes of the whole of the eNB_A 45, NR node_A 122, and WAG_A 126 by reading out various information and programs stored in the storage unit_B 540 and executing the programs.

The network connection unit_B 520 is a function unit for the eNB_A 45, the NR node_A 122, and the WAG_A 126 to connect to the AMF_A 240 or the UPF_A 235 in the core network. In other words, the eNB_A 45, the NR node_A 122, and the WAG_A 126 can connect to the AMF_A 240 and the UPF_A 235 in the core network via the network connection unit_B 520. Specifically, the eNB_A 45, the NR node_A 122, and the WAG_A126 can transmit and/or receive the user data and/or the control information to and/or from the AMF_A 240 and/or the UPF_A 235 via the network connection unit_B 520.

The transmission and/or reception unit_B 530 is a function unit for the eNB_A 45, the NR node_A 122, and the WAG_A 126 to connect to the UE_A 10. In other words, the eNB_A 45, the NR node_A 122, and the WAG_A 126 can transmit and/or receive the user data and/or the control information to and/or from the UE_A 10 via the transmission and/or reception unit_B 530.

The storage unit_B 540 is a function unit configured to store programs, data, and the like necessary for each operation of the eNB_A 45, the NR node_A 122, and the WAG_A 126. The storage unit_B 540 includes, for example, a semiconductor memory, an HDD, an SSD, or the like. The storage unit_B 540 stores identification information, control information, a flag, a parameter, and the like included in a control message which is transmitted and/or received in a communication procedure described later. The storage unit_B 540 may store these information as the contexts for each UE_A 10.

1.2.3. Configuration of AMF

Figure 6:
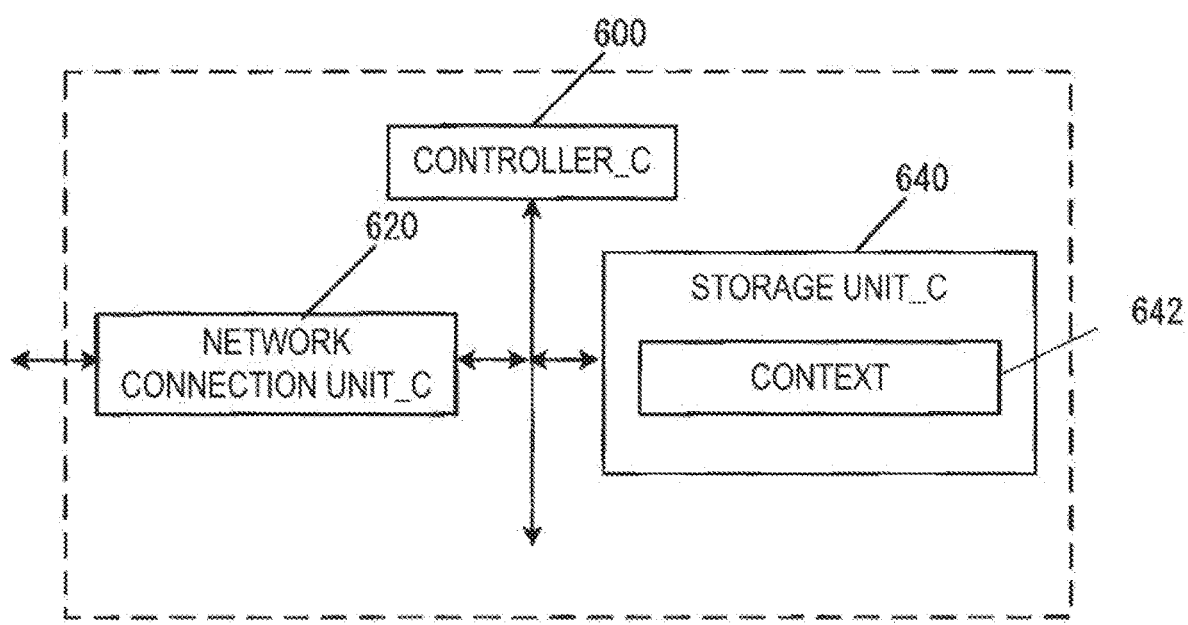
FIG. 6 is a diagram illustrating a device configuration of an AMF.

Next, a device configuration example of the AMF_A 240 is illustrated in FIG. 6. As illustrated in FIG. 6, the AMF_A 240 includes a controller_C 600, a network connection unit_C 620, and a storage unit_C 640. The network connection unit_C 620 and the storage unit_C 640 are connected to the controller_C 600 via a bus. The storage unit_C 640 stores a context 642.

The controller_C 600 is a function unit for controlling the whole of the AMF_A 240 and implements various processes of the whole of the AMF_A 240 by reading out various information and programs stored in the storage unit_C 640 and executing the programs.

The network connection unit_C 620 is a function unit for the AMF_A 240 to connect to another AMF_A 240, the SMF_A 230, the base stations (the E-UTRAN_A 80 and the 5G-RAN_A 120) and/or the access point (the WLAN ANc 125) within the access network, the UDM, the AUSF, and the PCF. In other words, the AMF_A 240 can transmit and/or receive the user data and/or the control information to and/or from the base station and/or the access point within the access network, the UDM, the AUSF, and the PCF via the network connection unit_C 620.

The storage unit_C 640 is a function unit configured to store programs, data, and the like necessary for each operation of the AMF_A 240. The storage unit_C 640 includes, for example, a semiconductor memory, an HDD, an SSD, or the like. The storage unit_C 640 stores identification information, control information, a flag, a parameter, and the like included in a control message which is transmitted and/or received in a communication procedure described later. The context 642 stored in the storage unit_C 640 may include a context stored for each UE, a context stored for each PDU session, and a context stored for each bearer. The context stored for each UE may include IMSI, MSISDN, MM State, GUTI, ME Identity, UE Radio Access Capability, UE Network Capability, MS Network Capability, Access Restriction, MME F-TEID, SGW F-TEID, eNB Address, MME UE S1AP ID, eNB UE S1AP ID, NR node Address, NR node ID, WAG Address, and WAG ID. The context for each PDU session may include APN in Use, Assigned Session Type, IP Address(es), PGW F-TEID, SCEF ID, and Default bearer. The context stored for each bearer may include EPS Bearer ID, TI, TFT, SGW F-TEID, PGW F-TEID, MME F-TEID, eNB Address, NR node Address, WAG Address, eNB ID, NR node ID, and WAG ID.

1.2.4. Configuration of SMF

Figure 7:
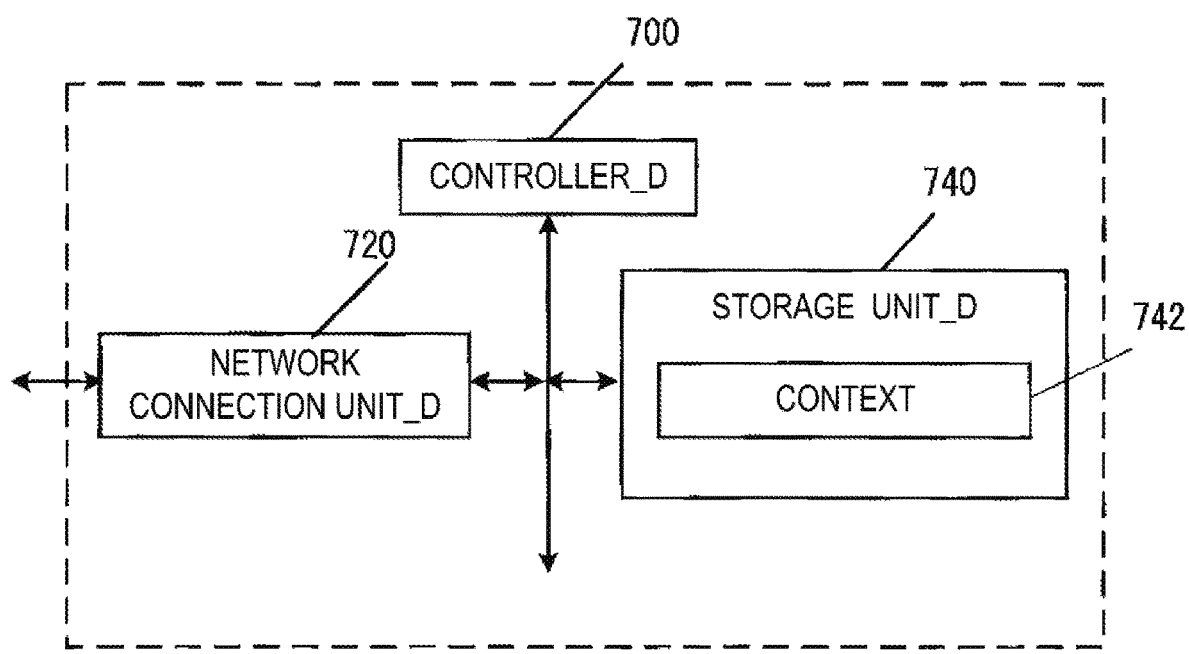
FIG. 7 is a diagram illustrating a device configuration of an SMF/UPF.

Next, a device configuration example of the SMF_A 230 and the SMF_B 232 is illustrated in FIG. 7. As illustrated in FIG. 7, the SMF_A 230 includes a controller_D 700, a network connection unit_D 720, and a storage unit_D 740. The network connection unit_D 720 and the storage unit_D 740 are connected to the controller_D 700 via a bus. The storage unit_D 740 stores a context 742.

The controller_D 700 in the SMF_A 230 is a function unit for controlling the whole of the SMF_A 230 and implements various processes of the whole of the SMF_A 230 by reading out various information and programs stored in the storage unit_D 740 and executing the programs.

The network connection unit_D 720 in the SMF_A 230 is a function unit for the SMF_A 230 to connect to the AMF_A 240, the UPF_A 235, the UDM, and the PCF. In other words, the SMF_A 230 can transmit and/or receive the user data and/or the control information to and/or from the AMF_A 240, the UPF_A 235, the UDM, and the PCF via the network connection unit_D 720.

The storage unit_D 740 in the SMF_A 230 is a function unit for storing programs, data, and the like necessary for each operation of the SMF_A 230. The storage unit_D 740 in the SMF_A 230 includes, for example, a semiconductor memory, an HDD, an SSD, or the like. The storage unit_D 740 in the SMF_A 230 stores identification information, control information, a flag, a parameter, and the like included in a control message which is transmitted and/or received in a communication procedure described later. The context 742 stored in the storage unit_D 740 in the SMF_A 230 may include a context stored for each UE, a context stored for each APN, a context stored for each PDU session, and a context stored for each bearer. The context stored for each UE may include IMSI, ME Identity, MSISDN, and RAT type. The context stored for each APN may include APN in use. Note that the context stored for each APN may be stored for each Data Network Identifier. The context store for each PDU session may include Assigned Session Type, IP Address(es), SGW F-TEID, PGW F-TEID, and Default Bearer. The context stored for each bearer may include EPS Bearer ID, TFT, SGW F-TEID, and PGW F-TEID.

Note that the SMF_B232 is configured similarly to the SMA_A 230.

1.2.5. Configuration of UPF

Next, a device configuration example of the UPF_A 235 and the UPF_B 237 is illustrated in FIG. 7. As illustrated in FIG. 7, the UPF_A 235 includes a controller_D 700, a network connection unit_D 720, and a storage unit_D 740. The network connection unit_D 720 and the storage unit_D 740 are connected to the controller_D 700 via a bus. The storage unit_D 740 stores a context 742.

The controller_D 700 in the UPF_A 235 is a function unit for controlling the whole of the UPF_A 235 and implements various processes of the whole of the UPF_A 235 by reading out various information and programs stored in the storage unit_D 740 and executing the programs.

The network connection unit_D 720 in the UPF_A 235 is a function unit for the UPF_A 235 to connect to the DN (i.e., the DN_A 5 and/or the DN_B 105), the SMF_A 230, another UPF_A 235, and the access networks (i.e., the E-UTRAN_A 80, the 5G-RAN_A 120, and the WLAN ANc 125). In other words, the UPF_A 235 can transmit and/or receive the user data and/or control information to and/or from the DN (i.e., the DN_A 5 and/or the DN_B 105), the SMF_A 230, another UPF_A 235, and the access networks (i.e., the E-UTRAN_A 80, the 5G-RAN_A 120, and the WLAN ANc 125) via the network connection unit_D 720.

The storage unit_D 740 in the UPF_A 235 is a function unit for storing programs, data, and the like necessary for each operation of the UPF_A 235. The storage unit_D 740 in the UPF_A 235 includes, for example, a semiconductor memory, an HDD, an SSD, or the like. The storage unit_D 740 in the UPF_A 235 stores identification information, control information, a flag, a parameter, and the like included in a control message which is transmitted and/or received in a communication procedure described later. The context 742 stored in the storage unit_D 740 in the UPF_A 235 may include a context stored for each UE, a context stored for each APN, a context stored for each PDU session, and a context stored for each bearer. The context stored for each UE may include IMSI, ME Identity, MSISDN, and RAT type. The context stored for each APN may include APN in use. Note that the context stored for each APN may be stored for each Data Network Identifier. The context store for each PDU session may include Assigned Session Type, IP Address(es), SGW F-TEID, PGW F-TEID, and Default Bearer. The context stored for each bearer may include EPS Bearer ID, TFT, SGW F-TEID, and PGW F-TEID.

Note that UPF_B 237 is configured similarly to the UPF_A 235.

1.2.6. Information Stored in Storage Unit in Above Each Device

Next, information stored in the storage unit in each device will be described.

International Mobile Subscriber Identity (IMSI) is permanent identification information of a subscriber (user), and is identification information assigned to a user using the UE. The IMSI stored by the UE_A 10, the MME_A 40/CPF_A 140/AMF_A 2400, and the SGW_A 35 may be the same as the IMSI stored by the HSS_A 50.

EMM State/MM State indicates a Mobility management state of the UE_A 10 or MME_A 40/CPF_A 140/AMF_A 240. For example, the EMM State/MM State may be an EMM-REGISTERED state (registered state) in which the UE_A 10 is registered in the network, and/or an EMM-DEREGISTERED state (deregistered state) in which the UE_A 10 is not registered in the network. The EMM State/MM State may be an ECM-CONNECTED state in which a connection is maintained between the UE_A 10 and the core network, and/or an ECM-IDLE state in which the connection is released. Note that the EMM State/MM State may be information with which a state in which the UE_A 10 is registered in the EPC and a state in which the UE_A 10 is registered in the NGC or the 5GC can be distinguished.

Globally Unique Temporary Identity (GUTI) is temporary identification information of the UE_A 10. The GUTI includes identification information of the MME_A 40/CPF_A 140/AMF_A 240 (Globally Unique MME Identifier (GUMMEI)), and identification information of the UE_A 10 in a specific MME_A 40/CPF_A 140/AMF_A 240 (M-Temporary Mobile Subscriber Identity (M-TMSI)). The ME Identity is an ID of the UE_A 10 or the ME, and may be International Mobile Equipment Identity (IMEI) or IMEI Software Version (IMEISV), for example. The MSISDN represents a basic phone number of the UE_A 10. The MSISDN stored by the MME_A 40/CPF_A 140/AMF_A 240 may be information indicated by a storage unit of the HSS_A 50. Note that the GUTI may include information for identifying the CPF_140.

The MME F-TEID is information for identifying the MME_A 40/CPF_A 140/AMF_A 240. The MME F-TEID may include an IP address of the MME_A 40/CPF_A 140/AMF_A 240, a Tunnel Endpoint Identifier (TEID) of the MME_A 40/CPF_A 140/AMF_A 240, or both of them. The IP address of the MME_A 40/CPF_A 140/AMF_A 240 and the TEID of the MME_A 40/CPF_A 140/AMF_A 240 may be stored independently of each other. The MME F-TEID may be identification information for user data, or identification information for control information.

SGW F-TEID is information for identifying the SGW_A 35. The SGW F-TEID may include an IP address of the SGW_A 35, a TEID of the SGW_A 35, or both of them. The IP address of the SGW_A 35 and the TEID of the SGW_A 35 may be stored independently of each other. The SGW F-TEID may be identification information for user data, or identification information for control information.

The PGW F-TEID is information for identifying the PGW_A 30/UPGW_A 130/SMF_A 230/UPF_A 235. The PGW F-TEID may include an IP address of the PGW_A 30/UPGW_A 130/SMF_A 230/UPF_A 235, a TEID of the PGW_A 30/UPGW_A 130/SMF_A 230/UPF_A 235, or both of them. The IP address of the PGW_A 30/UPGW_A 130/SMF_A 230/UPF_A 235 and the TEID of the PGW_A 30/UPGW_A 130/SMF_A 230/UPF_A 235 may be stored independently of each other. The PGW F-TEID may be identification information for user data, or identification information for control information.

eNB F-TEID is information for identifying the eNB_A 45. The eNB F-TEID may include an IP address of the eNB_A 45, a TEID of the eNB_A 45, or both of them. The IP address of the eNB_A 45 and the TEID of the SGW_A 35 may be stored independently of each other. The eNB F-TEID may be identification information for user data, or identification information for control information.

The APN may be identification information for identifying the core network and an external network such as the DN. Furthermore, the APN can be used also as information to select a gateway such as the PGW_A 30/UPGW_A 130/UPF_A 235 for connecting the core network_A 90. Note that the APN may be a Data Network Name (DNN). Therefore, the APN may be represented as the DNN, or the DNN may be represented as the APN.

Note that the APN may be identification information for identifying such a gateway, or identification information for identifying an external network such as the DN. Note that in a case that multiple gateways connecting the core network to the DN are located, multiple gateways selectable according to the APN may be provided. Furthermore, one gateway may be selected from among such multiple gateways by another scheme using identification information other than the APN.

UE Radio Access Capability is identification information indicating a radio access capability of the UE_A 10. UE Network Capability includes an algorithm of security supported by the UE_A 10 and a key derivative function. The MS Network Capability is information including, for the UE_A 10 having a function of a GERAN_A 25 and/or a UTRAN_A 20, one or more information necessary for an SGSN_A 42. The Access Restriction is registration information for access restriction. The eNB Address is an IP address of the eNB_A 45. The MME UE S1AP ID is information for identifying the UE_A 10 in the MME_A 40/CPF_A 140/AMF_A 240. The eNB UE S1AP ID is information for identifying the UE_A 10 in the eNB_A 45.

The APN in Use is an APN recently utilized. The APN in Use may be Data Network Identifier. This APN may include identification information of the network and identification information of a default operator. Furthermore, the APN in Use may be information for identifying a DN with which the PDU session is established.

The Assigned Session Type is information indicating a PDU session type. The Assigned Session Type may be Assigned PDN Type. The PDU session type may be an IP, or a non-IP. Furthermore, in a case that the PDU session type is an IP, information indicating a PDN type assigned by the network may be further included. Note that the Assigned Session Type may be IPv4, IPv6, or IPv4v6.

Unless otherwise specifically described, the IP Address refers to the IP address allocated to the UE. The IP address may be an IPv4 address, an IPv6 address, an IPv6 prefix, or an interface ID. Note that in a case that the Assigned Session Type indicates non-IP, an element of the IP Address may not be contained.

The DN ID is identification information for identifying the core network_B 190 and an external network such as the DN. Furthermore, the DN ID can be used as information for selecting a gateway such as the UPGW_A 130 or the PF_A 235 connecting the core network_B 190.

Note that the DN ID may be identification information for identifying such a gateway, or identification information for identifying an external network such as the DN. Note that in a case that multiple gateways connecting the core network_B 190 to the DN are located, multiple gateways selectable according to the DN ID may be provided. Furthermore, one gateway may be selected from among such multiple gateways by another scheme using identification information other than the DN ID.

Furthermore, the DN ID may be information equivalent to the APN, or different from the APN. Note that in a case that the DN ID is the information different from the APN, each device may manage information indicating a correspondence relationship between the DN ID and the APN, perform a procedure to inquire the APN by using the DN ID, or perform a procedure to inquire the DN ID by using the APN.

The SCEF ID is an IP address of the SCEF_A 46 used in the PDU session. The Default Bearer is information acquired and/or generated in establishing a PDU session, and is EPS bearer identification information for identifying a default bearer associated with the PDU session.

The EPS Bearer ID is identification information of the EPS bearer. The EPS Bearer ID may be identification information for identifying Signalling Radio Bearer (SRB) and/or Control-plane Radio bearer (CRB), or identification information for identifying Data Radio Bearer (DRB). The Transaction Identifier (TI) is identification information for identifying a bidirectional message flow (Transaction). Note that the EPS Bearer ID may be EPS bearer identification information for identifying a dedicated bearer. Therefore, the EPS bearer ID may be identification information for identifying the EPS bearer different from the default bearer. The TFT indicates all the packet filters associated with the EPS bearer. The TFT is information for identifying some the transmitted and/or received user data, and thus, the UE_A 10 uses the EPS bearer associated with the TFT to transmit and/or receive the user data identified by the TFT. In other words, the UE_A 10 uses Radio Bearer (RB) associated with the TFT to transmit and/or receive the user data identified by the TFT. The TFT may associate the user data such as the transmitted and/or received application data with an appropriate transfer path, and may be identification information for identifying the application data. The UE_A 10 may use the default bearer to transmit and/or receive the user data which cannot be identified by the TFT. The UE_A 10 may store in advance the TFT associated with the default bearer.

The Default Bearer is EPS bearer identification information for identifying a default bearer associated with a PDU session. Note that the EPS bearer may be a logical communication path established between the UE_A 10 and the PGW_A 30/UPGW_A 130/UPF_A 235, or a communication path configuring a PDN connection/PDU session. Furthermore, the EPS bearer may be a default bearer, or a dedicated bearer. Furthermore, the EPS bearer may include an RB established between the UE_A 10 and the base station and/or the access point in the access network. Furthermore, the RB and the EPS bearer may be associated with each other on a one-to-one basis. Therefore, identification information of the RB may be associated with the identification information of the EPS bearer on a one-to-one basis, or may be the same identification information as the identification information of the EPS bearer. Note that the RB may be an SRB and/or a CRB, or a DRB. The Default Bearer may be information that the UE_A 10 and/or the SGW_A 35 and/or the PGW_A 30/UPGW_A 130/SMF_A 230/UPF_A 235 acquire from the core network in establishing a PDU session. Note that the default bearer is an EPS bearer first established during the PDN connection/PDU session, and is such an EPS bearer that only one bearer can be established during one PDN connection/PDU session. The default bearer may be an EPS bearer that can be used to communicate user data not associated with the TFT. The dedicated bearer is an EPS bearer established after the default bearer is established during the PDN connection/PDU session, and is such an EPS bearer that multiple bearers can be established during one PDN connection/PDU session. The dedicated bearer is an EPS bearer that can be used to communicate user data not associated with the TFT.

User Identity is information for identifying a subscriber. The User Identity may be IMSI, or MSISDN. Furthermore, the User Identity may also be identification information other than IMSI and MSISDN. Serving Node Information is information for identifying the MME_A 40/CPF_A 140/AMF_A 240 used in a PDU session, and may be an IP address of the MME_A 40/CPF_A 140/AMF_A 240.

The eNB Address is an IP address of the eNB_A 45. The eNB ID is information for identifying the UE in the eNB_A 45. MME Address is an IP address of the MME_A 40/CPF_A 140/AMF_A 240. MME ID is information for identifying the MME_A 40/CPF_A 140/AMF_A 240. The NR node Address is an IP address of the NR node_A 122. The NR node ID is information for identifying the NR node_A 122. The WAG Address is an IP address of the WAG_A 126. The WAG ID is information for identifying the WAG_A 126.

1.3. Description of Initial Procedure

Next, before describing the detailed steps of an initial procedure in the present embodiment, in order to avoid redundant descriptions, terminology specific to the present embodiment and primary identification information used in each procedure will be described beforehand.

First, in the present embodiment, the network refers to at least some of the access networks_B 80/120/125, the core network_B 190, the DN_A 5, and the DN_B 105. One or more devices included in at least some of the access networks_B 80/120/125, the core network_B 190, the DN_A 5, and the DN_B 105 may also be referred to as a network or network device. Specifically, the expression "the network performs transmission and/or reception of a message and/or performs a procedure" means that "a device in the network (network device) performs transmission and/or reception of a message and/or performs a procedure."

In the present embodiment, a Session Management (SM) message (also referred to as a Non-Access-Stratum (NAS) SM message) may be a NAS message used in a procedure for the SM, or a control message transmitted and/or received between the UE_A 10 and the SMF_A 230 or the SMF_B 232 via the AMF_A 240. Furthermore, the SM message may include a PDU session establishment request message, a PDU session establishment accept message, a PDU session complete message, a PDU session reject message, a PDU session modification request message, a PDU session modification accept message, a PDU session modification reject message, and the like. The procedure for the SM may include a PDU session establishment procedure, a PDU session modification procedure, and the like.

In the present embodiment, a Tracking Area (TA) is a range which the core network manages and which can be represented by the location information of the UE_A 10, and may include one or more cells, for example. The TA may be a range in which a control message such as a paging message is broadcast, or a range in which the UE_A 10 can move without a handover procedure.

In the present embodiment, a TA list is a list including one or more TAs assigned to the UE_A 10 by the network. Note that while the UE_A 10 is moving within one or more TAs included in the TA list, the UE_A 10 may be able to move without performing a registration procedure. In other words, the TA list may be an information group indicating an area in which the UE_A 10 can move without performing the registration procedure. S1, in the present embodiment, the Reflective Quality of Service (QoS) (RQoS) is QoS supported in the 5GC (5G Core). The RQoS is QoS which is achieved by the UE_A 10 creating a QoS rule (Derived QoS rule), based on the received downlink packet and/or downlink traffics. Note that it may be possible for each device to adapt the RQoS and the QoS that is not RQoS at the same time within the same PDU session. Furthermore, in order to achieve adaptation of the RQoS to the traffic, to the QoS for the uplink packet, QoS the same as the QoS for the downlink packet paired therewith may be adapted.

In present embodiment, the QoS rule (Derived QoS rule) is a rule for achieving user data communication using the RQoS. The QoS rule may include a Packet Filter, and/or QoS Flow Identity (QFI) and/or a Precedence value. Here, the QFI may be an identifier for identifying a QoS flow. The precedence value indicates the priority, and the lower the precedence value, the higher the priority. Note that the packet filter of the uplink packet may be generated based on the downlink packet. Furthermore, in a case that the RQoS is validated via the User Plane, the precedence value for the QoS rule may be configured to a standardized value. In a case that the RQoS is validated via the Control Plane, the precedence value for the QoS rule may be configured to a value transmitted and/or received through a control message via the Control Plane. Note that UE_A 10 may validate the RQoS by creating a QoS rule, or may invalidate the RQoS by deleting the QoS rule.

In the present embodiment, a Reflective QoS Timer (RQoS timer) is a timer for managing validation of the RQoS. Each device may validate the RQoS only while the RQoS timer is running. In other words, each device may validate the RQoS, based on the RQoS timer start and may invalidate the RQoS, based on the RQoS timer expiration. Furthermore, a timer value of the RQoS timer may be a value transmitted to the UE_A 10 from the network in the PDU session establishment procedure or the like, or may be a value configured in advance. Note that the RQoS timer may be a RQ timer. The RQoS timer may be a timer for managing validation of the RQoS, but is not limited thereto.

T2, in the present embodiment, authentication and/or authorization request information is information for the UE_A 10 to request initiation of the DN authentication and/or authorization procedure, and may be a variable indicating whether or not the UE_A 10 wants to initiate the DN authentication and/or authorization procedure, a name space specifying the service, a user identity, or an identifier identifying the user's profile. Note that the DN authentication and/or authorization procedure may be a PDU session establishment authentication and/or authorization procedure.

In the present embodiment, authentication and/or authorization information is information indicating a result of authentication and/or authorization at the time of a response to the DN authentication and/or authorization procedure from the 3GPP NW, and may be a variable indicating whether or not authentication and/or authorization is performed, or a name space specifying the service.

In present embodiment, the DN authentication and/or authorization response information may be a name space specifying the service that is included by the UE_A 10 in information with which the UE_A 10 responds to the authentication and/or authorization information issued by the DN, or may be a message response to the authentication and/or authorization information from the DN.

In present embodiment, a user ID is an identifier for identifying a user in the DN authentication and/or authorization. The user ID may be information for the UE_A 10 to request initiation of the DN authentication and/or authorization procedure.

In present embodiment, a user profile ID is an identifier for identifying a user's profile in the DN authentication and/or authorization. The user profile ID may be information for the UE_A 10 to request initiation of the DN authentication and/or authorization procedure.

In present embodiment, the DN authentication and/or authorization is a next-generation security system for a 5G mobile communication system that is a next generation mobile communication system. The DN authentication and/or authorization is a mechanism allowing the authentication and/or authorization by the DN during the PDU session establishment procedure, and may be a system that is not present in a conventional 4G system. Furthermore, the next generation security system may separate authentication and authorization from each other in connection with the DN authentication and/or authorization. Furthermore, separating authentication and authorization from each other may allow owners of an authentication resource and an authorization resource respectively to perform authentication and/or authorization on their own responsibilities, and may allow for flexible service deployment with mobile communication systems. T3, a first timer in the present embodiment is a timer that manages initiate of a procedure for session management such as a PDU session establishment procedure, and/or transmission of a Session Management (SM) message such as a PDU session establishment request message. While the first timer is running, the initiate of a procedure for session management and/or the transmission and/or reception of an SM message in each device may be prohibited. Note that the first timer may be configured at least per APN/DNN basis or per slice basis. Note that the SM message may be a NAS message used in the procedure for session management, and may be a control message transmitted and/or received between the UE_A 10 and the SMF_A 230 via the AMF_A 240. Furthermore, the SM message may include a PDU session establishment request message, a PDU session establishment accept message, a PDU session complete message, a PDU session reject message, a PDU session modification request message, a PDU session modification accept message, a PDU session modification reject message, and the like. Furthermore, the procedure for session management may include a PDU session establishment procedure, a PDU session modification procedure, and the like.

In present embodiment, the Network Slice is a logical network that provides certain network capabilities and network characteristics. Hereinafter, the network slice may be referred to as a NW slice.

In present embodiment, a Network Slice Instance (NSI) includes a set of network function (NF) instances (entities) and the required resources, and forms a network slice to which the set is allocated. Here, the NF is a processing function in the network and is adopted or defined in the 3GPP. The NSI is an entity of each of one or more Network Slices configured in the core network_B 190. The NSI may include a virtual Network Function (NF) generated using a Network Slice Template (NST). Here, the NST is associated with a resource request for providing a required communication service or capability, and is a logical expression of one or more Network Functions (NFs). Specifically, the NSI may be an aggregation including multiple NFs in the core network_B 190. The NSI may be a logical network configured to classify the user data delivered through a service or the like. The network slice may include one or more NFs. The NF included in the network slice may be or may not be a device shared by another network slice. The UE_A 10 can be assigned to one or more network slices, based on UE usage type and/or one or more network slice type IDs and/or registration information such as one or more NS IDs and/or the APN.

The Network Slice Instance (NSI) in the present embodiment is an entity of each of one or multiple Network Slices configured in the core network_B 190. The NSI in the present embodiment may include a virtual Network Function (NF) generated using a Network Slice Template (NST). Here, the NST is associated with a resource request for providing a required communication service or capability, and is a logical expression of one or multiple Network Functions (NFs). Specifically, the NSI may be an aggregation including multiple NFs in the core network_B 190. The NSI may be a logical network configured to classify the user data delivered through a service or the like. The network slice may include at least one or more NFs. The NF included in the network slice may be or may not be a device shared by another network slice. The UE_A 10 and/or the devices within the network can be assigned to one or multiple network slices, based on NSSAI and/or S-NSSAI and/or UE usage type and/or one or multiple network slice type IDs and/or registration information such as one or multiple NS IDs and/or the APN.

In the present embodiment, the S-NSSAI in the present embodiment is an abbreviation for Single Network Slice Selection Assistance information, and is information for identifying the network slices. The S-NSSAI may include a Slice/Service type (SST) and a Slice Differentiator (SD). The S-NSSAI may include only an SST, or both an SST and an SD. Here, the SST is information indicating an expected operation of a network slice in terms of functions and services. The SD may be information complementing the SST in a case of selecting one NSI from multiple NSIs indicated by the SST. The S-NSSAI may be PLMN-specific information or may be standard information common between PLMNs. The network may store one or multiple S-NSSAIs in the registration information for the UE_A 10 as default S-NSSAI.

The Single Network Slice Selection Assistance information (NSSAI) in the present embodiment is a collection of S-NSSAIs. Each of the S-NSSAIs included in the NSSAI is information that assists the access network or the core network to select the NSI. The UE_A 10 may store the NSSAI allowed from the network for each PLMN. The NSSAI may be information used to select the AMF_A 240.

In present embodiment, a first NW slice is a NW slice to which the established PDU session belongs at the time when the UE_A 10 connects to a certain DN. The first NW slice may be a NW slice managed within an operator A's network, or may be a NW slice that is commonly managed within an operator B's network.

In present embodiment, a second NW slice is a NW slice to which another PDU session belongs, the another PDU session being capable of connecting to the DN to which the PDU session belonging to the first NW slice connects. The first NW slice and the second NW slice may be run by the same operator or may be operated by different operators.

The operator A's network in the present embodiment is a network run by the operator A. A NW slice common with the operator B may be deployed.

The operator B's network in the present embodiment is a network run by the operator B. A NW slice common with the operator A may be deployed.

Re-attempt information in the present embodiment is information indicating by the NW to the UE_A 10 whether or not reconnection is allowed for the rejected PDU session, by using the same identification information. Note that the re-attempt information may be configured for each UTRAN access, E-UTRAN access, and NR access.

A first behavior in the present embodiment is a behavior in which the UE_A 10 stores slice information transmitted in the PDU session establishment request message in association with the transmitted PDU session identifier. In the first behavior, the UE_A 10 may store the slice information transmitted in the PDU session establishment request message, or may store the slice information received in a case that the PDU session establishment request message is rejected.

A second behavior in the present embodiment may be a behavior in which the UE_A 10 transmits a PDU session establishment request message for connecting to APN/DNN the same as the APN/DNN specified in the PDU session establishment request message previously transmitted, by use of slice information different from slice information specified previously in the PDU session establishment request message. Specifically, the second behavior may be a behavior in which in a case that a backoff timer value received from the network is zero or invalid, the UE_A 10 transmits a PDU session establishment request message for connecting to the APN/DNN identical to the PDU session establishment request message previously, by use of slice information different from slice information specified in the PDU session establishment request message previously transmitted. The second behavior may be a behavior in which in a case that a previously transmitted PDU session establishment request message is rejected because the specified APN/DNN is not supported wirelessly in a certain connected PLMN, or the previously transmitted PDU session establishment request message is rejected for a temporary reason, the UE_A 10 transmits a PDU session establishment request message for connecting to APN/DNN the same as the APN/DNN specified previously in the PDU session establishment request message, by use of slice information different from slice information specified previously in the PDU session establishment request message.

A third behavior in the present embodiment is a behavior in which in the case that the PDU session establishment request message is rejected, the UE_A 10 does not transmit a new PDU session establishment request message by use of the same identification information until the first timer expires. Specifically, the third behavior may be a behavior in which in a case that the backoff timer value received from the network is neither zero nor invalid, the UE_A 10 does not transmit a new PDU session establishment request message by use of the same identification information until the first timer expires. The third behavior may be a behavior in which in a case that another PLMN is selected or another NW slice is selected, and a rejection cause concerning configuration failure in a network operation is received, and in a case that the PDU session establishment request message is rejected and the received backoff timer has been started, the UE_A 10 does not transmit a new PDU session establishment request message by use of the same identification information until the first timer expires.

A fourth behavior in the present embodiment is a behavior in which in the case that the PDU session establishment request message transmitted on Registration procedure is rejected, the UE_A 10 does not transmit a new PDU session establishment request message not carrying slice information and/or DNN/APN information until the first timer expires. Specifically, the fourth behavior may be a behavior in which in a case that the backoff timer received from the network is neither zero nor deactivated, the UE_A 10 does not transmit a new PDU session establishment request message without slice information and/or DNN/APN information until the first timer expires.

A fifth behavior in the present embodiment is a behavior in which in the case that the PDU session establishment request message is rejected, the UE_A 10 does not transmit a new PDU session establishment request message by use of the same identification information. Specifically, the fifth behavior may be a behavior in which in a case that PDU types supported in the UE_A 10 and the network are different from each other, and the UE_A 10 is located in an equivalent PLMN, the UE_A 10 does not transmit a new PDU session establishment request message by use of the same identification information.

The sixth behavior in the present embodiment is a behavior in which in the case that the PDU session establishment request message is rejected, the UE_A 10 transmits a new PDU session establishment request message as an initial procedure by use of the same identification information. Specifically, the sixth behavior may be a behavior in which in a case that the PDU session establishment request message is rejected because there is no PDN session context of interest in a handover from the non-3GPP, the UE_A 10 transmits a new PDU session establishment request message as the initial procedure by use of the same identification information.

A seventh behavior in the present embodiment is a behavior in which in a case that another NW slice is selected in a PLMN selection procedure, continued is the backoff timer received in a case that the previous PDU session establishment request message is rejected. Specifically, the seventh behavior may a behavior in which in a case that the PLMN selection is performed in a case that the PDU session establishment request message is rejected, and that a NW slice common with the NW slice specified in the PDU session establishment request message can be specified in the selected PLMN, continued is the backoff timer received in a case that the PDU session establishment request message is rejected.

An eighth behavior in the present embodiment is a behavior in which the UE_A 10 may configure a first timer value to a value notified from the network, or a behavior in which the UE_A 10 may configure a value configured in advance in the UE_A 10. Specifically, the eighth behavior may be a behavior in which the UE_A 10 configures the backoff timer value received in the reject notification for the PDU session establishment request message as the first timer value, or may be a behavior in which the UE_A 10 configures a value that is configured or held in advance in the UE_A 10 as the first timer value. Note that, the eighth behavior in the case that a timer configured or held in advance in the UE_A 10 is configured as the first timer value may be limited to a case that the UE is located in a HPLMN or the equivalent PLMN.

A ninth behavior in the present embodiment is a behavior in which in the case that the PDU session establishment request message is rejected, the UE_A 10 does not transmit a new PDU session establishment request message until the terminal power is turned on/off, or a USIM is inserted or removed. Specifically, the ninth behavior may be a behavior in which in a case that the backoff timer received from the network is invalid, or the cause contained in the PDU session reject messages indicates that the PDU type are different between the UE_A 10 and the NW, the UE_A 10 does not transmit a new PDU session establishment request message until the terminal power is turned on/off, or a USIM is inserted or removed. The ninth behavior may be a behavior in which in a case that the PDU session establishment request message is rejected because the specified APN/DNN is not supported wirelessly in the connected PLMN, and that there is no information element of the backoff timer from the network and there is no Re-attempt information, or that a PDU session reconnection to the equivalent PLMN is allowed, the UE_A 10 does not transmit a new PDU session establishment request message until the terminal power is turned on/off, or a USIM is inserted or removed in the connected PLMN. The ninth behavior may be a behavior in which in a case that a first PDU session establishment request message is rejected because the specified APN/DNN is not supported wirelessly in the connected PLMN, and that there is no information element of the backoff timer from the network and there is no Re-attempt information, or that a PDU session reconnection to the equivalent PLMN is not allowed, the UE_A 10 does not transmit a new PDU session establishment request message until the terminal power is turned on/off, or a USIM is inserted or removed in the connected PLMN. The ninth behavior may be a behavior in which in a case that the PDU session establishment request message is rejected because the specified APN/DNN is not supported wirelessly in the connected PLMN, and that the backoff timer from the network is neither zero nor invalid, the UE_A 10 does not transmit a new PDU session establishment request message until the terminal power is turned on/off, or a USIM is inserted or removed. The ninth behavior may be a behavior in which in a case that the PDU session establishment request message is rejected because the specified APN/DNN is not supported wirelessly in the connected PLMN, and that the backoff timer from the network is invalid, the UE_A 10 does not transmit a new PDU session establishment request message until the terminal power is turned on/off, or a USIM is inserted or removed.

A tenth behavior in the present embodiment is a behavior in which in the case that the PDU session establishment request message is rejected, the UE_A 10 transmits a new PDU session establishment request message. Specifically, the tenth behavior may be a behavior in which in a case that the backoff timer received from the NW is zero or that the PDU session establishment request message is rejected for temporary reasons and there is no backoff timer information element itself notified from the network, the UE_A 10 transmits a new PDU session establishment request message. The tenth behavior may be a behavior in which in a case that another PLMN is selected, or that another NW slice is selected, the PDU session establishment request message is rejected for temporary reasons, and the backoff timer is not started for the APN/DNN of interest in the selected PLMN, or that the backoff timer received from the network is invalid, the UE_A 10 transmits a new PDU session establishment request message. The tenth behavior may be a behavior in which in a case that the PDU session establishment request message is rejected because the PDU types of the UE_A 10 and the network are different from each other, and that the Re-attempt information is not received in a case of a different PLMN being selected, or a PLMN not in an equivalent PLMN list is selected, or in a case that the PDP type is changed, or in a case that the terminal power is turned on/off or a USIM is inserted or removed, the UE_A 10 transmits a new PDU session establishment request message. The tenth behavior may be a behavior in which in a case that the first PDU session is rejected because the specified APN/DNN is not supported wirelessly in the connected PLMN, and that the backoff timer notified from a network is zero, the UE_A 10 transmits a new PDU session establishment request message.

An eleventh behavior in the present embodiment is a behavior in which the UE_A 10 ignores the first timer and the Re-attempt information. Specifically, the eleventh behavior may be a behavior in which in a case that the PDU session establishment request message is rejected because there is no PDN session context of interest in a handover from the non-3GPP, or in a case that the PDU session establishment request message is rejected because the number of bearers established in the PDN connection reaches the maximum allowed number, the UE_A 10 ignores the first timer and the Re-attempt information.

In present embodiment, the equivalent PLMN is a PLMN treated to be a PLMN the same as the same HPLMN in the network.

Next, the identification information in the present embodiment will be described. In the present embodiment, first identification information is information indicating whether or not the UE_A 10 supports the Reflective Quality of Service (RQoS). The first identification information may indicate whether or not the UE_A 10 supports an RQoS controlled in a UE-initiated manner and/or whether or not the UE_A 10 supports an RQoS controlled in a network-initiated manner. Note that the RQoS controlled in a UE-initiated manner may be an RQoS validated in a UE-initiated RQoS validation procedure and may be an RQoS invalidated in a first RQoS deactivation procedure. Furthermore, the RQoS controlled in a network-initiated manner may be an RQoS validated in a network-initiated RQoS validation procedure and may be an RQoS invalidated in a second RQoS deactivation procedure. The first identification information may correspond to fourth identification information or fifth identification information. Specifically, the first identification information may mean information indicating whether or not the UE_A 10 supports an RQoS for user data communication with the DN identified by the fourth identification information or for a PDU session identified by the fifth identification information. The first identification information may be information that includes the meaning of second identification information and/or third identification information. Specifically, the first identification information may mean information indicating whether or not the UE_A 10 supports an RQoS controlled via a Control Plane and/or a User Plane. Note that the RQoS controlled via the Control Plane may be an RQoS validated and/or invalidated via the Control Plane, and the RQoS controlled via the User Plane may be an RQoS validated and/or invalidated via the User Plane. The first identification information may be information that includes meaning of sixth identification information. Specifically, the first identification information may be information indicating whether or not the UE_A 10 supports an RQoS and indicating that the UE_A 10 requests an RQoS.

The second identification information in the present embodiment is information indicating whether or not the UE_A 10 supports an RQoS controlled via the Control Plane. The second identification information may indicate whether or not the UE_A 10 supports an RQoS controlled via the Control Plane in a UE-initiated manner and/or whether or not the UE_A 10 supports an RQoS controlled via the Control Plane in a network-initiated manner. The second identification information may correspond to the fourth identification information or the fifth identification information. Specifically, the second identification information may mean information indicating whether or not the UE_A 10 supports an RQoS controlled via the Control Plane for user data communication with the DN identified by the fourth identification information or for a PDU session identified by the fifth identification information. The second identification information may be information that includes meaning of seventh identification information. Specifically, the second identification information may be information indicating whether or not the UE_A 10 supports an RQoS controlled via the Control Plane and indicating that the UE_A 10 requests an RQoS controlled via the Control Plane.

The third identification information in the present embodiment is information indicating whether or not the UE_A 10 supports an RQoS controlled via the User Plane. The third identification information may indicate whether or not the UE_A 10 supports an RQoS controlled via the User Plane in a UE-initiated manner and/or whether or not the UE_A 10 supports an RQoS controlled via the User Plane in a network-initiated manner. The third identification information may correspond to the fourth identification information or the fifth identification information. Specifically, the third identification information may mean information indicating whether or not the UE_A 10 supports an RQoS controlled via the User Plane for user data communication with the DN identified by the fourth identification information or for a PDU session identified by the fifth identification information. The third identification information may be information that includes meaning of eighth identification information. Specifically, the third identification information may be information indicating whether or not the UE_A 10 supports an RQoS controlled via the User Plane and indicating that the UE_A 10 requests an RQoS controlled via the User Plane.

The fourth identification information in the present embodiment is the Data Network Name (DNN). The DNN may be information used to identify the Data Network (DN).

The fifth identification information in the present embodiment is a PDU session ID. The PDU session ID may be information used to identify the PDU Session.

The sixth identification information in the present embodiment is information indicating that the UE_A 10 requests that the RQoS is changed to be enabled (available state). The sixth identification information may indicate that the UE_A 10 requests that an RQoS controlled in a UE-initiated manner is changed to be enabled and/or that the UE_A 10 requests that an RQoS controlled in a network-initiated manner is changed to be enabled. Note that requesting that an RQoS is changed to be enabled may be requesting allowance of use of the RQoS. The sixth identification information may correspond to the fourth identification information and/or the fifth identification information. Specifically, the sixth identification information may mean information indicating that the UE_A 10 requests that an RQoS is changed to be enabled for user data communication with the DN identified by the fourth identification information or for a PDU session identified by the fifth identification information. The sixth identification information may be information that includes meaning of the seventh identification information and/or the eighth identification information. Specifically, the sixth identification information may mean information indicating that the UE_A 10 requests that an RQoS controlled via the Control Plane and/or the User Plane is changed to be enabled.

The seventh identification information in the present embodiment is information indicating that the UE_A 10 requests that an RQoS controlled via the Control Plane is changed to be enabled. The seventh identification information may indicate that the UE_A 10 requests that an RQoS controlled via the Control Plane in a UE-initiated manner is changed to be enabled and/or that the UE_A 10 requests that an RQoS controlled via the Control Plane in a network-initiated manner is changed to be enabled. The seventh identification information may correspond to the fourth identification information or the fifth identification information. Specifically, the seventh identification information may mean information indicating that the UE_A 10 requests that an RQoS controlled via the Control Plane is changed to be enabled for user data communication with the DN identified by the fourth identification information or for a PDU session identified by the fifth identification information.

The eighth identification information in the present embodiment is information indicating that the UE_A 10 requests that an RQoS controlled via the User Plane is changed to be enabled. The eighth identification information may indicate that the UE_A 10 requests that an RQoS controlled via the User Plane in a UE-initiated manner is changed to be enabled and/or that the UE_A 10 requests that an RQoS controlled via the User Plane in a network-initiated manner is changed to be enabled. The eighth identification information may correspond to the fourth identification information or the fifth identification information. Specifically, the eighth identification information may mean information indicating that the UE_A 10 requests that an RQoS controlled via the User Plane is changed to be enabled for user data communication with the DN identified by the eighth identification information or for a PDU session identified by the fifth identification information.

The 61st identification information in the present embodiment is information requesting the service authentication and/or authorization by the DN via the 3GPP interface in the DN connection. Furthermore, the 61st identification information may be information requesting the PDU session establishment authentication and/or authorization procedure to be performed in the registration procedure and/or the PDU session establishment procedure. In other words, the 61st identification information may be information requesting the service authentication and/or authorization by the DN via the 3GPP interface in the registration procedure and/or the PDU session establishment procedure. As a specific example, the 61st identification information may be a flag requesting the DN service authentication and/or authorization, may be a service name that can identify a certain DN service, may be a user identity, or may be a user profile identifier. Furthermore, the 61st identification information may be authentication and/or authorization request information.

The 71st identification information in the present embodiment is information for identifying belonging to the first NW slice. In other words, the 71st identification information may be information indicating that the UE_A 10 desires to establish a PDU session belonging to the first NW slice. As a specific example, the 71st identification information may be the NSSAI identifying the first NW slice. Note that the 71st identification information may be information for identifying a certain NW slice within the operator A network, or may be information for identifying the same NW slice in common in the operator B (other operators than the operator A). Furthermore, the 71st identification information may be information indicating the first NW slice configured from the HPLMN, may be information indicating the first NW slice acquired from the AMF_A 240 in the registration procedure, or may be information indicating the first NW slice allowed from the network. Furthermore, the 71st identification information may be information indicating the first NW slice stored for each PLMN.

The eleventh identification information in the present embodiment is information indicating whether or not the network supports an RQoS. The eleventh identification information may indicate whether or not the network supports an RQoS controlled in a UE-initiated manner and/or whether or not the network supports an RQoS controlled in a network-initiated manner. The eleventh identification information may correspond to fourteenth identification information or fifteenth identification information. Specifically, the eleventh identification information may mean information indicating whether or not the network supports an RQoS for user data communication with the DN identified by the fourteenth identification information or for a PDU session identified by the fifteenth identification information. The eleventh identification information may be information that includes meaning of twelfth identification information and/or thirteenth identification information. Specifically, the eleventh identification information may mean information indicating whether or not the network supports an RQoS controlled via the Control Plane and/or the User Plane. The eleventh identification information may be information that includes meaning of seventeenth identification information. Specifically, the eleventh identification information may be information indicating whether or not the network supports an RQoS and indicating that the network accepts an RQoS.

The twelfth identification information in the present embodiment is information indicating whether or not the network supports an RQoS controlled via the Control Plane. The twelfth identification information may indicate whether or not the network supports an RQoS controlled via the Control Plane in a UE-initiated manner and/or whether or not the network supports an RQoS controlled via the Control Plane in a network-initiated manner. The twelfth identification information may correspond to the fourteenth identification information or the fifteenth identification information. Specifically, the twelfth identification information may mean information indicating whether or not the network supports an RQoS controlled via the Control Plane for user data communication with the DN identified by the fourteenth identification information or for a PDU session identified by the fifteenth identification information. The twelfth identification information may be information that includes meaning of eighteenth identification information. Specifically, the twelfth identification information may be information indicating whether or not the network supports an RQoS controlled via the Control Plane and indicating that the network accepts an RQoS controlled via the Control Plane.

The thirteenth identification information in the present embodiment is information indicating whether or not the network supports an RQoS controlled via the User Plane. The thirteenth identification information may indicate whether or not the network supports an RQoS controlled via the User Plane in a UE-initiated manner and/or whether or not the network supports an RQoS controlled via the User Plane in a network-initiated manner. The thirteenth identification information may correspond to the fourteenth identification information or the fifteenth identification information. Specifically, the thirteenth identification information may mean information indicating whether or not the network supports an RQoS controlled via the User Plane for user data communication with the DN identified by the fourteenth identification information or for a PDU session identified by the fifteenth identification information. The thirteenth identification information may be information that includes meaning of nineteenth identification information. Specifically, the thirteenth identification information may be information indicating whether or not the network supports an RQoS controlled via the User Plane and indicating that the network accepts an RQoS controlled via the User Plane.

The fourteenth identification information in the present embodiment is a DNN. The fourteenth identification information may be a DNN allowed by the network or a DNN selected by the network. Furthermore, the fourteenth identification information may be the same DNN as the fourth identification information, or may be a different DNN.

The fifteenth identification information in the present embodiment is a PDU session ID. The fifteenth identification information may be a PDU session ID allowed by the network or a PDU session ID selected by the network. Furthermore, the fifteenth identification information may be the same PDU session ID as the fifth identification information, or may be a different PDU session ID.

The sixteenth identification information in the present embodiment is a timer value of the RQoS timer. The value indicated by the sixteenth identification information may be a value determined by a device in the core network, may be a value determined by an operator, or may be a value determined by a service operator other than the operator. Note that the sixteenth identification information may be transmitted and/or received in association with the identification information of one or more the eleventh to thirteenth identification information and the seventeenth to nineteenth identification information.

The seventeenth identification information in the present embodiment is information indicating that the network accepts changing an RQoS to be enabled. The seventeenth identification information may indicate that the network accepts changing an RQoS controlled in a UE-initiated manner to be enabled and/or that the network also accepts changing an RQoS controlled in a network-initiated manner to be enabled. Note that accepting changing an RQoS to be enabled may be allowing use of the RQoS. The seventeenth identification information may correspond to the fourteenth identification information or the fifteenth identification information. Specifically, the seventeenth identification information may mean information indicating that the network accepts changing an RQoS to be enabled for user data communication with the DN identified by the fourteenth identification information or for a PDU session identified by the fifteenth identification information. The seventeenth identification information may be information that includes meaning of the eighteenth identification information and/or the nineteenth identification information. Specifically, the seventeenth identification information may be information indicating that the network accepts changing an RQoS controlled via the Control Plane and/or the User Plane to be enabled.

The eighteenth identification information in the present embodiment is information indicating that the network accepts changing an RQoS controlled via the Control Plane to be enabled. The eighteenth identification information may indicate that the network accepts changing an RQoS controlled via the Control Plane in a UE-initiated manner to be enabled and/or that the network accepts changing an RQoS controlled via the Control Plane in a network-initiated manner to be enabled. The eighteenth identification information may correspond to the fourteenth identification information or the fifteenth identification information. Specifically, the eighteenth identification information may mean information indicating that the network accepts changing an RQoS controlled via the Control Plane to be enabled for user data communication with the DN identified by the fourteenth identification information or for a PDU session identified by the fifteenth identification information.

The nineteenth identification information in the present embodiment is information indicating that the network accepts changing an RQoS controlled via the User Plane to be enabled. The nineteenth identification information may indicate that the network accepts changing an RQoS controlled via the User Plane in a UE-initiated manner to be enabled and/or that the network accepts changing an RQoS controlled via the User Plane in a network-initiated manner to be enabled. The nineteenth identification information may correspond to the fourteenth identification information or the fifteenth identification information. Specifically, the nineteenth identification information may mean information indicating that the network accepts changing an RQoS controlled via the User Plane to be enabled for user data communication with the DN identified by the fourteenth identification information or for a PDU session identified by the fifteenth identification information.

The 21st identification information in the present embodiment is a Cause value. The Cause value may indicate a rejection cause, and specifically indicates at least one of that an RQoS is not allowed (rejected) to be changed to be enabled, that an RQoS controlled via the Control Plane and User Plane is not allowed (rejected) to be changed to be enabled, that an RQoS controlled via the Control Plane only is not allowed (rejected) to be change to be enabled, and that an RQoS controlled via the User Plane only is not allowed (rejected) to be changed to be enabled. Note that rejecting changing an RQoS to be enabled may indicate that use of the RQoS is not allowed. Furthermore, the 21st identification information may be information indicating that a part of the request is rejected. The 21st identification information may be information including the meaning indicated by one or multiple 22nd to 29th identification information. The 21st identification information may correspond to 25th identification information or 26th identification information. Specifically, the 21st identification information may mean a Cause value for a DN identified by the 25th identification information, or a Cause value for a PDU session identified by the 26th identification information. The 21st identification information may correspond to a Registration Area (RA), a Tracking Area (TA), or an Access Network (AN). Specifically, the 21st identification information may mean a Cause value for the registration area, the tracking area, or the access network. Specifically, the 21st identification information may be a Cause value indicating that an RQoS is not allowed in the DN identified by the 25th identification information, or a Cause value indicating that an RQoS is not allowed in the PDU session identified by the 26th identification information. Furthermore, the 21st identification information may be a Cause value indicating that an RQoS is not allowed in a registration area and/or tracking area to which the UE_A 10 currently belongs, or a Cause value indicating that an RQoS is not allowed in an access network to which the UE_A 10 is connected. Note that the Cause value indicated by the 21st identification information may not be limited to these.

The 22nd identification information in the present embodiment is information indicating that the network does not support an RQoS. The 22nd identification information may indicate that the network does not support an RQoS controlled in a UE-initiated manner and/or that the network does not support an RQoS controlled in a network-initiated manner. The 22nd identification information may correspond to the 25th identification information or the 26th identification information. In this case, the 22nd identification information may mean information indicating that the network does not support an RQoS for user data communication with the DN identified by the 25th identification information or for a PDU session identified by the 26th identification information. The 22nd identification information may correspond to a registration area, a tracking area, or an access network. In this case, the 22nd identification information may mean information indicating that the network does not support an RQoS for the registration area, the tracking area, or the access network. The 22nd identification information may be information that includes meaning of the 23rd identification information and/or the 24th identification information. Specifically, the 22nd identification information may be information indicating that the network does not support an RQoS controlled via the Control Plane and/or the User Plane. The 22nd identification information may be information that includes meaning of the 27th identification information. Specifically, the 22nd identification information may be information indicating that the network does not support an RQoS and indicating that the network does not allow (rejects) an RQoS.

The 23rd identification information in the present embodiment is information indicating that the network does not support an RQoS controlled via the Control Plane. The 23rd identification information may indicate that the network does not support an RQoS controlled via the Control Plane in a UE-initiated manner and/or that the network does not support an RQoS controlled via the Control Plane in a network-initiated manner. The 23rd identification information may correspond to the 25th identification information or the 26th identification information. Specifically, the 23rd identification information may mean information indicating that the network does not support an RQoS controlled via the Control Plane for user data communication with the DN identified by the 25th identification information or for a PDU session identified by the 26th identification information. The 23rd identification information may correspond to a registration area, a tracking area, or an access network. Specifically, the 23rd identification information may mean information indicating that the network does not support an RQoS controlled via the Control Plane for the registration area, the tracking area, or the access network. The 23rd identification information may be information that includes meaning of the 28th identification information. Specifically, the 23rd identification information may be information indicating that the network does not support an RQoS controlled via the Control Plane and indicating that the network does not allow (rejects) an RQoS controlled via the Control Plane.

The 24th identification information in the present embodiment is information indicating that the network does not support an RQoS controlled via the User Plane. The 24th identification information may indicate that the network does not support an RQoS controlled via the User Plane in a UE-initiated manner and/or that the network does not support an RQoS controlled via the User Plane in a network-initiated manner. The 24th identification information may correspond to the 25th identification information or the 26th identification information. Specifically, the 24th identification information may mean information indicating that the network does not support an RQoS controlled via the User Plane for user data communication with the DN identified by the 25th identification information or for a PDU session identified by the 26th identification information. The 24th identification information may correspond to a registration area, a tracking area, or an access network. Specifically, the 24th identification information may mean information indicating that the network does not support an RQoS controlled via the User Plane for the registration area, the tracking area, or the access network. The 24th identification information may be information that includes meaning of the 29th identification information. Specifically, the 24th identification information may be information indicating that the network does not support an RQoS controlled via the User Plane and indicating that the network does not allow (rejects) an RQoS controlled via the User Plane.

The 25th identification information in the present embodiment is a DNN. The 25th identification information may be a DNN not allowed by the network or information indicating that a DNN identified by the fourth identification information is not allowed. Furthermore, the 25th identification information may be the same DNN as the fourth identification information.

The 26th identification information in the present embodiment is a PDU Session ID. The 26th identification information may be a PDU session ID not allowed by the network or information indicating that a PDU session ID identified by the fifth identification information is not allowed. Furthermore, the 26th identification information may be the same PDU session ID as the fifth identification information.

The 27th identification information in the present embodiment is information indicating that the network does not allow (rejects) changing an RQoS to be enabled. The 27th identification information may indicate that the network does not allow (rejects) changing an RQoS controlled in a UE-initiated manner to be enabled and/or that the network does not allow (rejects) changing an RQoS controlled in a network-initiated manner to be enabled. The 27th identification information may correspond to the 25th identification information or the 26th identification information. Specifically, the 27th identification information may mean information indicating that the network does not allow (rejects) changing an RQoS to be enabled for user data communication with the DN identified by the 25th identification information or for a PDU session identified by the 26th identification information. The 27th identification information may correspond to a registration area, a tracking area, or an access network. Specifically, the 27th identification information may mean information indicating that the network does not allow (rejects) changing an RQoS to be enabled for the registration area, the tracking area, or the access network. The 27th identification information may be information that includes meaning of the 28th identification information and/or the 29th identification information. Specifically, the 27th identification information may be information indicating that the network does not allow (rejects) changing an RQoS controlled via the Control Plane and/or the User Plane to be enabled.

The 28th identification information in the present embodiment is information indicating that the network does not allow (rejects) changing an RQoS controlled via the Control Plane to be enabled. The 28th identification information may indicate that the network does not allow (rejects) changing an RQoS controlled via the Control Plane in a UE-initiated manner to be enabled and/or that the network does not allow (rejects) changing an RQoS controlled via the Control Plane in a network-initiated manner to be enabled. The 28th identification information may correspond to the 25th identification information or the 26th identification information. Specifically, the 28th identification information may mean information indicating that the network does not allow (rejects) changing an RQoS controlled via the Control Plane to be enabled for user data communication with the DN identified by the 25th identification information or for a PDU session identified by the 26th identification information. The 28th identification information may correspond to a registration area, a tracking area, or an access network. Specifically, the 28th identification information may mean information indicating that the network does not allow (rejects) changing an RQoS controlled via the Control Plane to be enabled for the registration area, the tracking area, or the access network.

The 29th identification information in the present embodiment is information indicating that the network does not allow (rejects) changing an RQoS controlled via the User Plane to be enabled. The 29th identification information may indicate that the network does not allow (rejects) changing an RQoS controlled via the User Plane in a UE-initiated manner to be enabled and/or that the network does not allow (rejects) changing an RQoS controlled via the User Plane in a network-initiated manner to be enabled. The 29th identification information may correspond to the 25th identification information or the 26th identification information. Specifically, the 29th identification information may mean information indicating that the network does not allow (rejects) changing an RQoS controlled via the User Plane to be enabled for user data communication with the DN identified by the 25th identification information or for a PDU session identified by the 26th identification information. The 29th identification information may correspond to a registration area, a tracking area, or an access network. Specifically, the 29th identification information may mean information indicating that the network does not allow (rejects) changing an RQoS controlled via the User Plane to be enabled for the registration area, the tracking area, or the access network.

In the present embodiment, 72nd identification information is information indicating a cause value (cause) indicating that the present procedure is rejected. The 72nd identification information may be information indicating that a request for establishment of a PDU session for connecting to a DN is rejected. In other words, the 72nd identification information may be information indicating that a request for establishment of a PDU session belonging to the first slice is rejected, or information indicating that establishment of a PDU session belonging to the first slice is not allowed. Here, the first slice may be a slice indicated by the 71st identification information, or a different slice. Furthermore, the 72nd identification information may be information indicating that establishment of a PDU session belonging to the first slice is not allowed in the DN identified by the 25 identification information, or information indicating that establishment of a PDU session belonging to the first slice is not allowed in the PDU session identified by the 26th identification information. Furthermore, the 72nd identification information may be information indicating that establishment of a PDU session belonging to the first slice is not allowed in a registration area and/or tracking area to which the UE_A 10 currently belongs, or information indicating that establishment of a PDU session belonging to the first slice is not allowed in an access network to which the UE_A 10 is connected. Note that the cause value that is indicated by the 72nd identification information and indicates the present procedure being rejected is may not be limited to these. Furthermore, the 72nd identification information may be information indicating a value of the first timer. The UE_A 10 may configure, based on the reception of the 72nd identification information, the first timer to a value indicated by the 72nd identification information, to a timer value configured in another manner, or to a random value. Furthermore, the 72nd identification information may be an identifier for identifying NW slice information to which a rejected PDU session request belongs. Note that the NW slice indicated by the 72nd identification information may be the same NW slice as the NW slice indicated by the 71st identification information, or a different NW slice. Furthermore, the 72nd identification information may be an identifier by which the NW indicates reconnection after the PDU session is rejected. Furthermore, the UE_A 10 may start to run the set timer based on the rejection cause value, the NW slice information, and the identifier indicating the reconnection from the NW.

In the present embodiment, 31st identification information is a Reflective QoS Indication (RQI). The RQI may be information indicating that an RQoS is validated, or information indicating that an RQoS is to be validated. To be more specific, the 31st identification information may be information indicating that an RQoS is validated for user data communication of downlink packets, or may be information indicating that an RQoS is validated for user data communication of uplink packets. Furthermore, the 31st identification information may be information requesting to create a QoS rule for the user data communication of the uplink packets.

In the present embodiment, 32nd identification information is a QFI. The 32nd identification information may be information for identifying a QoS flow. Furthermore, the 32nd identification information may be information indicating a flow through which the downlink packets with the RQoS being validated are forwarded, or information indicating a flow through which the uplink packets are forwarded after the RQoS is validated. Furthermore, the 32nd identification information may be information requesting to use the QoS flow indicated by the 32nd identification information for the user data communication of the uplink packets. Furthermore, the 32nd identification information may be information requesting to create a QoS rule for the user data communication of the uplink packets using the QoS flow indicated by the 32nd identification information.

In the present embodiment, 41st identification information is information indicating that an RQoS is requested in a UE-initiated manner, or information indicating that RQoS validation is requested in a UE-initiated manner. To be more specific, the 41st identification information may be information requesting RQoS validation for user data communication of uplink packets and/or downlink packets. Furthermore, the 41st identification information may be information requesting to create a QoS rule for the user data communication of the uplink packets and/or the downlink packets. Furthermore, the 41st identification information may be information requesting to initiate the network-initiated RQoS validation procedure.

In the present embodiment, 42nd identification information is a QoS Flow ID (QFI). The QFI is information used to identify the flow applying an RQoS. The 42nd identification information may be information for identifying a QoS flow. Furthermore, the 42nd identification information may be information indicating a flow through which uplink packets and/or downlink packets are forwarded after the RQoS is validated. Furthermore, the 42nd identification information may be information requesting to use the QoS flow indicated by the 42nd identification information for user data communication of the uplink packets and/or the downlink packets. Furthermore, the 42nd identification information may be information requesting to create a QoS rule for the user data communication of the uplink packets and/or the downlink packets using the QoS flow indicated by the 42nd identification information. Furthermore, the 42nd identification information may be information requesting to initiate the network-initiated RQoS validation procedure, or information requesting that the QoS flow used in the network-initiated RQoS validation procedure is an RQoS flow indicated by the 42nd identification information.

In the present embodiment, 51st identification information is information indicating that an RQoS is not allowed (is rejected), or information indicating that a request for RQoS validation is not allowed (is rejected). Furthermore, the 51st identification information may be information indicating a cause that the request from the UE_A 10 is rejected. Note that the cause that the request from the UE_A 10 is rejected may be information indicating that an RQoS is not allowed to be validated in an access network, and/or a registration area, and/or a tracking area to which the UE_A 10 currently connects, or information indicating that an RQoS is not allowed to be validated in uplink packets through which the UE_A 10 requests the RQoS validation. Furthermore, the cause that the request from the UE_A 10 is rejected may be information indicating that an RQoS validation is temporarily prohibited, or information indicating that the UE-initiated RQoS validation procedure is prohibited. Note that the cause that the request from the UE_A 10 is rejected may be information indicating that the network cannot accept the UE-initiated RQoS validation procedure, but is not limited thereto.

In the present embodiment, 62nd identification information is authentication and/or authorization information issued by a DN which is acquired by the SMF_A 230 in an authentication and/or authorization procedure with the DN. As a specific example, the 62nd identification information may be a service name which the DN authenticates and/or authorizes, or may be an authorization flag. Furthermore, the 62nd identification information may be information indicating that the DN_A 5 performs authentication and/or authorization for a PDU session, and/or the UE_A 10, and/or an application. Furthermore, the 62nd identification information may be information of the UE_A 10 and/or the application and/or a user for requesting to confirm the authentication and/or authorization information issued by the DN indicated by the 62nd identification information. Furthermore, the 62nd identification information may be information of the UE_A 10 and/or the application and/or the user for requesting to select service usage from among the service names authenticated and/or authorized by the DN indicated by the 62nd identification information.

In the present embodiment, 63rd identification information is information indicating a response to authentication and/or authorization information issued by a DN which is acquired by the SMF_A 230 in an authentication and/or authorization procedure with the DN. As a specific example, the 63rd identification information may be information indicating a message response to the 62nd identification information, information indicating the same content as the information indicated by the 62nd identification information, or information indicating the service name of the service usage selected by the UE_A 10 from among the service names in the 62nd identification information. Furthermore, the 63rd identification information may be information of the UE_A 10 and/or the application and/or the user for indicating that the confirmation of the authentication and/or authorization information issued by the DN indicated by the 62nd identification information is performed. Furthermore, the 63rd identification information may be information indicating that the UE_A 10 and/or the application and/or the user have selected the service usage from among the service names authenticated and/or authorized by the DN indicated by the 62nd identification information. Furthermore, the 63rd identification information may be DN authentication and/or authorization response information.

Figure 8:
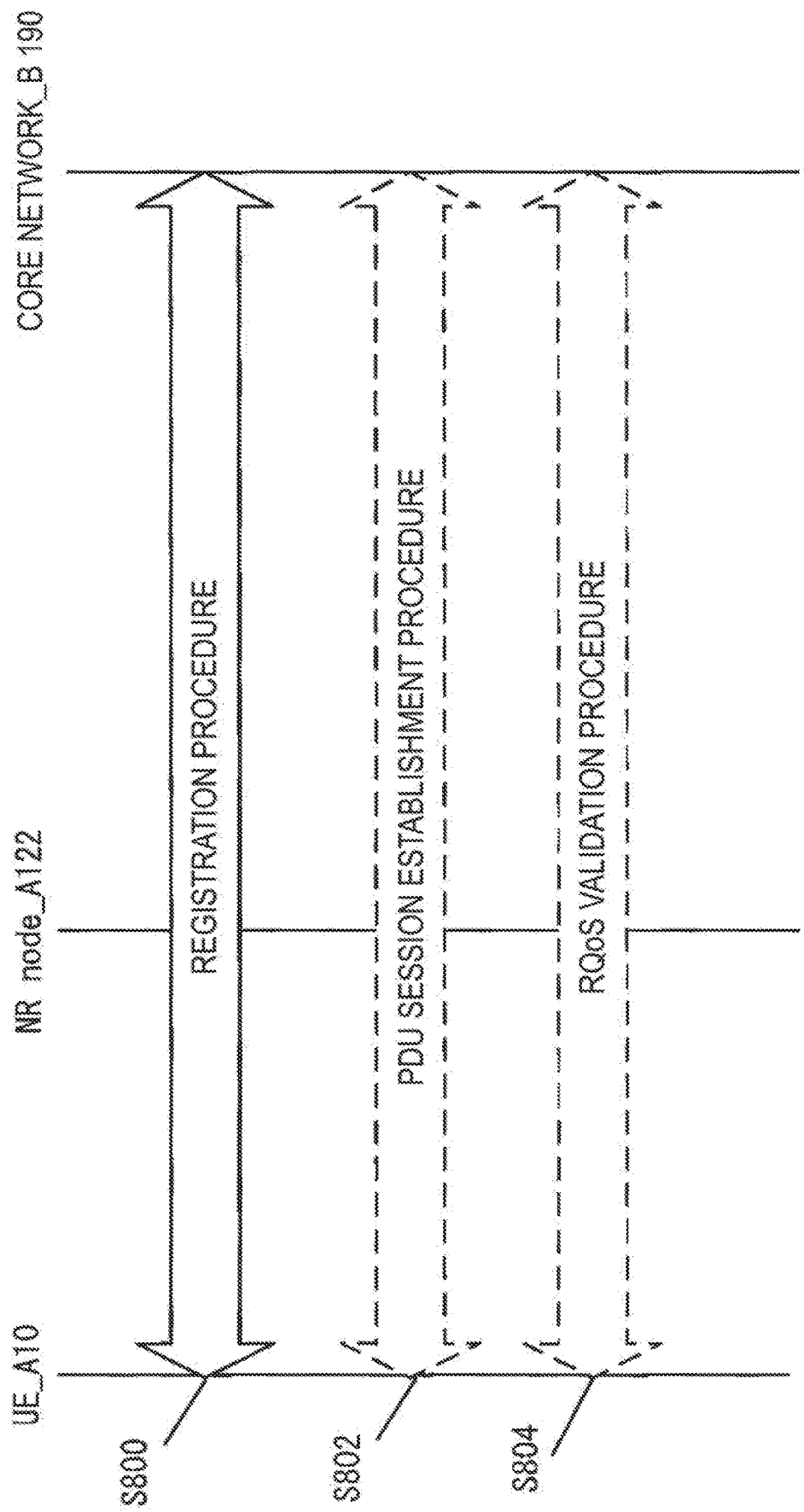
FIG. 8 is a diagram illustrating an initial procedure.

Next, the initial procedure according to the present embodiment will be described with reference to FIG. 8. Hereinafter, the initial procedure is also referred to as the present procedure, and the initial procedure (the present procedure) includes a Registration procedure, a PDU session establishment procedure, and a Reflective Quality of Service (QoS) (RQoS) validation procedure. Details of the registration procedure, the PDU session establishment procedure, and the RQoS validation procedure are described later.

Specifically, each device performs the registration procedure (S800), and thereby, the UE_A 10 transitions to a state of being registered in the network (RM-REGISTERED state). Next, each device performs the PDU session establishment procedure (S802), and thereby, the UE_A 10 establishes a PDU session with the DN_A 5 providing a PDU connection service via the core network_B 190, and transitions to a state in which the PDU session is established between the devices. Note that the PDU session is assumed to be established via the access network and the UPF_A 235, but is not limited thereto. That is, there may be a UPF (UPF_C 239) different from the UPF_A 235 between the UPF_A 235 and the access network. At this time, the PDU session is established via the access network, the UPF_C 239, and the UPF_A 235.

Next, each device performs the RQoS validation procedure (S804), and thereby, creates a certain QoS rule for certain user data. Furthermore, each device further transitions to a state capable of performing the user data communication using a certain QoS flow associated with the certain QoS rule for the certain user data based on the creation of the certain QoS rule.

Next, each device, after transitioning to the state capable of performing the user data communication using the certain QoS flow, performs the RQoS deactivation procedure, and deletes the certain QoS rule for the certain user data. Furthermore, each device transitions to a state incapable of performing the user data communication using the certain QoS flow associated with the certain QoS rule for the certain user data based on the deletion of the certain QoS rule. As described above, the present procedure is completed.

Note that each device may exchange various capability information and/or various request information of the device in the registration procedure and/or the PDU session establishment procedure. In a case that each device negotiates the exchange of various information and/or various requests in the registration procedure, the device may not negotiate the exchange of various information and/or various requests in the PDU session establishment procedure. In a case that each device does not negotiate the exchange of various information and/or various requests in the registration procedure, the device may negotiate the exchange of various information and/or various requests in the PDU session establishment procedure. Even in the case that each device negotiates the exchange of various information and/or various requests in the registration procedure, the device may negotiate the exchange of various information and/or various requests in the PDU session establishment procedure.

Each device may perform the PDU session establishment procedure in the registration procedure, or after completion of the registration procedure. In a case that the PDU session establishment procedure is performed in the registration procedure, the PDU session establishment request message may be included in a registration request message and transmitted and/or received, and the PDU session establishment accept message may be included in a registration accept message and transmitted and/or received, a PDU session establishment complete message may be included in a registration complete message and transmitted and/or received, and a PDU session establishment reject message may be included in a registration reject message and transmitted and/or received. In a case that the PDU session establishment procedure is performed in the registration procedure, each device may establish a PDU session based on the completion of the registration procedure, or may transition to the state in which the PDU session is established between the devices.

Each device involved in the present procedure may transmit and/or receive each control message described in the present procedure to transmit and/or receive one or more identification information included in each control message, and may store each transmitted and/or received identification information as a context.

1.3.1. Overview of Registration Procedure

First, an overview of the registration procedure will be described. The registration procedure is a procedure initiated by the UE_A 10 to register to the network (the access network, and/or the core network_B 190, and/or the DN (DN_A 5)). In a case that the UE_A 10 is in a state of not being registered with the network, the UE_A 10 can perform the present procedure at any timing such as a timing of turning on the terminal power. In other words, the UE_A 10 may initiate the present procedure at any timing in a case of the deregistered state (RM-DEREGISTERED state). Each device may transition to the registered state (RM-REGISTERED state), based on completion of the registration procedure.

The present procedure may be a procedure to update location registration information of the UE_A 10 in the network, and/or to regularly notify the network of a state of the UE_A 10 from the UE_A 10, and/or to update certain parameters related to the UE_A 10 in the network.

The UE_A 10 may initiate the present procedure in a case that the UE_A 10 performs mobility across TAs. In other words, the UE_A 10 may initiate the present procedure in a case that the UE_A 10 moves to a TA different from a TA indicated in a held TA list. Furthermore, the UE_A 10 may initiate the present procedure in a case that the running timer expires. Furthermore, the UE_A 10 may initiate the present procedure in a case that a context of each device needs to be updated due to disconnection or invalidation (also referred to as deactivation) of a PDU session. Furthermore, the UE_A 10 may initiate the present procedure in a case that a change occurs in the capability information and/or preference concerning the PDU session establishment of the UE_A 10. Furthermore, the UE_A 10 may initiate the present procedure regularly. Note that the UE_A 10 is not limited to this, and can perform the present procedure at any timing as long as in a state in which the PDU session is established.

1.3.1.1. Example of Registration Procedure

Figure 9:
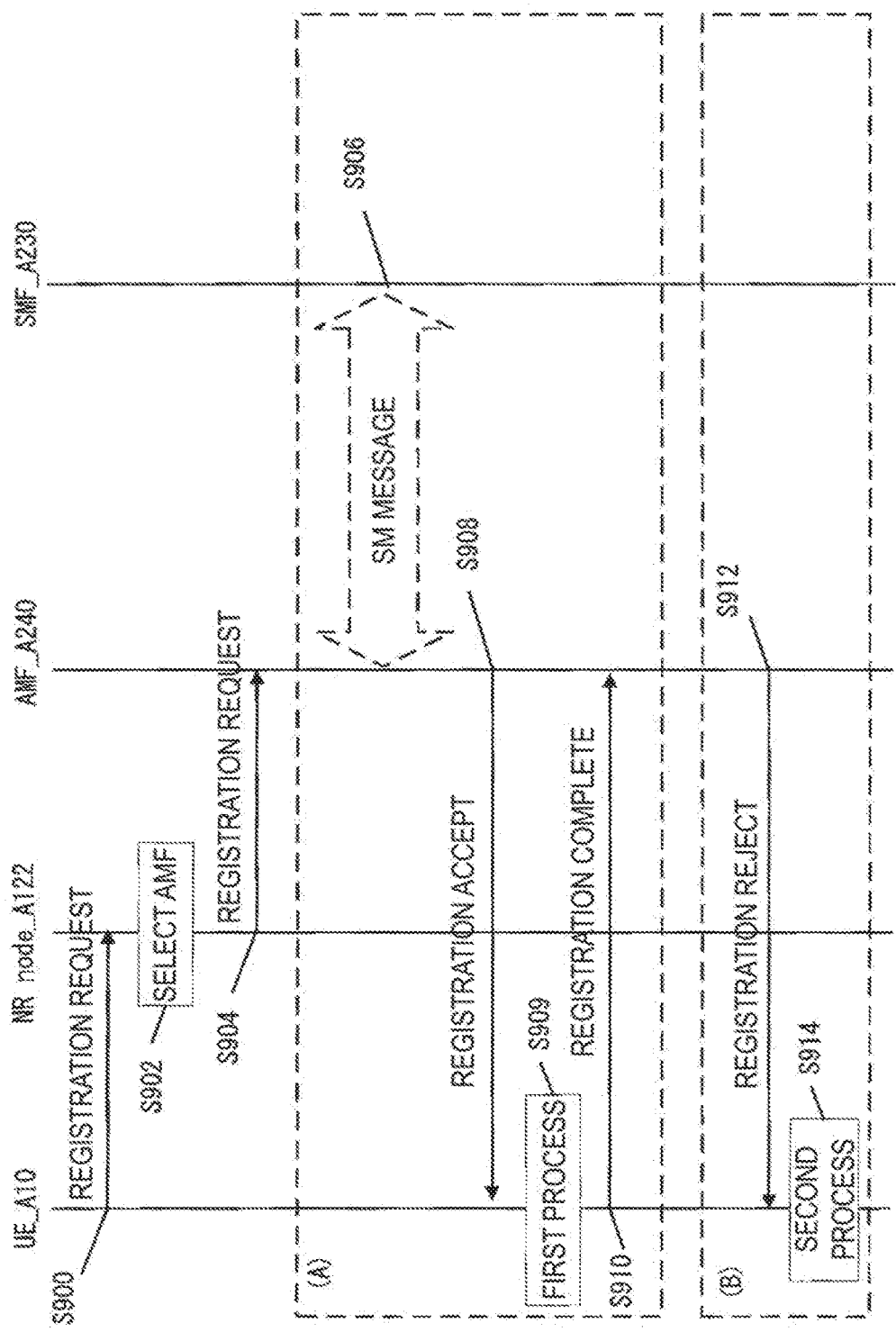
FIG. 9 is a diagram illustrating a registration procedure.

An example of a process of performing the registration procedure will be described with reference to FIG. 9. In this section, the present procedure refers to the registration procedure. Each step of the present procedure will be described below.

First, the UE_A 10 transmits a Registration Request message to the AMF_A 240 via the NR node (also referred to as the gNB)_A 122 (S900) (S902) (S904) to initiate the registration procedure. The UE_A 10 may transmit the registration request message including a Session Management (SM) message (e.g., a PDU session establishment request message), or the registration request message together with an SM message (e.g., a PDU session establishment request message) to initiate a procedure for the SM, such as the PDU session establishment procedure, during the registration procedure.

Specifically, the UE_A 10 transmits a Radio Resource Control (RRC) message including the registration request message to the NR node_A 122 (S900). The NR node_A 122, in a case of receiving the RRC message including the registration request message, retrieves the registration request message in the RRC message and selects the AMF_A 240 as the NF or the common CP function to which the registration request message is routed (S902). Here, the NR node_A 122 may select the AMF_A 240, based on information included in the RRC message. The NR node_A 122 transmits or forwards the registration request message to the selected AMF_A 240 (S904).

Note that the registration request message is a Non-Access-Stratum (NAS) message transmitted and/or received on the N1 interface. The RRC message is a control message transmitted and/or received between the UE_A 10 and the NR node_A 122. The NAS message is processed in a NAS layer, the RRC message is processed in an RRC layer, and the NAS layer is the higher layer than the RRC layer.

In a case of multiple NSIs to which registration is requested, the UE_A 10 may transmit a registration request message for each NSI, or multiple registration request messages included in one or more RRC messages. The multiple registration request messages described above included in one or more RRC messages may be transmitted as one registration request message.

Here, the UE_A 10 may include one or more identification information among the first to eighth identification information, the 61st identification information, and the 71st identification information in the registration request message and/or in the RRC message. Note that two or more identification information of these identification information may be configured as one or more identification information.

Furthermore, the UE_A 10 may transmit one or more identification information among the first to eighth identification information included in the registration request message and/or the RRC message to indicate that the UE_A 10 supports an RQoS, or request to transition to a state in which an RQoS is available.

Furthermore, the UE_A 10 may transmit one or more identification information among the first to eighth identification information included in the registration request message and/or the RRC message to indicate that the UE_A 10 does not support an RQoS, or indicate that the UE_A 10 does not request to transition to a state in which an RQoS is available.

To be more specific, the UE_A 10 may transmit the first identification information and/or the second identification information and/or the sixth identification information and/or the seventh identification information included in the registration request message and/or the RRC message to indicate that the UE_A 10 supports an RQoS controlled via the Control Plane, or request to transition to a state in which an RQoS controlled via the Control Plane is available. In this case, the UE_A 10 may transmit the registration request message and/or the RRC message without including the third identification information and/or the eighth identification information to indicate that the UE_A 10 does not support an RQoS controlled via the User Plane, or indicate that the UE_A 10 does not request to transition to a state in which an RQoS controlled via the User Plane is available.

The UE_A 10 may transmit the first identification information and/or the second identification information and/or the sixth identification information and/or the seventh identification information included in the registration request message and/or the RRC message to indicate that the UE_A 10 does not support an RQoS controlled via the Control Plane, or indicate that the UE_A 10 does not request to transition to a state in which an RQoS controlled via the Control Plane is available.

Furthermore, the UE_A 10 may transmit the first identification information and/or the third identification information and/or the sixth identification information and/or the eighth identification information included in the registration request message and/or the RRC message to indicate that the UE_A 10 supports an RQoS controlled via the User Plane, or request to transition to a state in which an RQoS controlled via the User Plane is available. In this case, the UE_A 10 may transmit the registration request message and/or the RRC message without including the second identification information and/or the seventh identification information to indicate that the UE_A 10 does not support an RQoS controlled via the Control Plane, or indicate that the UE_A 10 does not request to transition to a state in which an RQoS controlled via the Control Plane is available.

The UE_A 10 may transmit the first identification information and/or the third identification information and/or the sixth identification information and/or the eighth identification information included in the registration request message and/or the RRC message to indicate that the UE_A 10 does not support an RQoS controlled via the User Plane, or indicate that the UE_A 10 does not request to transition to a state in which an RQoS controlled via the User Plane is available.

Furthermore, the UE_A 10 may transmit one or more identification information among the first to third identification information and the sixth to eighth identification information with being associated with the fourth identification information to indicate whether or not the UE_A 10 supports an RQoS, or whether or not the UE_A 10 requests to transition to a state in which an RQoS is available, for a PDU session established to a DN identified by the fourth identification information.

Furthermore, the UE_A 10 may transmit one or more identification information among the first to third identification information and the sixth to eighth identification information with being associated with the fifth identification information to indicate whether or not the UE_A 10 supports an RQoS, or whether or not the UE_A 10 requests to transition to a state in which an RQoS is available, for a PDU session identified by the fifth identification information.

Furthermore, the UE_A 10 may transmit one or more identification information among the first to eighth identification information included in the registration request message and/or the RRC message to indicate whether not the UE_A 10 supports an RQoS controlled in a UE-initiated manner, or whether not the UE_A 10 requests to transition to a state in which an RQoS controlled in a UE-initiated manner is available.

Furthermore, the UE_A 10 may transmit one or more identification information among the first to eighth identification information included in the registration request message and/or the RRC message to indicate whether not the UE_A 10 supports an RQoS controlled in a network-initiated manner, or whether not the UE_A 10 requests to transition to a state in which an RQoS controlled in a network-initiated manner is available.

The UE_A 10 may transmit the first identification information, or transmit the second identification information and the third identification information, or transmit the sixth identification information, or transmit the seventh identification information and the eighth identification information, or transmit, in a case that two or more identification information of these identification information are configured as one or more identification information, one or more of these configured identification information, to indicate that the UE_A 10 supports an RQoS controlled via the Control Plane and the UE_A 10 supports an RQoS controlled via the User Plane, or request to transition to a state in which an RQoS controlled via the User Plane is available and transition to a state in which an RQoS controlled via the User Plane is available.

Furthermore, the UE_A 10 may transmit the 61st identification information and/or the fourth identification information and/or the fifth identification information included in the registration request message and/or the RRC message to request the service authentication and/or authorization by the DN via the 3GPP interface (such as the N6 interface), or request to perform the PDU session establishment authentication and/or authorization procedure in the present procedure.

To be more specific, the UE_A 10 may transmit the 61st identification information and the fourth identification information with being association with each other to request the service authentication and/or authorization by the DN_A 5 via the 3GPP interface, or request to perform the PDU session establishment authentication and/or authorization procedure in the present procedure, in a PDU session established to a DN identified by the fourth identification information.

Furthermore, the UE_A 10 may transmit the 61st identification information and the fifth identification information with being association with each other to request the service authentication and/or authorization by the DN_A 5 via the 3GPP interface, or request to perform the PDU session establishment authentication and/or authorization procedure in the present procedure, in a PDU session identified by the fifth identification information.

Furthermore, the UE_A 10 may transmit the 71st identification information and/or the fourth identification information and/or the fifth identification information included in the registration request message and/or the RRC message to request establishment of a PDU session belonging to a network slice, indicate a network slice to which a PDU session requested by the UE_A 10 belongs, or indicate a network slice to which a PDU session is to belong.

To be more specific, the UE_A 10 may transmit the 71st identification information and the fourth identification information with being associated with each other to request establishment of a PDU session belonging to a network slice, indicate a network slice to which a PDU session requested by the UE_A 10 belongs, or indicate a network slice to which a PDU session is to belong, in a PDU session established to a DN identified by the fourth identification information.

Furthermore, the UE_A 10 may transmit the 71st identification information and the fifth identification information with being associated with each other to request establishment of a PDU session belonging to a network slice, indicate a network slice to which a PDU session requested by the UE_A 10 belongs, or indicate a network slice to which a PDU session is to belong, in a PDU session identified by the fifth identification information.

Furthermore, the UE_A 10 may transmit two or more pieces identification information among the first to eighth identification information, the 61st identification information, and the 71st identification information with being combined with each other to perform the request combined with the above described matters. Note that the matters indicated by the UE_A 10 transmitting the identification information may not be limited to these.

Note that the UE_A 10 may determine which identification information among the first to eighth identification information, the 61st identification information, and the 71st identification information is to be included in the registration request message, based on the capability information of the UE_A 10, and/or a policy such as a UE policy, and/or a preference of the UE_A 10, and/or the application (higher layer). Note that the determination performed by the UE_A 10 as to which identification information is to be included in the registration request message is not limited to the determination described above.

The UE_A 10 may transmit these identification information included in a control message (e.g., a NAS message or an RRC message) different from the registration request message.

The AMF_A 240, in a case of receiving the registration request message and/or the control message different from the registration request message, performs a first condition determination. The first condition determination is for the AMF_A 240 to determine whether to accept a request of the UE_A 10. In the first condition determination, the AMF_A 240 determines whether the first condition determination is true or false. In a case that the first condition determination is true (that is, in a case that the network accepts the request of the UE_A 10), the AMF_A 240 initiates a procedure (A) in the present procedure, and in a case that the first condition determination is false (that is, in a case that the network does not accept the request of the UE_A 10), the AMF_A 240 initiates a procedure (B) in the present procedure.

Hereinafter, steps in the case that the first condition determination is true, that is, the steps in the procedure (A) in the present procedure will be described. The AMF_A 240 performs a fourth condition determination to initiate the procedure (A) in the present procedure. The fourth condition determination is for the AMF_A 240 to determine whether to transmit and/or receive an SM message to and/or from the SMF_A 230. In other words, the fourth condition determination may be for the AMF_A 240 to determine whether to perform the PDU session establishment procedure in the present procedure. In a case that the fourth condition determination is true (i.e., in a case that the AMF_A 240 is to transmit and/or receive an SM message to and/or from SMF_A 230), the AMF_A 240 selects the SMF_A 230, and transmits and/or receives an SM message to and/or from the selected SMF_A 230, and in a case that the fourth condition determination is false (i.e., in a case that the AMF_A 240 does not transmit and/or receive an SM message to and/or from the SMF_A 230), the AMF_A 240 omits those operations (S906). Note that in a case that the AMF_A 240 receives an SM message indicating rejection from the SMF_A 230, the AMF_A 240 may stop the procedure (A) in the present procedure and initiate the procedure (B) in the present procedure.

Furthermore, the AMF_A 240 transmits a Registration Accept message to the UE_A 10 via the NR node_A 122, based on the reception of the registration request message from the UE_A 10 and/or completion of the transmission and/or reception of the SM message to and/or from the SMF_A 230 (S908). For example, in the case that the fourth condition determination is true, the AMF_A 240 may transmit the registration accept message, based on the reception of the registration request message from the UE_A 10. In the case that the fourth condition determination is false, the AMF_A 240 may transmit the registration accept message, based on the completion of the transmission and/or reception of the SM message to and/or from the SMF_A 230. Here, the registration accept message may be transmitted as a response message to the registration request message. The registration accept message is a NAS message transmitted and/or received on the N1 interface, and for example, the AMF_A 240 may transmit a registration accept message as a control message of the N2 interface to the NR node_A 122 and the NR node_A 122 that receives the control message may transmit the received control message included in the RRC message to the UE_A 10.

Furthermore, in the case that the fourth condition determination is true, the AMF_A 240 may transmit an SM message (e.g., a PDU session establishment accept message) included in the registration accept message, or transmit an SM message (e.g., a PDU session establishment accept message) together with the registration accept message. This transmission method may be performed in a case that the SM message (e.g., a PDU session establishment request message) is included in the registration request message, and the fourth condition determination is true. This transmission method may be performed in a case that the SM message (e.g., a PDU session establishment request message) is included together with the registration request message, and the fourth condition determination is true. The AMF_A 240 may perform such a transmission method to indicate that a procedure for the SM is accepted.

Here, the AMF_A 240 may include one or more identification information among the eleventh to nineteenth identification information in the registration accept message, or may indicate that the request of the UE_A 10 is accepted, by including these identification information. Note that two or more identification information of these identification information may be configured as one or more identification information.

Furthermore, the AMF_A 240 may transmit one or more identification information among the eleventh to nineteenth identification information included in the registration accept message to indicate that the network supports an RQoS, or that a request to transition to a state in which an RQoS is available is accepted.

To be more specific, the AMF_A 240 may transmit the eleventh identification information and/or the twelfth identification information and/or the seventeenth identification information and/or the eighteenth identification information included in the registration accept message to indicate that the network supports an RQoS controlled via the Control Plane, or that a request to transition to a state in which an RQoS controlled via the Control Plane is available is accepted. In this case, the AMF_A 240 may transmit the registration accept message without including the thirteenth identification information and/or the nineteenth identification information to indicate that the network does not support an RQoS controlled via the User Plane, or that a request to transition to a state in which an RQoS controlled via the User Plane is available is rejected.

The AMF_A 240 may transmit the eleventh identification information and/or the twelfth identification information and/or the seventeenth identification information and/or the eighteenth identification information included in the registration accept message to indicate that the network does not support an RQoS controlled via the Control Plane, or that a request to transition to a state in which an RQoS controlled via the Control Plane is available is rejected.

Furthermore, the AMF_A 240 may transmit the eleventh identification information and/or the thirteenth identification information and/or the seventeenth identification information and/or the nineteenth identification information included in the registration accept message to indicate that the network supports an RQoS controlled via the User Plane, or that a request to transition to a state in which an RQoS controlled via the User Plane is available is accepted. In this case, the AMF_A 240 may transmit the registration accept message without including the twelfth identification information and/or the eighteenth identification information to indicate that the network does not support an RQoS controlled via the Control Plane, or that a request to transition to a state in which an RQoS controlled via the Control Plane is available is rejected.

The AMF_A 240 may transmit the eleventh identification information and/or the thirteenth identification information and/or the seventeenth identification information and/or the nineteenth identification information included in the registration accept message to indicate that the network does not support an RQoS controlled via the User Plane, or that a request to transition to a state in which an RQoS controlled via the User Plane is available is rejected.

Furthermore, the AMF_A 240 may transmit one or more identification information among the eleventh to thirteenth identification information and the seventeenth to nineteenth identification information with being associated with the fourteenth identification information to indicate whether or not the network supports an RQoS, or whether or not a request to transition to a state in which an RQoS is available is accepted, for a PDU session established to a DN identified by the fourteenth identification information.

Furthermore, the AMF_A 240 may transmit one or more identification information among the eleventh to thirteenth identification information and the seventeenth to nineteenth identification information with being associated with the fifteenth identification information to indicate whether or not the network supports an RQoS, or whether or not a request to transition to a state in which an RQoS is available is accepted, for a PDU session identified by the fifteenth identification information.

Furthermore, the AMF_A 240 may transmit one or more identification information among the eleventh to nineteenth identification information included in the registration accept message to indicate whether or not the network supports an RQoS controlled in a UE-initiated manner, or whether or not a request to transition to a state in which an RQoS controlled in a UE-initiated manner is available is accepted.

Furthermore, the AMF_A 240 may transmit one or more identification information among the eleventh to nineteenth identification information included in the registration accept message to indicate whether or not the network supports an RQoS controlled in a network-initiated manner, or whether or not a request to transition to a state in which an RQoS controlled in a network-initiated manner is available is accepted.

Furthermore, the AMF_A 240 may transmit one or more identification information among the eleventh to fifteenth identification information and the seventeenth to nineteenth identification information with being associated with the sixteenth identification information to indicate an RQoS valid period applied to user data communication, a period during which an RQoS for user data communication is valid after the RQoS is validated, or a period until the RQoS timer expires which starts at the time that an RQoS for user data communication is validated.

The UE_A 10 may transmit the eleventh identification information, or transmit the twelfth identification information and the thirteenth identification information, or transmit the seventeenth identification information, or transmit the eighteenth identification information and the nineteenth identification information, or transmit, in a case that two or more identification information of these identification information are configured as one or more identification information, one or more these configured identification information, to indicate that the network supports an RQoS controlled via the Control Plane and the network supports an RQoS controlled via the User Plane, or to indicate that a request to transition to a state in which an RQoS controlled via the Control Plane is available is accepted and a request to transition to a state in which an RQoS controlled via the User Plane is available is accepted.

Furthermore, the AMF_A 240 may transmit two or more pieces identification information among the eleventh to nineteenth identification information with being combined with each other to perform the request combined with the above described matters. Note that the matters indicated by the AMF_A 240 transmitting the identification information may not be limited to these.

Note that the AMF_A 240 may determine which identification information among the eleventh to nineteenth identification information is to be included in the registration accept message, based on the received identification information, and/or the capability information of the network, and/or the operator policy, and/or a state of the network, and/or, user registration information (user subscription), and the like.

For example, the eleventh identification information and/or the seventeenth identification information may be information transmitted in a case that the network supports an RQoS, and/or in a case that the first to third identification information and/or the sixth to eighth identification information are received. Furthermore, the twelfth identification information and/or the eighteenth identification information may be information transmitted in the case that the network supports an RQoS controlled via the Control Plane, and/or in the case that the first to third identification information and/or the sixth to eighth identification information are received. Furthermore, the thirteenth identification information and/or the nineteenth identification information may be information transmitted in the case that the network supports an RQoS controlled via the User Plane, and/or in the case that the first to third identification information and/or the sixth to eighth identification information are received.

Furthermore, the fourteenth identification information may be information indicating the same DNN as the DNN indicated by the fourth identification information, or may be information indicating a different DNN. Furthermore, the fifteenth identification information may be information indicating the same PDU session ID as the PDU session ID indicated by the fifth identification information, or may be information indicating a different PDU session ID. Note that the determination performed by the AMF_A 240 as to which identification information is to be included in the registration accept message is not limited to the determination described above.

The UE_A 10 receives the registration accept message via the NR node_A 122 (S908). The UE_A 10 receives the registration accept message to recognize the contents of various identification information included in the registration accept message.

Furthermore, the UE_A 10 further performs a first process based on the reception of the registration accept message (S909). Note that the UE_A 10 may perform the first process based on the transmission of the registration complete message, or based on the completion of the present procedure.

Here, the first process may be a process in which the UE_A 10 recognizes the matter indicated by the AMF_A 240. Furthermore, the first process may be a process in which the UE_A 10 stores the received identification information as a context, or may be a process in which the UE_A 10 forwards the received identification information to the higher layer and/or the lower layer. Furthermore, the first process may be a process in which the UE_A 10 recognizes that the request for the present procedure is accepted.

In a case that the UE_A 10 receives one or more identification information among the eleventh to nineteenth identification information, the first process may be a process in which the UE_A 10 transitions to a state capable of performing the RQoS validation procedure at any timing after a PDU session is established, or a process in which the UE_A 10 initiates the RQoS validation procedure after a PDU session is established.

To be more specific, in a case that the UE_A 10 receives the eleventh identification information and/or the twelfth identification information and/or the seventeenth identification information and/or the eighteenth identification information, the first process may be a process in which the UE_A 10 transitions to a state capable of performing the RQoS validation procedure controlled via the Control Plane at any timing after a PDU session is established. Furthermore, in a case that the UE_A 10 receives the eleventh identification information and/or the thirteenth identification information and/or the seventeenth identification information and/or the nineteenth identification information, the first process may be a process in which the UE_A 10 transitions to a state capable of performing the RQoS validation procedure controlled via the User Plane at any timing after a PDU session is established.

Furthermore, in a case that the UE_A 10 receives one or more identification information among the eleventh to nineteenth identification information, and the sixteenth identification information, the first process may be a process in which the UE_A 10 sets a timer value of an RQoS to a value indicated by the sixteenth identification information. Note that the first process may not be limited to these processes.

Next, the UE_A 10 transmits a Registration Complete message to the AMF_A 240, based on the reception of the registration accept message and/or the completion of the first process (S910). Note that in a case that the UE_A 10 receives an SM message such as the PDU session establishment accept message, the UE_A 10 may include an SM message such as the PDU session establishment complete message into the registration complete message and transmit the registration complete message, or may indicate that a procedure for the SM is completed by including the SM message. Here, the registration complete message may be transmitted as a response message to the registration accept message. The registration complete message is a NAS message transmitted and/or received on the N1 interface, and for example, the UE_A 10 may transmit a registration complete message included in an RRC message to the NR node_A 122 and the NR node_A 122 that receives registration complete message may transmit the received registration complete message as a control message of the N2 interface to the AMF_A 240.

The AMF_A 240 receives the registration complete message (S910). Each device completes the procedure (A) in the present procedure, based on the transmission and/or reception of the registration accept message and/or the registration complete message.

Next, steps in the case that the first condition determination is false, that is, the steps in the procedure (B) in the present procedure will be described. The AMF_A 240 transmits a Registration Reject message to the UE_A 10 via the NR node_A 122 (S912) to initiate the procedure (B) in the present procedure. Here, the registration reject message may be transmitted as a response message to the registration request message. The registration reject message is a NAS message transmitted and/or received on the N1 interface, and for example, the AMF_A 240 may transmit a registration reject message as a control message of the N2 interface to the NR node_A 122 and the NR node_A 122 that receives the registration reject message may transmit the received registration reject message included in the RRC message to the UE_A 10. The registration reject message transmitted by the AMF_A 240 is not limited to this as long as it is a message rejecting the request of the UE_A 10.

Note that the procedure (B) during the present procedure may be initiated in a case that the procedure (A) in the present procedure is canceled. In the procedure (A), in the case that the fourth condition determination is true, the AMF_A 240 may transmit the registration reject message including an SM message meaning rejection such as a PDU session establishment reject message, or may indicate that the procedure for the SM is rejected by including the SM message meaning rejection. In this case, the UE_A 10 may further receive an SM message meaning rejection such as a PDU session establishment reject message, or may recognize that the procedure for the SM is rejected.

Here, the AMF_A 240 may include one or more identification information among the 21st to 29th identification information and the 72nd identification information in the registration reject message, or may indicate that the request of the UE_A 10 is rejected, by including these identification information. Note that two or more identification information of these identification information may be configured as one or more identification information.

Furthermore, the AMF_A 240 may transmit one or more identification information among the 21st to 29th identification information included in the registration reject message to indicate that the network does not support an RQoS, or that a request to transition to a state in which an RQoS is available is rejected.

To be more specific, the AMF_A 240 may transmit the 21st identification information and/or the 22nd identification information and/or the 23rd identification information and/or the 27th identification information and/or the 28th identification information included in the registration reject message to indicate that the network does not support an RQoS controlled via the Control Plane, or that a request to transition to a state in which an RQoS controlled via the Control Plane is available is rejected. In this case, the AMF_A 240 may transmit the registration reject message without including the 24th identification information and/or the 29th identification information to indicate that the network supports an RQoS controlled via the User Plane, or that a request to transition to a state in which an RQoS controlled via the User Plane is available is accepted.

Furthermore, the AMF_A 240 may transmit the 21st identification information and/or the 22nd identification information and/or the 24th identification information and/or the 27th identification information and/or the 29th identification information included in the registration reject message to indicate that the network does not support an RQoS controlled via the User Plane, or that a request to transition to a state in which an RQoS controlled via the User Plane is available is rejected. In this case, the AMF_A 240 may transmit the registration reject message without including the 23rd identification information and/or the 28th identification information to indicate that the network supports an RQoS controlled via the Control Plane, or that a request to transition to a state in which an RQoS controlled via the Control Plane is available is accepted.

Furthermore, the AMF_A 240 may transmit the 21st identification information, and/or transmit one or more identification information among the 22nd to 24th identification information and the 27th to 29th identification information with being associated with the 25th identification information to indicate that the network does not support an RQoS, or that a request to transition to a state in which an RQoS is available is rejected, for a PDU session established to a DN identified by the fourth identification information received by the AMF_A 240 and/or the 25th identification information.

Furthermore, the AMF_A 240 may transmit the 21st identification information, and/or transmit one or more identification information among the 22nd to 24th identification information and the 27th to 29th identification information with being associated with the 26th identification information to indicate that the network does not support an RQoS, or that a request to transition to a state in which an RQoS is available is rejected, for a PDU session identified by the fifth identification information received by the AMF_A 240, and/or the 26th identification information.

Furthermore, the AMF_A 240 may transmit one or more identification information among the 21st to 29th identification information included in the registration reject message to indicate that the network does not support an RQoS, or that a request to transition to a state in which an RQoS is available is rejected, for a Registration Area (RA) and/or Tracking Area (TA) to which the UE_A 10 currently belongs.

Furthermore, the AMF_A 240 may transmit one or more identification information among the 21st to 29th identification information included in the registration reject message to indicate that the network does not support an RQoS, or that a request to transition to a state in which an RQoS is available is rejected, for an access network to which the UE_A 10 currently connects.

Furthermore, the AMF_A 240 may transmit one or more identification information among the 21st to 29th identification information included in the registration reject message to indicate that the network does not support an RQoS controlled in a UE-initiated manner, or that a request to transition to a state in which an RQoS controlled in a UE-initiated manner is available is rejected.

Furthermore, the AMF_A 240 may transmit one or more identification information among the 21st to 29th identification information included in the registration reject message to indicate the network does not support an RQoS controlled in a network-initiated manner, or that a request to transition to a state in which an RQoS controlled in a network-initiated manner is available is rejected.

The UE_A 10 may transmit the 21st identification information, or transmit the 22nd identification information, or transmit the 23rd identification information and the 24th identification information, or transmit the 27th identification information, or transmit the 28th identification information and the 29th identification information, or transmit, in a case that two or more identification information of these identification information are configured as one or more identification information, one or more these configured identification information, to indicate that the network does not support an RQoS controlled via the Control Plane and the network does not support an RQoS controlled via the User Plane, or that a request to transition to a state in which an RQoS controlled via the Control Plane is available is rejected and a request to transition to a state in which an RQoS controlled via the User Plane is available is rejected.

Furthermore, the AMF_A 240 may transmit the 72nd identification information and/or the 25th identification information and/or the 26th identification information included in the registration reject message to indicate that a request to establish a PDU session belonging to a network slice is rejected, indicate a network slice to which belonging of a PDU session is not allowed, or indicate a network slice to which belonging of a PDU session is rejected.

To be more specific, the AMF_A 240 may transmit the 72nd identification information and the 25th identification information with being associated with each other to indicate that a request to establish a PDU session belonging to a network slice is rejected, or indicate a network slice to which belonging of a PDU session is not allowed, in a PDU session established to a DN identified by the 25th identification information.

Furthermore, the AMF_A 240 may transmit the 61st identification information and the 26th identification information with being associated with each other to indicate that a request to establish a PDU session belonging to a network slice is rejected, or indicate a network slice to which belonging of a PDU session is not allowed, in a PDU session identified by the 26th identification information.

Furthermore, the AMF_A 240 may transmit the 72nd identification information included in the registration reject message to indicate that a request to establish a PDU session belonging to a network slice is rejected, or indicate a network slice to which belonging of a PDU session is not allowed, in a registration area and/or tracking area to which the UE_A 10 currently belongs.

Furthermore, the AMF_A 240 may transmit the 72nd identification information included in the registration reject message to indicate that a request to establish a PDU session belonging to a network slice is rejected, or indicate a network slice to which belonging of a PDU session is not allowed, in an access network to which the UE_A 10 currently connects.

Furthermore, the AMF_A 240 may transmit the 72nd identification information included in the registration reject message to indicate a value of the first timer, or indicate whether the same procedure as the present procedure is to be performed again after the completion of the present procedure.

Furthermore, the AMF_A 240 may transmit two or more identification information among the 21st to 29th identification information and/or the 72nd identification information with being combined with each other to request a combination of the above described matters. Note that the matters indicated by the AMF_A 240 transmitting the identification information may not be limited to these.

Note that the AMF_A 240 may determine which identification information among the 21st to 29th identification information and/or the 72nd identification information is to be included in the registration reject message, based on the received identification information, and/or the capability information of the network, and/or a policy such as the operator policy, and/or the state of the network.

For example, the 21st identification information may be information transmitted in the case that the network does not support an RQoS, and/or in a case that one or more identification information among the first to eighth identification information are received. Furthermore, for example, the 22nd identification information and/or the 27th identification information may be information transmitted in the case that the network does not support an RQoS, and/or in a case that the first to third identification information and/or the sixth to eighth identification information are received. Furthermore, the 23rd identification information and/or the 28th identification information may be information transmitted in the case that the network supports an RQoS controlled via the Control Plane, and/or in the case that the first to third identification information and/or the sixth to eighth identification information are received. Furthermore, the 24th identification information and/or the 29th identification information may be information transmitted in the case that the network supports an RQoS controlled via the User Plane, and/or in the case that the first to third identification information and/or the sixth to eighth identification information are received.

Furthermore, the 25th identification information may be information indicating the same DNN as the DNN indicated by the fourth identification information. Furthermore, the 26th identification information may be information indicating the same PDU session ID as the PDU session ID indicated by the fifth identification information. Furthermore, the 72nd identification information may be information transmitted in a case that the 71st identification information is received and/or in a case that the network slice indicated by the 71st identification information is not allowed by the network. Note that the determination performed by the AMF_A 240 as to which identification information is to be included in the registration reject message is not limited to the determination described above.

The UE_A 10 receives the registration reject message. The UE_A 10 performs a second process based on the reception of the registration reject message (S914). Note that the UE_A 10 may perform the second process based on the completion of the present procedure.

Here, the second process may be a process in which the UE_A 10 recognizes the matter indicated by the AMF_A 240. Furthermore, the second process may be a process in which the UE_A 10 stores the received identification information as a context, or may be a process in which the UE_A 10 forwards the received identification information to the higher layer and/or the lower layer. Furthermore, the second process may be a process in which the UE_A 10 recognizes that the request for the present procedure is rejected.

Furthermore, in a case that the UE_A 10 receives one or more identification information among the 21st to 29th identification information, the second process may be a process in which the UE_A 10 transitions to a state incapable of performing the RQoS validation procedure, or a process to maintain a state of not applying an RQoS.

To be more specific, in a case that the UE_A 10 receives the 22nd identification information and/or the 23rd identification information and/or the 27th identification information and/or the 28th identification information, the second process may be a process in which the UE_A 10 transitions to a state incapable of performing the RQoS validation procedure controlled via the Control Plane. Furthermore, in a case that the UE_A 10 receives the 22nd identification information and/or the 24th identification information and/or the 27th identification information and/or the 29th identification information, the second process may be a process in which the UE_A 10 transitions to a state incapable of performing the RQoS validation procedure controlled via the User Plane.

Furthermore, in a case that the UE_A 10 receives the 72nd identification information, the second process may be a process in which the UE_A 10 configures a first timer value to a value indicated by the 72nd identification information, or a process in which the UE_A 10 starts the first timer configured with the timer value. Furthermore, in the case that the UE_A 10 receives the 72nd identification information, the second process may be a process to perform one or more behaviors of the first to eleventh behaviors.

Furthermore, the second process may be a process in which the UE_A 10 initiates again the present procedure after a certain time period elapses, or a process in which the UE_A 10 transitions a state in which the request of the UE_A 10 is limited. Note that the second process may not be limited to these processes.

Furthermore, the UE_A 10 may receive the registration reject message, or not receive the registration accept message, and thereby, recognize that the request of the UE_A 10 is rejected. Each device completes the procedure (B) in the present procedure, based on the transmission and/or reception of the registration reject message.

Each device completes the present procedure (registration procedure), based on the completion of the procedure (A) or (B) in the present procedure. Note that each device may transition to a state in which the UE_A 10 is registered with the network (RM_REGISTERED state), based on the completion of the procedure (A) during the present procedure, or a state in which the UE_A 10 is not registered with the network (RM_DEREGISTERED state), based on the completion of the procedure (B) during the present procedure. The transition of each device to each state may be performed based on the completion of the present procedure, or based on the establishment of the PDU session.

Furthermore, each device may perform the process based on the identification information transmitted and/or received in the present procedure, based on the completion of the present procedure. In other words, the UE_A 10 may perform the first process or perform the second process, based on the completion of the present procedure.

The first condition determination may be performed based on the identification information included in the registration request message, and/or the subscriber information, and/or the operator policy. For example, the first condition determination may be true in a case that the network allows the request of the UE_A 10. The first condition determination may be false in a case that the network does not allow the request of the UE_A 10. Furthermore, the first condition determination may be true in a case that a network with which the UE_A 10 is registered and/or the device within the network support the function the UE_A 10 requests, or may be false in a case of not supporting the function. Furthermore, the first condition determination may be true in a case that the network is determined to be in a congested state, or may be false in a case that the network is determined not to be in a congested state. Note that conditions with which true or false of the first condition determination is determined may not be limited to the previously described conditions.

The fourth condition determination may be performed based on whether or not the AMF_A 240 receives an SM, or based on whether or not the registration request message includes an SM message. For example, the fourth condition determination may be true in a case that the AMF_A 240 receives an SM and/or in a case that the registration request message includes an SM message, or may be false in a case that the AMF_A 240 does not receive an SM and/or in a case that the registration request message does not include an SM message. Note that conditions with which true or false of the fourth condition determination is determined may not be limited to the previously described conditions.

1.3.2. Overview of PDU Session Establishment Procedure

Next, an overview of the PDU session establishment procedure performed to establish a PDU session for the DN_A 5 will be described. Hereinafter, the PDU session establishment procedure is also referred to as the present procedure. The present procedure is a procedure for each device to establish a PDU session. Note that each device may perform the present procedure in a state of having completed the registration procedure, or in the registration procedure. Each device may initiate the present procedure in a registered state, or at any timing after the registration procedure. Each device may establish a PDU session, based on the completion of the PDU session establishment procedure. Furthermore, each device may perform the present procedure multiple times to establish multiple PDU sessions.

1.3.2.1. PDU Session Establishment Procedure Example

Figure 10:
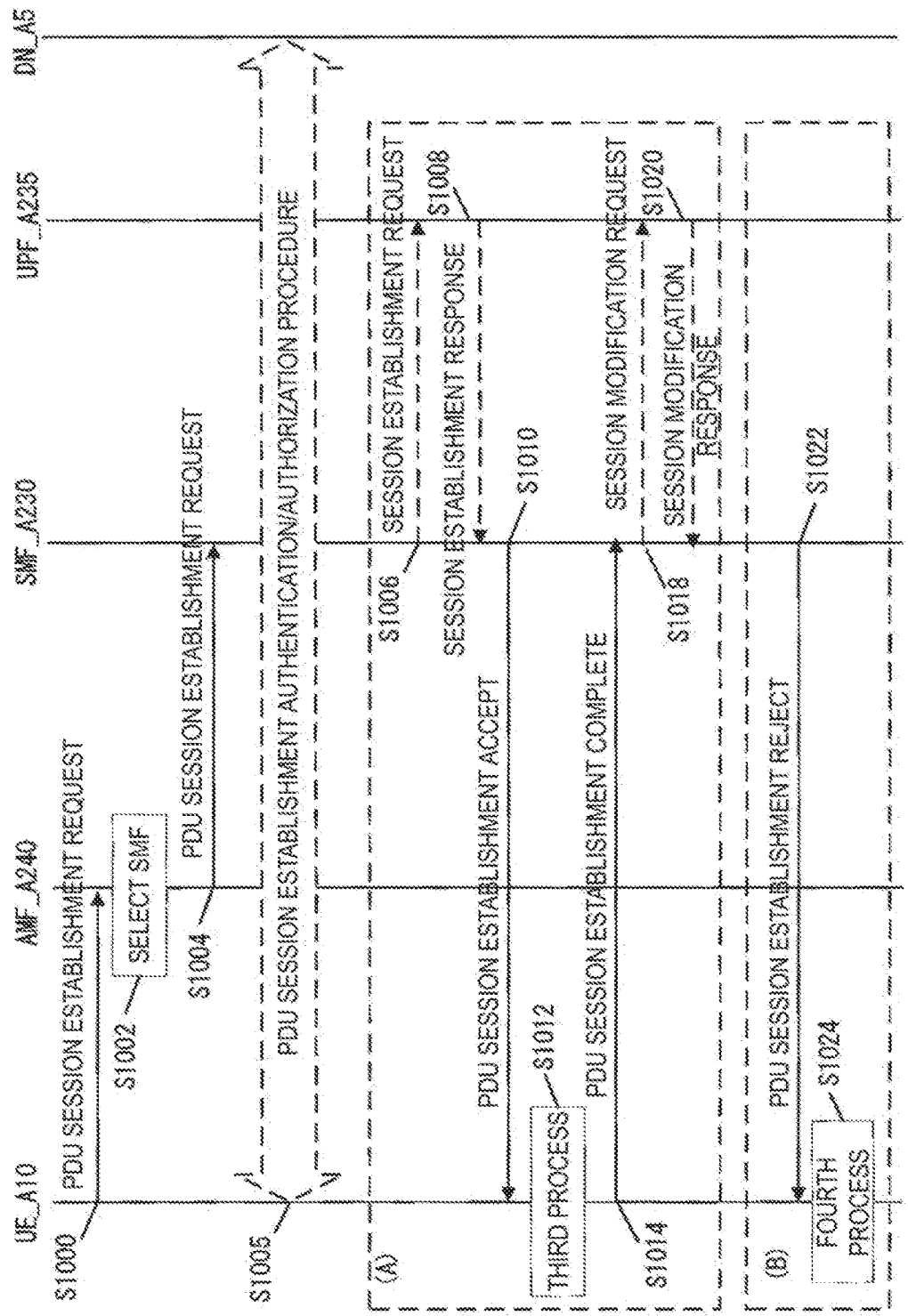
FIG. 10 is a diagram illustrating a PDU session establishment procedure.

An example of a process of performing the PDU session establishment procedure will be described with reference to FIG. 10. Each step of the present procedure will be described below. First, the UE_A 10 transmits a PDU Session Establishment Request message to the SMF_A 230 via the NR node_A 122 and the AMF_A240 (S1000) (S1002) (S1004) to initiate the PDU session establishment procedure.

Specifically, the UE_A 10 transmits the PDU session establishment request message to the AMF_A 240 via the NR node_A 122 by way of the N1 interface (S1000). The AMF_A 240, in a case of receiving the PDU session establishment request message, selects the SMF_A 230 as the NF to which the PDU session establishment request message is routed (S1002), and transmits or forwards the PDU session establishment request message to the selected SMF_A 230 by way of the N11 interface (S1004). Here, the AMF_A 240 may select the SMF_A 230 to be routed, based on information included in the PDU session establishment request message. To be more specific, the AMF_A 240 may select the SMF_A 230 to be routed, based on the identification information obtained based on the reception of the PDU session establishment request message, and/or the subscriber information, and/or the capability information of the network, and/or the operator policy, and/or the state of the network, and/or the context the AMF_A 240 already holds.

Note that the PDU session establishment request message may be a NAS message. The PDU session establishment request message may be a message for requesting an establishment of a PDU session, but is not limited thereto.

Here, the UE_A 10 may include one or more of identification information among the first to eighth identification information, the 61st identification information, and the 71st identification information in the PDU session establishment request message, or may indicate the request of the UE_A 10 by including these identification information. Note that two or more identification information of these identification information may be configured as one or more identification information.

Furthermore, the UE_A 10 may transmit one or more identification information among the first to eighth identification information included in the PDU session establishment request message to indicate that the UE_A 10 supports an RQoS, or request to transition to a state in which an RQoS is available.

Furthermore, the UE_A 10 may transmit one or more identification information among the first to eighth identification information included in the PDU session establishment request message to indicate that the UE_A 10 does not support an RQoS, or indicate that the UE_A 10 does not request to transition to a state in which an RQoS is available.

To be more specific, the UE_A 10 may transmit the first identification information and/or the second identification information and/or the sixth identification information and/or the seventh identification information included in the PDU session establishment request message to indicate that the UE_A 10 supports an RQoS controlled via the Control Plane, or request to transition to a state in which an RQoS controlled via the Control Plane is available. In this case, the UE_A 10 may transmit the PDU session establishment request message without including the third identification information and/or the eighth identification information to indicate that the UE_A 10 does not support an RQoS controlled via the User Plane, or indicate that the UE_A 10 does not request to transition to a state in which an RQoS controlled via the User Plane is available.

The UE_A 10 may transmit the first identification information and/or the second identification information and/or the sixth identification information and/or the seventh identification information included in the PDU session establishment request message to indicate that the UE_A 10 does not support an RQoS controlled via the Control Plane, or indicate that the UE_A 10 does not request to transition to a state in which an RQoS controlled via the Control Plane is available.

Furthermore, the UE_A 10 may transmit the first identification information and/or the third identification information and/or the sixth identification information and/or the eighth identification information included in the PDU session establishment request message to indicate that the UE_A 10 supports an RQoS controlled via the User Plane, or request to transition to a state in which an RQoS controlled via the User Plane is available. In this case, the UE_A 10 may transmit the PDU session establishment request message without including the second identification information and/or the seventh identification information to indicate that the UE_A 10 does not support an RQoS controlled via the Control Plane, or indicate that the UE_A 10 does not request to transition to a state in which an RQoS controlled via the Control Plane is available.

The UE_A 10 may transmit the first identification information and/or the third identification information and/or the sixth identification information and/or the eighth identification information included in the PDU session establishment request message to indicate that the UE_A 10 does not support an RQoS controlled via the User Plane, or indicate that the UE_A 10 does not request to transition to a state in which an RQoS controlled via the User Plane is available.

Furthermore, the UE_A 10 may transmit one or more identification information among the first to third identification information and the sixth to eighth identification information with being associated with the fourth identification information to indicate whether or not the UE_A 10 supports an RQoS, or whether or not the UE_A 10 requests to transition to a state in which an RQoS is available, for a PDU session established to a DN identified by the fourth identification information.

Furthermore, the UE_A 10 may transmit one or more identification information among the first to third identification information and the sixth to eighth identification information with being associated with the fifth identification information to indicate whether or not the UE_A 10 supports an RQoS, or whether or not the UE_A 10 requests to transition to a state in which an RQoS is available, for a PDU session identified by the fifth identification information.

Furthermore, the UE_A 10 may transmit one or more identification information among the first to eighth identification information included in the PDU session establishment request message to indicate whether or not the UE_A 10 supports an RQoS controlled in a UE-initiated manner, or whether or not the UE_A 10 requests to transition to a state in which an RQoS controlled in a UE-initiated manner is available.

Furthermore, the UE_A 10 may transmit one or more identification information among the first to eighth identification information included in the PDU session establishment request message to indicate whether not the UE_A 10 supports an RQoS controlled in a network-initiated manner, or whether not the UE_A 10 requests to transition to a state in which an RQoS controlled in a network-initiated manner is available.

The UE_A 10 may transmit the first identification information, or transmit the second identification information and the third identification information, or transmit the sixth identification information, or transmit the seventh identification information and the eighth identification information, or transmit, in a case that two or more identification information of these identification information are configured as identification information of one or more identification information, one or more of these configured identification information, to indicate that the UE_A 10 supports an RQoS controlled via the Control Plane and the UE_A 10 supports an RQoS controlled via the User Plane, or request to transition to a state in which an RQoS controlled via the User Plane is available and transition to a state in which an RQoS controlled via the User Plane is available.

Furthermore, the UE_A 10 may include the 61st identification information and/or the fourth identification information and/or the fifth identification information in the PDU session establishment request message and transmit them for requesting the service authentication and/or authorization by the DN via the 3GPP interface (such as the N6 interface), or requesting to perform the PDU session establishment authentication and/or authorization procedure in the present procedure.

To be more specific, the UE_A 10 may transmit the 61st identification information and the fourth identification information with being association with each other to request the service authentication and/or authorization by the DN_A 5 via the 3GPP interface, or request to perform the PDU session establishment authentication and/or authorization procedure in the present procedure, in a PDU session established to a DN identified by the fourth identification information.

Furthermore, the UE_A 10 may transmit the 61st identification information and the fifth identification information with being association with each other to request the service authentication and/or authorization by the DN_A 5 via the 3GPP interface, or request to perform the PDU session establishment authentication and/or authorization procedure in the present procedure, in a PDU session identified by the fifth identification information.

Furthermore, the UE_A 10 may transmit the 71st identification information and/or the fourth identification information and/or the fifth identification information included in the PDU session establishment request message to request establishment of a PDU session belonging to a network slice, indicate a network slice to which a PDU session requested by the UE_A 10 belongs, or indicate a network slice to which a PDU session is to belong.

To be more specific, the UE_A 10 may transmit the 71st identification information and the fourth identification information with being associated with each other to request establishment of a PDU session belonging to a network slice, indicate a network slice to which a PDU session requested by the UE_A 10 belongs, or indicate a network slice to which a PDU session is to belong, in a PDU session established to a DN identified by the fourth identification information.

Furthermore, the UE_A 10 may transmit the 61st identification information and the fifth identification information with being associated with each other to request establishment of a PDU session belonging to a network slice, indicate a network slice to which a PDU session requested by the UE_A 10 belongs, or indicate a network slice to which a PDU session is to belong, in a PDU session identified by the fifth identification information.

Furthermore, the UE_A 10 may transmit two or more pieces identification information among the first to eighth identification information, the 61st identification information, and the 71st identification information with being combined with each other to perform the request combined with the above described matters. Note that the matters indicated by the UE_A 10 transmitting the identification information may not be limited to these.

Note that the UE_A 10 may determine which identification information among the first to eighth identification information, the 61st identification information, and the 71st identification information is to be included in the PDU session establishment request message, based on the capability information of the UE_A 10, and/or a policy such as a UE policy, and/or a preference of the UE_A 10, and/or the application (higher layer). Note that the determination performed by the UE_A 10 as to which identification information is to be included in the PDU session establishment request message is not limited to the determination described above.

The SMF_A 230 receives the PDU session establishment request message, and performs third condition determination. The third condition determination is for the SMF_A 230 to determine whether to accept a request of the UE_A 10. In the third condition determination, the SMF_A 230 determines whether the third condition determination is true or false. In a case that the third condition determination is true, the SMF_A 230 initiates a procedure (A) in the present procedure, and in a case that the third condition determination is false, the SMF_A 230 initiates a procedure (B) in the present procedure. Note that steps in the case that the third condition determination is false will be described later.

Hereinafter, steps in the case that third condition determination is true, that is, the steps in the procedure (A) in the present procedure will be described. The SMF_A 230 selects the UPF_A 235 to which a PDU session is established, and performs an eleventh condition determination.

Here, the eleventh condition determination is for each device to determine whether to perform the PDU session establishment authentication and/or authorization procedure. In the eleventh condition determination, the SMF_A 230 determines whether the eleventh condition determination is true or false. In a case that the eleventh condition determination is true, the SMF_A 230 initiates the PDU session establishment authentication and/or authorization procedure (S1005), or in a case that the eleventh condition determination is false, the SMF_A 230 omits the PDU session establishment authentication and/or authorization procedure. Note that details of the PDU session establishment authentication and/or authorization procedure are described later.

Next, the SMF_A 230 transmits a Session Establishment request message to the selected UPF_A 235 (S1006), based on the eleventh condition determination and/or completion of PDU session establishment authentication and/or authorization procedure, to initiate the procedure (A) in the present procedure. Note that, the SMF_A 230 may not initiate the procedure (A) in the present procedure, based on the completion of the PDU session establishment authentication and/or authorization procedure, but may initiate the procedure (B) in the present procedure.

Here, the SMF_A 230 may select one or more UPFs_A 235, based on the identification information obtained based on the reception of the PDU session establishment request message, and/or the capability information of the network, and/or the subscriber information, and/or the operator policy, and/or the state of the network, and/or the context the SMF_A 230 already holds. Note that in a case that multiple UPFs_A 235 are selected, the SMF_A 230 may transmit a session establishment request message to each of the UPFs_A 235.

The UPF_A 235 receives the session establishment request message and creates a context for the PDU session. Furthermore, the UPF_A 235 transmits a Session Establishment response message to the SMF_A 230, based on the reception of the session establishment request message and/or the creation of context for the PDU session (S1008). Furthermore, the SMF_A 230 receives the session establishment response message. Note that the session establishment request message and the session establishment response message may be control messages transmitted and/or received on the N4 interface. Furthermore, the session establishment response message may be a response message to the session establishment request message.

Furthermore, the SMF_A 230 may perform address allocation of an address to be allocated to the UE_A 10, based on the reception of the PDU session establishment request message, and/or the selection of the UPF_A 235, and/or the reception of the session establishment response message. Note that the SMF_A 230 may perform the address allocation of an address to be allocated to the UE_A 10 during the PDU session establishment procedure, or after the completion of the PDU session establishment procedure.

Specifically, in a case that the SMF_A 230 allocates an IPv4 addresses without using DHCPv4, the SMF_A 230 may perform the address allocation during the PDU session establishment procedure, or may transmit the allocated address to the UE_A 10. Furthermore, in a case that the SMF_A 230 allocate an IPv4 address and/or an IPv6 address and/or IPv6 prefix by using DHCPv4 or DHCPv6 or Stateless Address Autoconfiguration (SLAAC), the SMF_A 230 may perform the address allocation after the PDU session establishment procedure, or may transmit the allocated address to the UE_A 10. Note that the address allocation performed by the SMF_A 230 is not limited to these.

Note that the SMF_A 230 may transmit the allocated address included in the PDU session establishment accept message to the UE_A 10, based on the completion of the address allocation of the address to be allocated to the UE_A 10, or may transmit to the UE_A 10 after the completion of the PDU session establishment procedure.

The SMF_A 230 transmits a PDU session establishment accept message to the UE_A 10 via the AMF_A 240, based on the reception of the PDU session establishment request message, and/or the selection of the UPF_A 235, and/or the reception of the session establishment response message, and/or the completion of the address allocation of the address to be allocated to the UE_A 10 (S1010).

Specifically, the SMF_A 230 transmits the PDU session establishment accept message to the AMF_A 240 by way of the N11 interface, and the AMF_A 240 receiving the PDU session establishment accept message transmits the PDU session establishment accept message to the UE_A 10 by way of the N1 interface.

Note that in a case that the PDU session is a PDN connection, the PDU session establishment accept message may be a PDN connectivity accept message. Furthermore, the PDU session establishment accept message may be a NAS message transmitted and/or received on the N11 interface and the N1 interface. The PDU session establishment accept message is not limited to that described above, but may be a message indicating the PDU session establishment is accepted.

Here, the SMF_A 230 may include one or more identification information among the eleventh to nineteenth identification information in the PDU session establishment accept message, or may indicate that the request of the UE_A 10 is accepted, by including these identification information. Note that two or more identification information of these identification information may be configured as one or more identification information.

Furthermore, the SMF_A 230 may transmit one or more identification information among the eleventh to nineteenth identification information included in the PDU session establishment accept message to indicate that the network supports an RQoS, or that a request to transition to a state in which an RQoS is available is accepted.

To be more specific, the SMF_A 230 may transmit the eleventh identification information and/or the twelfth identification information and/or the seventeenth identification information and/or the eighteenth identification information included in the PDU session establishment accept message to indicate that the network supports an RQoS controlled via the Control Plane, or that a request to transition to a state in which an RQoS controlled via the Control Plane is available is accepted. In this case, the SMF_A 230 may transmit the PDU session establishment accept message without including the thirteenth identification information and/or the nineteenth identification information to indicate that the network does not support an RQoS controlled via the User Plane, or that a request to transition to a state in which an RQoS controlled via the User Plane is available is rejected.

The SMF_A 230 may transmit the eleventh identification information and/or the twelfth identification information and/or the seventeenth identification information and/or the eighteenth identification information included in the PDU session establishment accept message to indicate that the network does not support an RQoS controlled via the Control Plane, or that a request to transition to a state in which an RQoS controlled via the Control Plane is available is rejected.

Furthermore, the SMF_A 230 may transmit the eleventh identification information and/or the thirteenth identification information and/or the seventeenth identification information and/or the nineteenth identification information included in the PDU session establishment accept message to indicate that the network supports an RQoS controlled via the User Plane, or that a request to transition to a state in which an RQoS controlled via the User Plane is available is accepted. In this case, the SMF_A 230 may transmit the registration accept message without including the twelfth identification information and/or the eighteenth identification information to indicate that the network does not support an RQoS controlled via the Control Plane, or that a request to transition to a state in which an RQoS controlled via the Control Plane is available is rejected.

The SMF_A 230 may transmit the eleventh identification information and/or the thirteenth identification information and/or the seventeenth identification information and/or the nineteenth identification information included in the PDU session establishment accept message to indicate that the network does not support an RQoS controlled via the User Plane, or that a request to transition to a state in which an RQoS controlled via the User Plane is available is rejected.

Furthermore, the SMF_A 230 may transmit one or more identification information among the eleventh to thirteenth identification information and the seventeenth to nineteenth identification information with being associated with the fourteenth identification information to indicate whether or not the network supports an RQoS, or whether or not a request to transition to a state in which an RQoS is available is accepted, for a PDU session established to a DN identified by the fourteenth identification information.

Furthermore, the SMF_A 230 may transmit one or more identification information among the eleventh to thirteenth identification information and the seventeenth to nineteenth identification information with being associated with the fifteenth identification information to indicate whether or not the network supports an RQoS, or whether or not a request to transition to a state in which an RQoS is available is accepted, for a PDU session identified by the fifteenth identification information.

Furthermore, the SMF_A 230 may transmit one or more identification information among the eleventh to nineteenth identification information included in the PDU session establishment accept message to indicate whether or not the network supports an RQoS controlled in a UE-initiated manner, or whether or not a request to transition to a state in which an RQoS controlled in a UE-initiated manner is available is accepted.

Furthermore, the SMF_A 230 may transmit one or more identification information among the eleventh to nineteenth identification information included in the PDU session establishment accept message to indicate whether or not the network supports an RQoS controlled in a network-initiated manner, or whether or not a request to transition to a state in which an RQoS controlled in a network-initiated manner is available is accepted.

Furthermore, the SMF_A 230 may transmit one or more identification information among the eleventh to fifteenth identification information and the seventeenth to nineteenth identification information with being associated with the sixteenth identification information to indicate an RQoS valid period applied to user data communication, a period during which an RQoS for user data communication is valid after the RQoS is validated, or a period until the RQoS timer expires which starts at the time that an RQoS for user data communication is validated.

The UE_A 10 may transmit the eleventh identification information, or transmit the twelfth identification information and the thirteenth identification information, or transmit the seventeenth identification information, or transmit the eighteenth identification information and the nineteenth identification information, or transmit, in a case that two or more identification information of these identification information are configured as identification information of one or more identification information, one or more of these configured identification information, to indicate that the network supports an RQoS controlled via the Control Plane and the network supports an RQoS controlled via the User Plane, or to indicate that a request to transition to a state in which an RQoS controlled via the Control Plane is available is accepted and a request to transition to a state in which an RQoS controlled via the User Plane is available is accepted.

Furthermore, the SMF_A 230 may transmit two or more pieces identification information among the eleventh to nineteenth identification information with being combined with each other to perform the request combined with the above described matters. Note that the matters indicated by the SMF_A 230 transmitting the identification information may not be limited to these.

Note that the SMF_A 230 may determine which identification information among the eleventh to nineteenth identification information is to be included in the PDU session establishment accept message, based on the received identification information, and/or the capability information of the network, and/or a policy such as the operator policy, and/or the state of the network.

For example, the eleventh identification information and/or the seventeenth identification information may be information transmitted in the case that the network supports an RQoS, and/or in a case that the first to third identification information and/or the sixth to eighth identification information are received. Furthermore, the twelfth identification information and/or the eighteenth identification information may be information transmitted in the case that the network supports an RQoS controlled via the Control Plane, and/or in the case that the first to third identification information and/or the sixth to eighth identification information are received. Furthermore, the thirteenth identification information and/or the nineteenth identification information may be information transmitted in the case that the network supports an RQoS controlled via the User Plane, and/or in the case that the first to third identification information and/or the sixth to eighth identification information are received.

Furthermore, the fourteenth identification information may be information indicating the same DNN as the DNN indicated by the fourth identification information, or may be information indicating a different DNN. Furthermore, the fifteenth identification information may be information indicating the same PDU session ID as the PDU session ID indicated by the fifth identification information, or may be information indicating a different PDU session ID. Note that the determination performed by the SMF_A 230 as to which identification information is to be included in the PDU session establishment accept message is not limited to the determination described above.

The UE_A 10 receives the PDU session establishment accept message. The UE_A 10 receives the PDU session establishment accept message to recognize the contents of various identification information included in the PDU session establishment accept message.

The UE_A 10 further performs a third process, based on the reception of the PDU session establishment accept message (S1012). Note that the UE_A 10 may perform the third process based on transmission of a PDU session establishment complete message, or based on the completion of the present procedure.

Here, the third process may be a process in which the UE_A 10 recognizes the matter indicated by the SMF_A 230. Furthermore, the third process may be a process in which the UE_A 10 stores the received identification information as a context, or may be a process in which the UE_A 10 forwards the received identification information to the higher layer and/or the lower layer. Furthermore, the third process may be a process in which the UE_A 10 recognizes that the request for the present procedure is accepted.

Furthermore, in a case that the UE_A 10 receives one or more identification information among the eleventh to nineteenth identification information, the third process may be a process in which the UE_A 10 transitions to a state capable of performing the RQoS validation procedure at any timing, or a process in which the UE_A 10 initiates the RQoS validation procedure.

To be more specific, in a case that the UE_A 10 receives the eleventh identification information and/or the twelfth identification information and/or the seventeenth identification information and/or the eighteenth identification information, the third process may be a process in which the UE_A 10 transitions to a state capable of performing the RQoS validation procedure controlled via the Control Plane at any timing. Furthermore, in case that the UE_A 10 receives the eleventh identification information and/or the thirteenth identification information and/or the seventeenth identification information and/or the nineteenth identification information, the third process may be a process in which the UE_A 10 transitions to a state capable of performing the RQoS validation procedure controlled via the User Plane at any timing.

Furthermore, in a case that the UE_A 10 receives one or more identification information among the eleventh to nineteenth identification information, and the sixteenth identification information, the third process may be a process in which the UE_A 10 sets a timer value of an RQoS to a value indicated by the sixteenth identification information. Note that the third process may not be limited to these processes.

Next, the UE_A 10 transmits the PDU session establishment complete message to the SMF_A 230 via the AMF_A 240, based on the reception of the PDU session establishment accept message and/or the completion of the third process (S1014). Furthermore, the SMF_A 230 receives the PDU session establishment complete message, and performs second condition determination.

Specifically, the UE_A 10 transmits the PDU session establishment complete message to the AMF_A 240 by way of the N1 interface, and the AMF_A 240 receiving the PDU session establishment complete message transmits the PDU session establishment complete message to the SMF_A 230 by way of the N11 interface.

Note that in a case that the PDU session is a PDN connection, the PDU session establishment complete message may be a PDN Connectivity complete message, or an Activate default EPS bearer context accept message. Furthermore, the PDU session establishment complete message may be a NAS message transmitted and/or received on the N1 interface and the N11 interface. The PDU session establishment complete message may be a response message to the PDU session establishment accept message, but is not limited thereto, and may be a message indicating that the PDU session establishment procedure is completed.

The second condition determination is for the SMF_A 230 to determine a type of message to be transmitted and/or received on the N4 interface. In a case that the second condition determination is true, SMF_A 230 transmits a Session Modification request message to UPF_A 235 (S1018), and further receives a session modification accept (Session Modification response) message that is transmitted by the UPF_A 235 receiving the session modification request message (S1020). In a case that the second condition determination is false, the SMF_A 230 transmits a session establishment request message to the UPF_A 235 (S1018), and further receives the session modification accept message that is transmitted by the UPF_A 235 receiving the session establishment request message (S1020).

Each device completes the procedure (A) in the present procedure, based on the transmission and/or reception of the PDU session establishment complete message, and/or the transmission and/or reception of the session modification response message, and/or the transmission and/or reception of the session establishment response message, and/or the transmission and/or reception of the RA.

Next, steps in the case that the third condition determination is false, that is, the steps in the procedure (B) in the present procedure will be described. The SMF_A 230 transmits a PDU session establishment reject message to the UE_A 10 via the AMF_A 240 (S1022) to initiate the procedure (B) in the present procedure.

Specifically, the SMF_A 230 transmits the PDU session establishment reject message to the AMF_A 240 by way of the N11 interface, and the AMF_A 240 receiving the PDU session establishment request message transmits the PDU session establishment reject message to the UE_A 10 by way of the N interface.

Note that in a case that the PDU session is a PDN connection, the PDU session establishment reject message may be a PDN connectivity reject message. Furthermore, the PDU session establishment reject message may be a NAS message transmitted and/or received on the N11 interface and the N1 interface. The PDU session establishment reject message is not limited to that described above, and may be a message indicating the PDU session establishment is rejected.

Here, the SMF_A 230 may include one or more identification information among the 21st to 29th identification information and the 72nd identification information in the PDU session establishment reject message, or may indicate that the request of the UE_A 10 is rejected, by including these identification information. Note that two or more identification information of these identification information may be configured as one or more identification information.

Furthermore, the SMF_A 230 may transmit one or more identification information among the 21st to 29th identification information included in the PDU session establishment reject message to indicate that the network does not support an RQoS, or that a request to transition to a state in which an RQoS is available is rejected.

To be more specific, the SMF_A 230 may transmit the 21st identification information and/or the 22nd identification information and/or the 23rd identification information and/or the 27th identification information and/or the 28th identification information included in the PDU session establishment reject message to indicate that the network does not support an RQoS controlled via the Control Plane, or that a request to transition to a state in which an RQoS controlled via the Control Plane is available is rejected. In this case, the SMF_A 230 may transmit the registration reject message without including the 24th identification information and/or the 29th identification information to indicate that the network supports an RQoS controlled via the User Plane, or that a request to transition to a state in which an RQoS controlled via the User Plane is available is accepted.

Furthermore, the SMF_A 230 may transmit the 21st identification information and/or the 22nd identification information and/or the 24th identification information and/ or the 27th identification information and/or the 29th identification information included in the PDU session establishment reject message to indicate that the network does not support an RQoS controlled via the User Plane, or that a request to transition to a state in which an RQoS controlled via the User Plane is available is rejected. In this case, the SMF_A 230 may perform transmission without including the 23rd identification information and/or the 28th identification information to indicate that the network supports an RQoS controlled via the Control Plane, or that a request to transition to a state in which an RQoS controlled via the Control Plane is available is accepted.

Furthermore, the SMF_A 230 may transmit the 21st identification information, and/or transmit one or more identification information among the 22nd to 24th identification information and the 27th to 29th identification information with being associated with the 25th identification information to indicate that the network does not support an RQoS, or that a request to transition to a state in which an RQoS is available is rejected, for a PDU session established to a DN identified by the fourth identification information received by the SMF_A 230, and/or the 25th identification information.

Furthermore, the SMF_A 230 may transmit the 21st identification information, and/or transmit one or more identification information among the 22nd to 24th identification information and the 27th to 29th identification information with being associated with the 26th identification information to indicate that the network does not support an RQoS, or that a request to transition to a state in which an RQoS is available is rejected, for a PDU session identified by the fifth identification information received by the SMF_A 230, and/or the 26th identification information.

Furthermore, the SMF_A 230 may transmit one or more identification information among the 21st to 29th identification information included in the PDU session establishment reject message to indicate that the network does not support an RQoS, or that a request to transition to a state in which an RQoS is available is rejected, for a registration area and/or tracking area to which the UE_A 10 currently belongs.

Furthermore, the SMF_A 230 may transmit one or more identification information among the 21st to 29th identification information included in the PDU session establishment reject message to indicate that the network does not support an RQoS, or that a request to transition to a state in which an RQoS is available is rejected, for an access network to which the UE_A 10 currently connects.

Furthermore, the SMF_A 230 may transmit one or more identification information among the 21st to 29th identification information included in the PDU session establishment reject message to indicate that the network does not support an RQoS controlled in a UE-initiated manner, or that a request to transition to a state in which an RQoS controlled in a UE-initiated manner is available is rejected. Furthermore, the SMF_A 230 may transmit one or more identification information among the 21st to 29th identification information included in the PDU session establishment reject message to indicate the network does not support an RQoS controlled in a network-initiated manner, or that a request to transition to a state in which an RQoS controlled in a network-initiated manner is available is rejected.

The UE_A 10 may transmit the 21st identification information, or transmit the 22nd identification information, or transmit the 23rd identification information and the 24th identification information, or transmit the 27th identification information, or transmit the 28th identification information and the 29th identification information, or transmit, in a case that two or more identification information of these identification information are configured as identification information of one or more identification information, one or more of these configured identification information, to indicate that the network does not support an RQoS controlled via the Control Plane and the network does not support an RQoS controlled via the User Plane, or that a request to transition to a state in which an RQoS controlled via the Control Plane is available is rejected and a request to transition to a state in which an RQoS controlled via the User Plane is available is rejected.

Furthermore, the SMF_A 230 may transmit the 72nd identification information and/or the 25th identification information and/or the 26th identification information included in the PDU session establishment reject message to indicate that a request to establish a PDU session belonging to a network slice is rejected, or indicate a network slice to which belonging of a PDU session is not allowed.

To be more specific, the SMF_A 230 may transmit the 72nd identification information and the 25th identification information with being associated with each other to indicate that a request to establish a PDU session belonging to a network slice is rejected, or indicate a network slice to which belonging of a PDU session is not allowed, in a PDU session established to a DN identified by the 25th identification information.

Furthermore, the SMF_A 230 may transmit the 61st identification information and the 26th identification information with being associated with each other to indicate that a request to establish a PDU session belonging to a network slice is rejected, or indicate a network slice to which belonging of a PDU session is not allowed, in a PDU session identified by the 26th identification information.

Furthermore, the SMF_A 230 may transmit the 72nd identification information included in the PDU session establishment reject message to indicate that a request to establish a PDU session belonging to a network slice is rejected, or indicate a network slice to which belonging of a PDU session is not allowed, in a registration area and/or tracking area to which the UE_A 10 currently belongs.

Furthermore, the SMF_A 230 may transmit the 72nd identification information included in the PDU session establishment reject message to indicate that a request to establish a PDU session belonging to a network slice is rejected, or indicate a network slice to which belonging of a PDU session is not allowed, in an access network to which the UE_A 10 currently connects.

Furthermore, the SMF_A 230 may transmit the 72nd identification information included in the PDU session establishment reject message to indicate a value of the first timer, or indicate whether the same procedure as the present procedure is to be performed again after the completion of the present procedure.

Furthermore, the SMF_A 230 may transmit two or more identification information among the 21st to 29th identification information and/or the 72nd identification information with being combined with each other to request a combination of the above described matters. Note that the matters indicated by the SMF_A 230 transmitting the identification information may not be limited to these.

Note that the SMF_A 230 may determine which identification information among the 21st to 29th identification information and the 72nd identification information is to be included in the PDU session establishment reject message, based on the received identification information, and/or the capability information of the network, and/or a policy such as the operator policy, and/or the state of the network.

For example, the 21st identification information may be information transmitted in the case that the network does not support an RQoS, and/or in a case that one or more identification information among the first to eighth identification information are received. Furthermore, for example, the 22nd identification information and/or the 27th identification information may be information transmitted in the case that the network does not support an RQoS, and/or in a case that the first to third identification information and/or the sixth to eighth identification information are received. Furthermore, the 23rd identification information and/or the 28th identification information may be information transmitted in the case that the network supports an RQoS controlled via the Control Plane, and/or in the case that the first to third identification information and/or the sixth to eighth identification information are received. Furthermore, the 24th identification information and/or the 29th identification information may be information transmitted in the case that the network supports an RQoS controlled via the User Plane, and/or in the case that the first to third identification information and/or the sixth to eighth identification information are received.

Furthermore, the 25th identification information may be information indicating the same DNN as the DNN indicated by the fourth identification information. Furthermore, the 26th identification information may be information indicating the same PDU session ID as the PDU session ID indicated by the fifth identification information. Furthermore, the 72nd identification information may be information transmitted in a case that the 71st identification information is received and/or in a case that the network slice indicated by the 71st identification information is not allowed by the network. Note that the determination performed by the SMF_A 230 as to which identification information is to be included in the PDU session establishment reject message is not limited to the determination described above.

The UE_A 10 receives the PDU session establishment reject message. The UE_A 10 performs a fourth process based on the reception of the PDU session establishment reject message (S1024). Note that the UE_A 10 may perform the fourth process based on the completion of the present procedure.

Here, the fourth process may be a process in which the UE_A 10 recognizes the matter indicated by the SMF_A 230. Furthermore, the fourth process may be a process in which the UE_A 10 stores the received identification information as a context, or may be a process in which the UE_A 10 forwards the received identification information to the higher layer and/or the lower layer. Furthermore, the fourth process may be a process in which the UE_A 10 recognizes that the request for the present procedure is rejected.

Furthermore, in a case that the UE_A 10 receives one or more identification information among the 21st to 29th identification information, the fourth process may be a process in which the UE_A 10 transitions to a state incapable of performing the RQoS validation procedure, or a process to maintain a state of not applying an RQoS.

To be more specific, in a case that the UE_A 10 receives the 22nd identification information and/or the 23rd identification information and/or the 27th identification information and/or the 28th identification information, the fourth process may be a process in which the UE_A 10 transitions to a state incapable of performing the RQoS validation procedure controlled via the Control Plane. Furthermore, in a case that the UE_A 10 receives the 22nd identification information and/or the 24th identification information and/or the 27th identification information and/or the 29th identification information, the fourth process may be a process in which the UE_A 10 transitions to a state incapable of performing the RQoS validation procedure controlled via the User Plane.

Furthermore, in a case that the UE_A 10 receives the 72nd identification information, the fourth process may be a process in which the UE_A 10 configures a first timer value to a value indicated by the 72nd identification information, or a process in which the first timer configured with the timer value is started. Furthermore, in the case that the UE_A 10 receives the 72nd identification information, the fourth process may be a process to perform one or more behaviors of the first to eleventh behaviors.

Furthermore, the fourth process may be a process in which the UE_A 10 initiates again the present procedure after a certain time period elapses, or a process in which the UE_A 10 transitions a state in which the request of the UE_A 10 is limited. Note that the fourth process may not be limited to these processes.

Furthermore, the UE_A 10 may receive the PDU session establishment reject message, or not receive the PDU session establishment accept message, and thereby, recognize that the request of the UE_A 10 is rejected. Each device completes the procedure (B) in the present procedure, based on the transmission and/or reception of the PDU session establishment reject message.

Each device completes the present procedure, based on the completion of the procedure (A) or (B) in the present procedure. Note that each device may transition to a state in which the PDU session is established, based on the completion of the procedure (A) in the present procedure, may recognize that the present procedure is rejected, based on the completion of the procedure (B) in the present procedure, or may transition to a state in which the PDU session is not established.

Furthermore, each device may perform the process based on the identification information transmitted and/or received in the present procedure, based on the completion of the present procedure. In other words, the UE_A 10 may perform the third process or perform the fourth process, based on the completion of the present procedure.

The third condition determination may be performed based on the identification information included in the PDU session establishment request message, and/or the subscriber information, and/or the operator policy. For example, the third condition determination may be true in a case that the network allows the request of the UE_A 10.

The third condition determination may be false in a case that the network does not allow the request of the UE_A 10. Furthermore, the third condition determination may be true in a case that a network to which the UE_A 10 is connected and/or the device within the network support the function the UE_A 10 requests, or may be false in a case of not supporting the function. Furthermore, the third condition determination may be true in a case that the network is determined to be in a congested state, or may be false in a case that the network is determined not to be in a congested state. Note that conditions with which true or false of the third condition determination is determined may not be limited to the previously described conditions.

The second condition determination may be performed based on whether or not a session on the N4 interface for the PDU session is established. For example, the second condition determination may be true in a case that a session on the N4 interface for the PDU session is established, and may be false in a case of not being established. Note that conditions with which true or false of the second condition determination is determined may not be limited to the previously described conditions.

The eleventh condition determination may be performed based on the identification information included in the PDU session establishment request message, and/or the subscriber information, and/or the operator policy. For example, the eleventh condition determination may be true in a case that the network allows the authentication and/or authorization by the DN_A 5 to be performed during the present procedure. The eleventh condition determination may be false in a case that the network does not allow the authentication and/or authorization by the DN_A 5 to be performed during the present procedure. Furthermore, the eleventh condition determination may be true in a case that a network to which the UE_A 10 is connected and/or the device within the network support the performing of the authentication and/or authorization by the DN_A 5 during the present procedure, or may be false in a case of not supporting. Furthermore, the eleventh condition determination may be true in a case that the 61st identification information is received, or may be false in a case of not being received. In other words, the eleventh condition determination may be true in a case that information such as SM PDU DN Request Container and/or a container containing multiple information are received, and may be false in a case of not being received. Note that conditions with which true or false of the eleventh condition determination is determined may not be limited to the previously described conditions.

1.3.3. Overview of PDU Session Establishment Authentication and/or Authorization Procedure Next, an overview of the PDU session establishment authentication and/or authorization procedure performed by the DN_A 5 to authenticate and/or authorize a PDU session will be described. Hereinafter, the PDU session establishment authentication and/or authorization procedure is also referred to as the present procedure. The present procedure is a procedure for the DN_A 5 and/or the device in the DN_A 5 to authenticate and/or authorize a PDU session. Note that each device may perform the present procedure in a state in which the PDU session is established, or in the PDU session establishment procedure. For example, the SMF_A 230 may initiate the present procedure in a case that the SMF_A 230 receives the PDU session establishment request message including at least the 61st identification information in the registration procedure and/or the PDU session establishment procedure. The SMF_A 230 may initiate the present procedure in a case that a 21st condition determination is true in the registration procedure and/or the PDU session establishment procedure.

Each device may initiate the present procedure in a state in which the PDU session establishment procedure is completed, or at any timing after the PDU session establishment procedure. Each device may transition to a state in which the PDU session is authenticated and/or authorized by the DN_A 5 and/or the device in the DN_A 5, based on the completion of the PDU session establishment authentication and/or authorization procedure.

Figure 11:
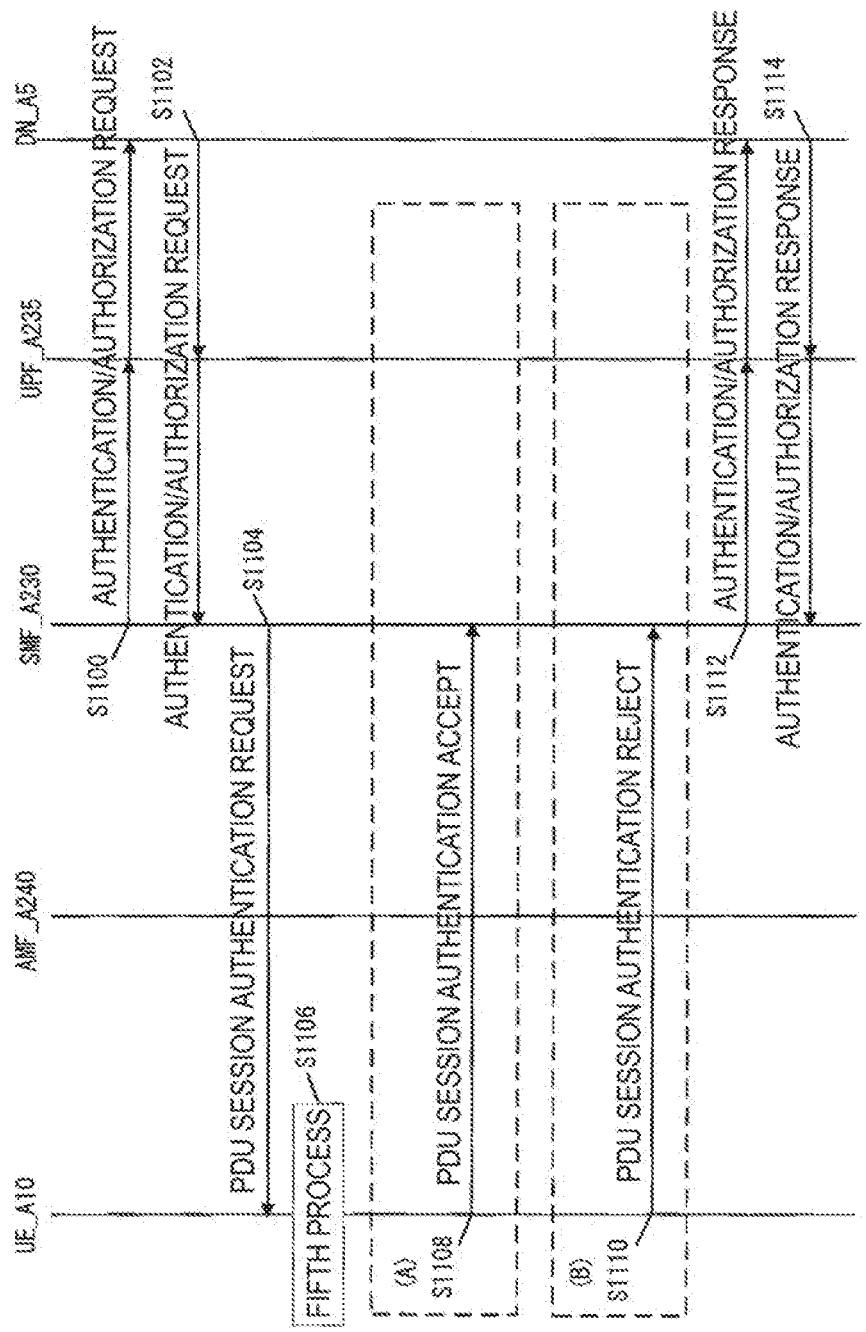
FIG. 11 is a diagram illustrating a PDU session establishment authentication and/or authorization procedure.

1.3.3.1. Example of PDU Session Establishment Authentication and/or Authorization Procedure Example An example of a process of performing the PDU session establishment authentication and/or authorization procedure will be described with reference to FIG. 11. Each step of the present procedure will be described below. First, the SMF_A 230 transmits an authentication and/or authorization request (Authentication/Authorization Request) message to the DN_A 5 and/or the device in the DN_A 5 via the UPF_A 235 (S1100) to initiate the PDU session establishment authentication and/or authorization procedure.

Specifically, the SMF_A 230 selects the UPF_A 235 and/or the DN_A 5 and/or the device in the DN_A 5, and transmits the authentication and/or authorization request message to the selected UPF_A 235 by way of the N4 interface. The UPF_A 235, in a case of receiving the authentication and/or authorization request message, transmits or forwards the authentication and/or authorization request message to the DN_A 5 and/or the device in the DN_A 5 by way of the N6 interface. Here, the SMF_A 230 may select the UPF_A 235 and/or the DN_A 5 and/or the device in the DN_A 5, based on the information received from the UE_A 10 and/or the devices in the core network, and/or the information held by the SMF_A 230. To be more specific, the SMF_A 230 may select the DN_A 5 and/or the DN_A 5, based on the identification information obtained based on the reception of the PDU session establishment request message, and/or information obtained by inquiry to the devices in the core network, and/or the subscriber information, and/or the capability information of the network, and/or the operator policy, and/or the state of the network, and/or the context the AMF_A 240 already holds.

Note that the PDU session establishment request message may be a NAS message. The PDU session establishment request message may be a message for requesting an establishment of a PDU session, but is not limited thereto.

Furthermore, the authentication and/or authorization resource release for DN_A 5, including the authentication and/or authorization request message exchange, may be an Application Programming Interface (API) provided to the service operator that an operator provides a service on the DN_A 5 and/or the DN_A 5. Note that the authentication and/or authorization request message may be a message which is transmitted and/or received between the SMF_A 230 and/or the UPF_A 235 and the DN_A 5 and/or the devices included in the DN_A 5, and requests the authentication and/or authorization by the DN_A 5, but is not limited thereto.

Here, the SMF_A 230 may transmit the information received from the UE_A 10 and/or the devices in the core network, and/or the information held by the SMF_A 230 included in the authentication and/or authorization request message, or may indicate the requests of the UE_A 10 and/or SMF_A 230, by including these identification information.

The DN_A 5 and/or the device in the DN_A 5 receive the authentication and/or authorization request message. The DN_A 5 and/or the device in the DN_A 5 may perform the 21st condition determination, based on the reception of the authentication and/or authorization request message. The 21st condition determination is for the DN_A 5 and/or the device in the DN_A 5 to determine whether to perform the PDU session authentication and/or authorization procedure by the DN_A 5. In the 21st condition determination, the DN_A 5 and/or the device in the DN_A 5 determine whether the 21st condition determination is true or false. The DN_A 5 and/or the device in the DN_A 5 may continue the present procedure in a case that the 21 condition determination is true, or may not continue the present procedure and transmit a message indicating rejection to the SMF_A 230 via the UPF_A 235 in a case that the 21 condition determination is false.

Next, the DN_A 5 and/or the device in the DN_A 5 transmit the authentication and/or authorization request (authentication/authorization Request) message to the SMF_A 230 via the UPF_A 235, based on the reception of the authentication and/or authorization request message and/or the 21st condition determination (S1102).

Specifically, the DN_A 5 and/or the device in the DN_A 5 transmit the authentication and/or authorization request message to the UPF_A 235 by way of the N6 interface. The UPF_A 235, in a case of receiving the authentication and/or authorization request message, transmits or forwards the authentication and/or authorization request message to the SMF_A 230 by way of the N4 interface.

The SMF_A 230 transmits a PDU session authentication request message to the UE_A 10 via the AMF_A 240, based on the reception of the authentication and/or authorization request message (S1104).

Specifically, the SMF_A 230 transmits the PDU session authentication request message to the AMF_A 240 by way of the N11 interface, and the AMF_A 240 receiving the PDU session authentication request message transmits the PDU session authentication request message to the UE_A 10 by way of the N1 interface.

Note that the PDU session authentication request message is not limited to that described above, but may be a message indicating that the PDU session authentication and/or authorization by the DN_A 5 is requested.

Here, the SMF_A 230 may include the 62nd identification information in the PDU session authentication request message, or may indicate the request of the DN_A 5 and/or the device in the DN_A 5, by including these identification information.

Furthermore, the SMF_A 230 may transmit the 62nd identification information included in the PDU session authentication request message to indicate that the DN_A 5 authenticates and/or authorizes the PDU sessions and/or UE_A 10 and/or the application, or may indicate that the DN_A 5 confirming and/or selecting the authentication and/or authorization information is required by the UE_A 10 and/or the application and/or the user.

Note that the SMF_A 230 may determine whether to include the 62nd identification information in the PDU session authentication request message, based on the received identification information, and/or the capability information of the network, and/or a policy such as the operator policy, and/or the state of the network.

For example, the SMF_A 230 may transmit the 62nd identification information included in the PDU session authentication request message in the case that the SMF_A 230 receives the PDU session establishment request message including the 61st identification information in the registration procedure and/or the PDU session establishment procedure. Note that the determination performed by the SMF_A 230 as to which identification information is to be included in the PDU session authentication request message is not limited to the determination described above.

The UE_A 10 receives the PDU session authentication request message. The UE_A 10 receives the PDU session authentication request message to recognize the contents of various identification information included in the PDU session authentication request message.

The UE_A 10 further performs a fifth process based on the reception of the PDU session authentication request message (S1106). Note that the UE_A 10 may perform the fifth process based on transmission of a PDU session authentication accept message, or based on transmission of a PDU session authentication reject message, or based on completion of the present procedure.

Here, the fifth process may be a process in which the UE_A 10 recognizes the matter indicated by the SMF_A 230. Furthermore, the fifth process may be a process in which the UE_A 10 stores the received identification information as a context, or may be a process in which the UE_A 10 forwards the received identification information to the higher layer and/or the lower layer.

Furthermore, the fifth process may be a process in which the UE_A 10 determine whether or not the authentication and/or authorization information indicated by the 62nd identification information is appropriate, or a process in which the UE_A 10 includes, in the 63rd identification information, information indicating whether or not the authentication and/or authorization information indicated by the received 62nd identification information is appropriate.

Furthermore, the fifth process may be a process in which the UE_A 10 recognizes that the authentication and/or authorization information indicated by the 62nd identification information is the DN authentication/permission information, a process in which the UE_A 10 includes information indicating a response to the received 62nd identification information in the 63rd identification information, or a process in which the UE_A 10 includes the authentication and/or authorization information the same as the received 62nd identification information in the 63rd identification information.

Furthermore, the fifth process may be a process in which the UE_A 10 selects appropriate authentication and/or authorization information from the authentication and/or authorization information indicated by the 62nd identification information, or a process in which the UE_A 10 includes the authentication and/or authorization information selected based on the 62nd identification information in the 63rd identification information.

Furthermore, the fifth process may be a process in which the UE_A 10 notifies the higher layer and/or the user of the 62nd identification information, or a process in which the higher layer and/or the user notified of the 62nd identification information select appropriate authentication and/or authorization information from the authentication and/or authorization information indicated by the 62nd identification information.

Furthermore, the fifth process may be a process in which the UE_A 10 acquires the authentication and/or authorization information selected based on the notified the 62nd identification information from the higher layer and/or the user, or a process in which the UE_A 10 includes the authentication and/or authorization information acquired from the higher layer and/or the user in the 63rd identification information.

Furthermore, the fifth process may be a process in which the UE_A 10 performs a 22nd condition determination. Note that the fifth process may not be limited to these processes.

The UE_A 10 performs the 22nd condition determination based on the reception of the PDU session authentication and/or authorization request message, and/or completion of the fifth process. The 22nd condition determination is for the UE_A 10 to determine whether to accept the PDU session authentication and/or authorization procedure by the DN_A 5. In the 22nd condition determination, the UE_A 10 determines whether the 22nd condition determination is true or false. In a case that the 22nd condition determination is true, the UE_A 10 initiates a procedure (A) in the present procedure, or in a case that the 22nd condition determination is false, the UE_A 10 initiates a procedure (B) in the present procedure. Note that steps in the case that the 22nd condition is false will be described later.

Hereinafter, steps in the case that 22nd condition determination is true, that is, the steps in the procedure (A) in the present procedure will be described. The UE_A 10 transmits a PDU session authentication accept message to the SMF_A 230 via the AMF_A 240, based on the reception of the PDU session authentication and/or authorization request message, and/or the completion of the fifth process, and/or the 22nd condition determination (S1108).

Specifically, the UE_A 10 transmits the PDU session authentication accept message to the AMF_A 240 by way of the N1 interface, and the AMF_A 240 receiving the PDU session authentication accept message transmits the PDU session authentication accept message to the SMF_A 230 by way of the N11 interface.

Note that the PDU session authentication accept message may be a NAS message transmitted and/or received on the N1 interface and the N11 interface. The PDU session authentication accept message may be a response message to the PDU session authentication request message, but is not limited thereto, and may be a message indicating that the PDU session establishment authentication and/or authorization procedure is accepted.

Here, the UE_A 10 may include the 63rd identification information in the PDU session authentication accept message, or may indicate that the request of the network is accepted, by including these identification information.

Furthermore, the UE_A 10 may transmit the 63rd identification information included in the PDU session authentication accept message to indicate that the UE_A 10 and/or the application and/or the user confirm, accept, or select the DN_A 5 authentication and/or authorization information.

Note that the UE_A 10 may determine whether to include the 63rd identification information in the PDU session authentication accept message, based on the received identification information, and/or, capability information of the UE_A 10, and/or a policy of the UE_A 10, and/or a state of the UE_A 10.

For example, the UE_A 10 may transmit the 63rd identification information included in the PDU session authentication accept message, in a case that the UE_A 10 receives the 62nd identification information, and/or in a case that the UE_A 10 can accept the received 62nd identification information. Note that the determination performed by the UE_A 10 as to which identification information is to be included in the PDU session authentication accept message is not limited to the determination described above.

The SMF_A 230 receives the PDU session authentication accept message. Furthermore, each device completes the procedure (A) in the present procedure, based on the transmission and/or reception of the PDU session authentication accept message.

Next, steps in the case that the 22nd condition determination is false, that is, the steps in the procedure (B) in the present procedure will be described. The UE_A 10 transmits a PDU session authentication reject message to the SMF_A 230 via the AMF_A 240, based on the reception of the PDU session authentication and/or authorization request message, and/or the completion of the fifth process, and/or the 22nd condition determination (S1110).

Specifically, the UE_A 10 transmits the PDU session authentication reject message to the AMF_A 240 by way of the N1 interface, and the AMF_A 240 receiving the PDU session authentication reject message transmits the PDU session authentication reject message to the SMF_A 230 by way of the N11 interface.

Note that the PDU session authentication reject message may be a NAS message transmitted and/or received on the N1 interface and the N11 interface. The PDU session authentication reject message may be a response message to the PDU session authentication request message, but is not limited thereto, and may be a message indicating that the PDU session establishment authentication and/or authorization procedure is rejected.

The UE_A 10 may include information indicating a cause that the PDU session authentication request message is rejected in the PDU session authentication reject message, or may indicate that the request of the network is rejected, by including these identification information.

Furthermore, the UE_A 10 may transmit the information, indicating a cause that the PDU session authentication request message is rejected, that is included in the PDU session authentication accept message to indicate that the UE_A 10 and/or the application and/or the user cannot accept, or cannot select the DN_A 5 authentication and/or authorization information.

Note that the UE_A 10 may determine which identification information in the cause that the PDU session authentication request message is rejected is to be included in the PDU session authentication reject message, based on the received identification information, and/or, the capability information of the UE_A 10, and/or the policy of the UE_A 10, and/or the state of the UE_A 10. Note that the determination performed by the UE_A 10 as to which identification information is to be included in the PDU session authentication reject message is not limited to the determination described above.

The SMF_A 230 receives the PDU session authentication reject message. Furthermore, each device completes the procedure (B) in the present procedure, based on the transmission and/or reception of the PDU session authentication reject message.

The SMF_A 230 transmits an authentication and/or authorization response (Authentication/Authorization Response) message to the DN_A 5 and/or the device in the DN_A 5 via the UPF_A 235, based on the completion the procedure (A) in the present procedure, and/or the completion of the procedure (B) in the present procedure (S1112). In other words, the SMF_A 230 transmits the authentication and/or authorization response message to the DN_A 5 and/or the device in the DN_A 5 via the UPF_A 235, based on the reception of the PDU session authentication accept message and/or the reception of the PDU session authentication reject message.

Specifically, the SMF_A 230 transmits the authentication and/or authorization response message to the UPF_A 235 by way of the N4 interface. The UPF_A 235, in a case of receiving the authentication and/or authorization response message, transmits or forwards the authentication and/or authorization response message to the DN_A 5 and/or the device in the DN_A 5 by way of the N6 interface.

Note that the authentication and/or authorization resource release for DN_A 5, including the authentication and/or authorization response message exchange, may be an Application Programming Interface (API) provided to the service operator that an operator provides a service on the DN_A 5 and/or the DN_A 5. The authentication and/or authorization response message may be a response message, to the authentication and/or authorization request message, which is transmitted and/or received between the SMF_A 230 and/or the UPF_A 235 and the DN_A 5 and/or the devices included in the DN_A 5, but is not limited thereto.

Here, the SMF_A 230 may transmit the information received from the UE_A 10 and/or the devices in the core network, and/or the information held by the SMF_A 230 included in the authentication and/or authorization response message, or may indicate the requests of the UE_A 10 and/or SMF_A 230, by including these identification information.

Here, the SMF_A 230, in a case of receiving the 63rd identification information, may include the 63rd identification information in the authentication and/or authorization response message, or may indicate that the request of the DN_A 5 and/or the device in the DN_A 5 is accepted, by including these identification information. The UE_A 10, in a case of receiving the cause that the PDU session authentication request message is rejected, may include the cause that the PDU session authentication request message is rejected in the authentication and/or authorization response message, or may indicate that the request of the DN_A 5 and/or the device in the DN_A 5 is rejected, by including these identification information.

Note that the SMF_A 230 may determine which identification information is to be included in the authentication and/or authorization response message, based on the identification information obtained based on the reception of the PDU session authentication accept message and/or the PDU session authentication reject message. Note that the determination performed by the SMF_A 230 as to which identification information is to be included in the authentication and/or authorization response message is not limited to the determination described above.

The DN_A 5 and/or the device in the DN_A 5 receive the authentication and/or authorization response message. Furthermore, each device completes the present procedure, based on the transmission and/or reception of the PDU session authentication accept message, and/or the transmission and/or reception of the PDU session authentication reject message, and/or the transmission and/or reception of the authentication and/or authorization response message. Note that each device may transition to a state in which the PDU session is authenticated and/or authorized by the DN_A 5, based on the completion of the procedure (A) in the present procedure, may recognize that the present procedure is rejected, based on the completion of the procedure (B) in the present procedure, or may transition to a state in which the PDU session is not authenticated and/or authorized by the DN_A 5.

Furthermore, each device may perform the process based on the identification information transmitted and/or received in the present procedure, based on the completion of the present procedure. In other words, the UE_A 10 may adapt the acquired and/or selected authentication and/or authorization information issued by the DN_A 5, based on the completion of the present procedure.

The 21st condition determination may be performed based on the identification information included in the authentication and/or authorization request message, and/or the subscriber information, and/or a policy of the DN_A 5. For example, the 21st condition determination may be true in a case that the DN_A 5 and/or the device in the DN_A 5 allow the request of the UE_A 10. The 21st condition determination may be false in a case that the DN_A 5 and/or the device in the DN_A 5 do not allow the request of the UE_A 10. Furthermore, the 21st condition determination may be true in a case that a DN_A 5 to which the UE_A 10 is connected and/or the device in the DN_A 5 support the function for the PDU session authentication and/or authorization by the DN_A 5, or may be false in a case of not supporting. Note that conditions with which true or false of the 21st condition determination is determined may not be limited to the previously described conditions.

Note that the 22nd condition determination may be performed based on the identification information included in the PDU session authentication request message, and/or, the capability information of the UE_A 10, and/or the policy of the UE_A 10, and/or the state of the UE_A 10. For example, the 22nd condition determination may be true in a case that the UE_A 10 allows a request for the PDU session authentication and/or authorization by the DN_A 5. The 22nd condition determination may be false in a case that the UE_A 10 does not allow a request for the PDU session authentication and/or authorization by the DN_A 5. Note that conditions with which true or false of the 22nd condition determination is determined may not be limited to the previously described conditions.

1.3.4. Overview of RQoS Validation (Activation) Procedure

Next, an overview of the RQoS validation (activation) procedure performed to validate (activate) an RQoS for user data communication will be described. In this section, the RQoS validation procedure is also referred to as the present procedure. The present procedure is a procedure for each device to validate the RQoS for the user data communication. The present procedure includes an RQoS validation procedure that is initiated by UE_A 10 and controlled in a UE-initiated manner, and an RQoS validation procedure that is initiated by the device in the core network and controlled in a network-initiated manner.

Note that each device may perform the present procedure in a state in which the PDU session is established, or during the user data communication. Each device may initiate the present procedure at any timing after the PDU session establishment procedure. Each device may validate the RQoS for the user data communication, or may perform the user data communication using the RQoS, based on the completion of the RQoS validation procedure. Note that validating the RQoS for the user data communication may be to control an RQoS for user data communication, or to validate an RQoS for a certain user data flow. Furthermore, validating the RQoS for the user data communication may be an operation in which the UE_A 10 creates a QoS rule (also referred to as a Derived QoS Rule) for the uplink traffic and/or the uplink packet, based on the received downlink packets and/or identification information included in the downlink packets, and starts the use of the created QoS rule.

Here, the present procedure may be a procedure in which each device validates an RQoS for user data communication via the User plane, and may be referred to as an RQoS validation procedure controlled via the User Plane.

1.3.4.1. Example of RQoS Validation Procedure Controlled in UE-Initiated Manner

Figure 12:
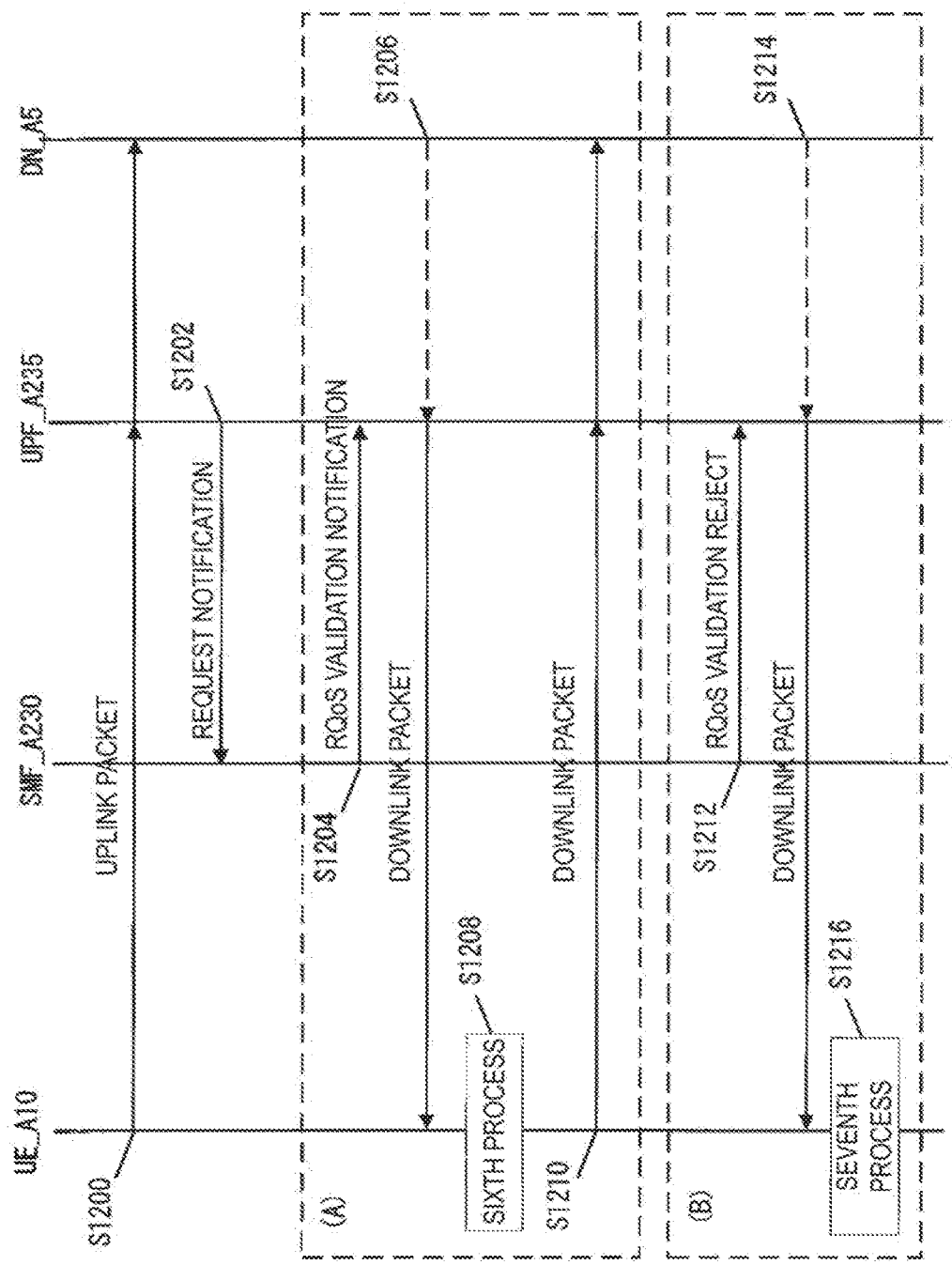
FIG. 12 is a diagram illustrating an RQoS validation procedure.

An example of a process of performing the RQoS validation procedure controlled in a UE-initiated manner will be described with reference to FIG. 12. In this section, the RQoS validation procedure controlled in a UE-initiated manner is also referred to as the present procedure. Note that the present procedure may be referred to as an RQoS validation procedure controlled via the UE-initiated User Plane. Each step of the present procedure will be described. First, the UE_A 10 transmits an uplink packet to the UPF_A 235 via the NR node_A 122 (S1200) to initiate the RQoS validation procedure controlled in a UE-initiated manner.

Specifically, the UE_A 10 transmits the uplink packet to the UPF_A 235 by way of a radio bearer, and/or the N3 interface, and/or the N9 interface. Here, the UE_A 10 may select the UPF_A 235 to be routed, based on the information held by the UE_A 10. To be more specific, the UE_A 10 may select a QoS flow used for uplink packet transmission, and/or the UPF_A 235 by comparing the uplink packet routing information with the routing rule and/or QoS rule held by the UE_A 10. Note that the UE_A 10 may select the QoS flow used for the uplink packet transmission and/or the UPF_A 235 using a default routing rule and/or a default QoS rule in a case that no routing rule and/or QoS rule match the uplink packet routing information. Note that the default QoS rule includes a QoS rule identifier (ID), a QFI of the QoS flow, one or more packet filters, and a precedence value. However, the default QoS rule may include these components excluding the packet filters, in which case the precedence value is configured to a maximum value. In other words, the priority is minimized.

Here, the uplink packet routing information may be information for identifying the application, or may be five-tuple. To be more specific, the uplink packet routing information may include a destination IP address (target IP address) and/or a source IP address and/or a protocol number and/or a destination port number (target port number) and/or a source port number, or a combination of these. Note that the uplink packet routing information is not limited to these.

Furthermore, the uplink packet may be a message transmitted from the UE_A 10 to the access network, and/or the core network and/or the DN_A 5 in the user data communication. Accordingly, the inclusion of the identification information in the uplink packet may be to include the identification information in the header of the uplink packet, to include the identification information in the header of the uplink packet message, or to include the identification information in the uplink packet message. Note that in a case that there is no uplink packet to be transmitted to the DN_A 5 and/or the device in the DN_A 5, the UE_A 10 may transmit a dummy uplink packet to the UPF_A 235.

Here, the UE_A 10 may include the 41st identification information and/or the 42nd identification information in the uplink packet, or may indicate that validating the RQoS for the user data communication is requested, by including these identification information.

Furthermore, the UE_A 10 may transmit the 41st identification information and/or the 42nd identification information included in the uplink packet to request to validate the RQoS for the user data communication in a UE-initiated manner.

Furthermore, the UE_A 10 may transmit the 41st identification information and/or the 42nd identification information included in the uplink packet to request to change the QoS flow used for uplink packet transmission and/or reception indicated by the uplink packet routing information into a QoS flow indicated by the 42nd identification information.

Note that the UE_A 10 may determine which identification information among the 41st identification information and the 42nd identification information is to be included in the uplink packet, based on the capability information of the UE_A 10, and/or a policy such as the UE policy, and/or a preference of the UE_A 10. Note that the determination performed by the UE_A 10 as to which identification information is to be included in the uplink packet is not limited to the determination described above.

The UPF_A 235 receives the uplink packet (S1200). The UPF_A 235 may forward the received uplink packet to the DN_A 5 and/or the device included in the DN_A 5, based on the reception of the uplink packet.

Next, the UPF_A 235 transmits a request notification message to the SMF_A 230, based on the reception of the uplink packet and/or the forwarding of the uplink packet (S1202). Specifically, the UPF_A 235 transmits the request notification message to the SMF_A 230 by way of the N4 interface. Furthermore, the request notification message is not limited to this as long as it is a message indicating the request for the RQoS validation for the user data communication.

Here, the UPF_A 235 may include the identification information included in the received uplink packet in the request notification message. In other words, the UPF_A 235 may transmit the received 41st identification information and/or 42nd identification information included in the request notification message, or may indicate that validating the RQoS for the user data communication is requested, by transmitting these identification information.

The SMF_A 230 receives the request notification message (S1202), and performs a 31st condition determination. The 31st condition determination is for the SMF_A 230 to determine whether to accept a request of the UE_A 10. In the 31st condition determination, the SMF_A 230 determines whether the 31st condition determination is true or false. In a case that the 31st condition determination is true (that is, in a case that the SMF_A 230 accepts the request of the UE_A 10), the SMF_A 230 initiates a procedure (A) in the present procedure, and in a case that the 31st condition determination is false (that is, in a case that the SMF_A 230 rejects the request of the UE_A 10), the SMF_A 230 initiates a procedure (B) in the present procedure. Note that steps in the case that the 31st condition is false will be described later.

Hereinafter, steps in the case that 31st condition determination is true, that is, the steps in the procedure (A) in the present procedure will be described. The SMF_A 230 transmits an RQoS validation notification message to the UPF_A 235 (S1204), based on the 31st condition determination and/or the reception of the request notification message, to initiate the procedure (A) in the present procedure. Specifically, the SMF_A 230 transmits the RQoS validation notification message to the UPF_A 235 by way of the N4 interface. Note that the RQoS validation notification message is not limited that described above, but may be a message indicating the RQoS validation for the user data communication.

Here, the SMF_A 230 may include the 31st identification information and/or the 32nd identification information in the RQoS validation notification message, or may indicate that the request of the UE_A 10 is accepted, by including these identification information.

Furthermore, the SMF_A 230 may transmit the 31st identification information and/or the 32nd identification information included in the RQoS validation notification message to indicate that the request for the RQoS validation is accepted, or that the RQoS is validated.

Furthermore, the SMF_A 230 may transmit the 31st identification information and/or the 32nd identification information included in the RQoS validation notification message to indicate that a QoS flow used for certain downlink packet transmission and/or reception is changed into a QoS flow indicated by the 32nd identification information.

Note that the SMF_A 230 may determine which identification information among the 31st identification information and the 32nd identification information is to be included in the RQoS validation notification message, based on the received identification information, and/or the capability information of the network, and/or a policy such as the operator policy, and/or the state of the network.

For example, the SMF_A 230 may transmit the 31st identification information and/or the 32nd identification information included in the RQoS validation notification message in a case that the SMF_A 230 receives the 41st identification information and/or the 42nd identification information, and/or in a case that the SMF_A 230 accepts request(s) indicated by the received 41st identification information and/or 42nd identification information.

Note that the 32nd identification information may be determined based on the 42nd identification information. In other words, the 32nd identification information may be information for identifying the QoS flow that is the same as the QoS flow indicated by the 42nd identification information, or information for identifying a QoS flow different from the QoS flow indicated by the 42nd identification information. Note that the determination performed by the SMF_A 230 as to which identification information is to be included in the RQoS validation notification message is not limited to the determination described above.

Here, the SMF_A 230 may create a context for the RQoS, based on the identification information obtained based on the reception of the request notification message, and/or the capability information of the network, and/or the subscriber information, and/or the operator policy, and/or the state of the network, and/or the context the SMF_A 230 already holds.

The UPF_A 235 receives the RQoS validation notification message (S1204). The UPF_A 235 receives the RQoS validation notification message to recognize the contents of various identification information included in the RQoS validation notification message. The UPF_A 235 may create the QoS rule and/or context for the RQoS, based on each identification information obtained in the reception of the RQoS validation notification message.

Furthermore, the UPF_A 235 may receive the downlink packets transmitted by the DN_A 5 and/or the device in the DN_A 5 (S1206). The UPF_A 235 transmits the downlink packet to the UE_A 10, based on the reception of the RQoS validation notification message and/or the reception of the downlink packet from the DN_A 5 (S1206).

Specifically, the UPF_A 235 transmits the downlink packet to the UE_A 10 by way of the N9 interface, and/or the N3 interface, and/or the radio bearer. Here, the UPF_A 235 may select the UE_A 10 to be routed, based on the information held by the UPF_A 235. To be more specific, the UPF_A 235 may select a QoS flow used for the downlink packet transmission, and/or the UE_A 10 by comparing downlink packet routing information with the routing rule and/or QoS rule held by the UPF_A 235. Note that the UE_A 10 may select the QoS flow used for the downlink packet transmission and/or the UPF_A 235 using a default routing rule and/or a default QoS rule in a case that no routing rule and/or QoS rule match the downlink packet routing information.

Here, the downlink packet routing information may be information for identifying the application, or may be five-tuple. To be more specific, the downlink packet routing information may include a destination IP address and/or a source IP address and/or a protocol number and/or a destination port number and/or a source port number, or a combination of these. Note that the downlink packet routing information is not limited to these.

Furthermore, the downlink packet may be a message transmitted from the DN_A 5 and/or the device in DN_A 5 to the UE_A 10 in the user data communication, a message transmitted from the device in the core network to the UE_A 10, or a message forwarding these massages in the user data communication. Accordingly, the inclusion of the identification information in the downlink packet may be to include the identification information in the header of the downlink packet, to include the identification information in the header of the downlink packet not including a message to be forwarded, to include the identification information in the header of the message used to forward the downlink packet, or to include the identification information in a message used to forward the downlink packet. Note that in a case that there is no downlink packet received from the DN_A 5 and/or the device in the DN_A 5, the UPF_A 235 may transmit a dummy downlink packet to the UE_A 10.

Here, the UPF_A 235 may include the 31st identification information and/or the 32nd identification information in the downlink packet, or may indicate that the RQoS for the user data communication is to be validated or that the request of the UE_A 10 is accepted, by including these identification information.

Furthermore, the UPF_A 235 may transmit the 31st identification information and/or the 32nd identification information included in the downlink packet to indicate that the request for the RQoS validation is accepted, or that the RQoS is to be validated.

Furthermore, the UPF_A 235 may transmit the 31st identification information and/or the 32nd identification information included in the downlink packet to indicate that a QoS flow used for certain downlink packet transmission and/or reception is changed into a QoS flow indicated by the 32nd identification information.

Note that the UPF_A 235 may determine which identification information among the 31st identification information and the 32nd identification information is to be included in the downlink packet, based on the received identification information, and/or the capability information of the network, and/or a policy such as the operator policy, and/or the state of the network.

For example, the UPF_A 235 may transmit the 31st identification information and/or the 32nd identification information included in the downlink packet in a case that the UPF_A 235 receives the 31st identification information and/or the 32nd identification information, and/or in a case that the UPF_A 235 receives the 41st identification information and/or the 42nd identification information, and/or in a case that the SMF_A 230 determines that the request(s) indicated by the received 41st identification information and/or 42nd identification information can be accepted.

Note that the 32nd identification information may be determined based on the 42nd identification information. In other words, the 32nd identification information may be information for identifying the QoS flow that is the same as the QoS flow indicated by the 42nd identification information, or information for identifying a QoS flow different from the QoS flow indicated by the 42nd identification information. Note that the determination performed by the UPF_A 235 as to which identification information is to be included in the downlink packet is not limited to the determination described above.

The UE_A 10 receives the downlink packet (S1206). The UE_A 10 receives the downlink packet to recognize the contents of various identification information included in the downlink packet.

The UE_A 10 further performs a sixth process based on the reception of the downlink packet (S1208).

Here, the sixth process may be a process in which the UE_A 10 recognizes the matter indicated by the UPF_A 235. Furthermore, the sixth process may be a process in which the UE_A 10 stores the received identification information as a context, or may be a process in which the received identification information and/or user data are forwarded to the higher layer and/or the lower layer.

Furthermore, the sixth process may be a process in which the UE_A 10 validates the RQoS for the user data communication. In other words, the sixth process may be a process in which the UE_A 10 creates a QoS rule (Derived QoS Rule) and/or routing rule for the uplink packet, based on the received downlink packet, or a process in which UE_A 10 validates the created QoS rule and/or routing rule.

To be more specific, in the sixth process, the UE_A 10 may create a QoS rule and/or routing rule associated with the uplink packet routing information paired with the received downlink packet routing information, or may validate the created QoS rule and/or routing rule. Note that the QoS flow used to forward the uplink packet indicated by the created QoS rule and/or routing rule may be the QoS flow indicated by the 32nd identification information.

Furthermore, the sixth process may be a process in which the UE_A 10 may recognize the QoS flow and/or the QoS rule and/or the routing rule associated with the received downlink packet routing information. To be more specific, in the sixth process, the UE_A 10 may recognize that the QoS flow used to forward the downlink packet indicated by the received downlink packet routing information is the QoS flow indicated by the 32nd identification information.

Furthermore, the sixth process may be a process in which the UE_A 10 starts an RQoS timer (also referred to as a Reflective QoS Timer: RQ timer). To be more specific, the sixth process may be a process in which the UE_A 10 starts the RQoS timer configured with a timer value received from the network and/or a timer value held by the UE_A 10.

Note that the start of the RQoS timer may be performed based on the creation and/or validation of the QoS rule and/or the routing rule. In a case that the QoS rule and/or routing rule associated with the uplink packet routing information paired with the received downlink packet routing information already exist, the UE_A 10 may restart the running RQoS timer.

Note that the timer value received from the network may be a timer value received from the device in the core network in the registration procedure and/or the PDU session establishment procedure, and may be, for example, a timer value indicated by the sixteenth identification information received in the registration procedure and/or the PDU session establishment procedure. Note that the timer value received by the UE_A 10 from the network may be a timer value received from the network before the sixth process, but is not limited thereto.

The timer value held by the UE_A 10 may be a timer value configured in advance in the UE_A 10 before shipping. Note that the timer value held by the UE_A 10 may be a timer value configured in the UE_A 10, but is not limited to.

In a case that the UE_A 10 has previously transmitted the uplink packet including the 41st identification information and/or the 42nd identification information, the sixth process may be a process in which the UE_A 10 recognizes that the RQoS validation procedure controlled in a UE-initiated manner is accepted by the network. Note that the sixth process may not be limited to these processes.

Next, the UE_A 10 may transmit the uplink packet to the UPF_A 235, based on the reception of the downlink packet and/or the completion of the sixth process (S1210). Furthermore, the UPF_A 235, in a case of receiving the uplink packet, may forward the received uplink packet to the DN_A 5 and/or the device in the DN_A 5 (S1210). In this case, the DN_A 5 and/or the device in the DN_A 5 receive the uplink packet.

Note that the UE_A 10 may use the QoS rule and/or routing created in the sixth process for the uplink packet transmission. Furthermore, the uplink packet may be the same message as the previously transmitted uplink packet (S1200) or may be a different message.

Each device completes the procedure (A) in the present procedure, based on the transmission and/or reception of the downlink packet (S1206), and/or the completion of the sixth process (S1208), and/or the transmission and/or reception of the uplink packet (S1210).

Next, steps in the case that the 31st condition determination is false, that is, the steps in the procedure (B) in the present procedure will be described. The SMF_A 230 transmits an RQoS validation reject message to the UPF_A 235 (S1212), based on the 31st condition determination and/or the reception of the request notification message, to initiate the procedure (B) in the present procedure. Specifically, the SMF_A 230 transmits the RQoS validation reject message to the UPF_A 235 by way of the N4 interface. Note that the RQoS validation reject message is not limited that described above, but may be a message indicating that the request for the RQoS validation for the user data communication is rejected.

Here, the SMF_A 230 may include the 51st identification information in the RQoS validation reject message, or may indicate that the request of the UE_A 10 is rejected, by including these identification information.

Furthermore, the SMF_A 230 may transmit the 51st identification information included in the RQoS validation notification message to indicate that the request for the RQoS validation is rejected, indicate a cause that the request for the RQoS validation is rejected, or indicate that the RQoS cannot be validated.

Note that the SMF_A 230 may determine whether the 51st identification information is to be included in the RQoS validation reject message, based on the received identification information, and/or the capability information of the network, and/or a policy such as the operator policy, and/or the state of the network.

For example, the SMF_A 230 may transmit the 51st identification information included in the RQoS validation notification message in a case that the SMF_A 230 receives the 41st identification information and/or the 42nd identification information, and/or in a case that the SMF_A 230 cannot accept the requests indicated by the received 41st identification information and/or 42nd identification information. Note that the determination performed by the SMF_A 230 as to which identification information is to be included in the RQoS validation reject message is not limited to the determination described above.

The UPF_A 235 receives the RQoS validation reject message (S1212). The UPF_A 235 receives the RQoS validation reject message to recognize the contents of various identification information included in the RQoS validation reject message.

Furthermore, the UPF_A 235 may receive the downlink packets transmitted by the DN_A 5 and/or the device in the DN_A 5 (S1214). The UPF_A 235 transmits the downlink packet to the UE_A 10, based on the reception of the RQoS validation reject message and/or the reception of the downlink packet from the DN_A 5 (S1214).

Specifically, the UPF_A 235 transmits the downlink packet to the UE_A 10 by way of the N9 interface, and/or the N3 interface, and/or the radio bearer. Here, the UPF_A 235 may select the UE_A 10 to be routed, based on the information held by the UPF_A 235. To be more specific, the UPF_A 235 may select a QoS flow used for the downlink packet transmission, and/or the UE_A 10 by comparing downlink packet routing information with the routing rule and/or QoS rule held by the UPF_A 235. Note that the UE_A 10 may select the QoS flow used for the downlink packet transmission and/or the UPF_A 235 using a default routing rule and/or a default QoS rule in a case that no routing rule and/or QoS rule match the downlink packet routing information.

Here, the downlink packet routing information may be information for identifying the application, or may be five-tuple. To be more specific, the downlink packet routing information may include a destination IP address and/or a source IP address and/or a protocol number and/or a destination port number and/or a source port number, or a combination of these. Note that the downlink packet routing information is not limited to these.

Furthermore, the downlink packet may be a message transmitted from the DN_A 5 and/or the device in DN_A 5 to the UE_A 10 in the user data communication, a message transmitted from the device in the core network to the UE_A 10, or a message forwarding these massages in the user data communication. Accordingly, the inclusion of the identification information in the downlink packet may be to include the identification information in the header of the downlink packet, to include the identification information in the header of the downlink packet not including a message to be forwarded, to include the identification information in the header of the message used to forward the downlink packet, or to include the identification information in a message used to forward the downlink packet. Note that in a case that there is no downlink packet received from the DN_A 5 and/or the device in the DN_A 5, the UPF_A 235 may transmit a dummy downlink packet to the UE_A 10.

Here, the UPF_A 235 may include the 51st identification information in the downlink packet, or may indicate that the RQoS for the user data communication is not validated or that the request of the UE_A 10 is not accepted, by including these identification information.

Furthermore, the UPF_A 235 may transmit the 51st identification information included in the RQoS validation notification message to indicate that the request for the RQoS validation is rejected, indicate a cause that the request for the RQoS validation is rejected, or indicate that the RQoS cannot be validated.

Note that the UPF_A 235 may determine whether the 51st identification information is to be included in the downlink packet, based on the received identification information, and/or the capability information of the network, and/or a policy such as the operator policy, and/or the state of the network.

For example, the UPF_A 235 may transmit the 51st identification information included in the RQoS validation notification message in a case that the UPF_A 235 receives the 51st identification information, and/or in a case that the UPF_A 235 receives the 41st identification information and/or the 42nd identification information, and/or in a case that the SMF_A 230 determines that the request(s) indicated by the received 41st identification information and/or 42nd identification information cannot be accepted. Note that the determination performed by the UPF_A 235 as to which identification information is to be included in the downlink packet is not limited to the determination described above.

The UE_A 10 receives the downlink packet (S1214). The UE_A 10 receives the downlink packet to recognize the contents of various identification information included in the downlink packet.

The UE_A 10 further performs a seventh process based on the reception of the downlink packet (S1216).

Here, in a case that the UE_A 10 previously transmitted the uplink packet including the 41st identification information and/or the 42nd identification information, the seventh process may be a process in which the UE_A 10 recognizes that the RQoS validation procedure controlled in a UE-initiated manner is rejected by the network, or a process in which the UE_A 10 recognizes a cause of rejection.

In other words, the seventh process may be a process in which the UE_A 10 recognizes that the RQoS validation procedure controlled in a UE-initiated manner is not allowed based on the received 51st identification information, or a process in which the UE_A 10 recognizes a cause of non-allowance.

Furthermore, the seventh process may be a process in which the UE_A 10 starts a backoff timer for prohibiting the RQoS validation procedures controlled in a UE-initiated manner from starting for a certain time period. Note that a value of the backoff timer for prohibiting the RQoS validation procedure controlled in a UE-initiated manner from starting for a certain time period may be a value configured in advance in the UE_A 10, or may be a timer value received from the network.

Furthermore, the seventh process may be a process in which the UE_A 10 initiates again the present procedure after a certain time period elapses, a process in which the UE_A 10 initiates a procedure for changing and/or releasing the established PDU session, or a process in which the UE_A 10 transitions to a state in which the request of the UE_A 10 is limited. Note that the seventh process may not be limited to these processes.

Each device completes the procedure (B) in the present procedure, based on the transmission and/or reception of the downlink packet (S1214), and/or the completion of the seventh process (S1216).

Each device completes the present procedure, based on the completion of the procedure (A) or (B) in the present procedure. Note that each device may transition to a state in which the RQoS for the user data communication is validated, based on the completion of the procedure (A) in the present procedure, or may recognize that the present procedure is rejected, may transition to a state in which the RQoS for the user data communication is not validated, or may maintain a state of not applying the RQoS for the user data communication, based on the completion of the procedure (B) in the present procedure.

Furthermore, each device may perform the process based on the identification information transmitted and/or received in the present procedure, based on the completion of the present procedure. In other words, the UE_A 10 may perform the sixth process or perform the seventh process, based on the completion of the present procedure.

Furthermore, each device may perform the user data communication using the QoS rule and/or routing rule validated in the present procedure after the completion of the present procedure. Furthermore, each device may initiate the RQoS deactivation procedure after the completion of the present procedure.

The 31st condition determination may be performed based on the uplink packet, and/or the identification information included in the request notification message, and/or the subscriber information, and/or the operator policy. For example, the 31st condition determination may be true in a case that the network allows the request of the UE_A 10. The 31st condition determination may be false in a case that the network does not allow the request of the UE_A 10. Furthermore, the 31st condition determination may be true in a case that a network with which the UE_A 10 is registered and/or the device within the network support the function the UE_A 10 requests, or may be false in a case of not supporting the function. Note that conditions with which true or false of the 31st condition determination is determined may not be limited to the previously described conditions.

1.3.4.2. Example of RQoS Validation Procedure Controlled in Network-Initiated Manner An example of a process of performing the RQoS validation procedure controlled in a network-initiated manner will be described with reference to FIG. 12. In this section, the RQoS validation procedure controlled in a network-initiated manner is also referred to as the present procedure. Note that the present procedure may be referred to as an RQoS validation procedure controlled via the network-initiated User Plane. Furthermore, the RQoS validation procedure controlled in a network-initiated manner is similar to the procedure (A) in the RQoS validation procedure controlled in a UE-initiated manner, and therefore, a portion having differences only will be described here.

The UE_A 10 performs the sixth process described above (S1208), based on the reception of the downlink packet (S1206). In the sixth process, the UE_A 10 can further reject the application of the RQoS. In this case, the UE_A 10 transmits the uplink packet including information indicating that the application of the RQoS is rejected to the UPF_A 235 (S1210).

1.3.5. Overview of RQoS Deactivation Procedure

Next, a procedure for deactivating (also referred to as invalidating) an activated (also referred to as validated) Reflective QoS (RQoS) will be described. The procedure for deactivating an RQoS includes a first deactivation procedure initiated in a UE-initiated manner, and a second deactivation procedure initiated in a network-initiated manner. These procedures are initiated while an RQoS controlled via the User Plane (UP) is valid. In other words, these procedures are initiated while an RQoS timer value does not lapse.

Note that these procedures can be used to invalidate the RQoS controlled via the UP validated in a network-initiated manner, and can be also used to invalidate the RQoS controlled via the UP validated in a UE-initiated manner.

1.3.5.1. Overview of First RQoS Deactivation Procedure

First, a case of the first deactivation procedure is described. The UE_A 10 transmits a QoS Flow ID (QFI) for identifying the QoS flow to be deactivated and a Reflective QoS Indication (RQI) indicating a deactivation request included in the header of the uplink packet to be transmitted, to the device in the core network. In a case that the RQI is constituted by 1 bit, the RQI is preferably configured to 0, but may be configured to 1. In a case that the RQI is constituted by multiple bits, the RQI is preferably configured to be all 0, but may be configured to be all 1, for example. The UE_A 10 may transmit information indicating the deactivation request, instead of the RQI, that is included in the header of the uplink packet to be transmitted. Note that, in a case that the multiple QoS flows are requested to be deactivated, multiple sets of QFI and RQI or sets of QFI and information indicating the deactivation request included in the header of the uplink packet may be transmitted. In a case that all QoS flows are requested to be deactivated, the QFI may not be included. Note that an operation in which the UE_A 10 includes the information such as the QFI and the RQI in the header of the uplink packet may be an operation in which the UE_A 10 includes the information such as the QFI and the RQI in the uplink packet.

The device in the core network receives from the UE_A 10 the header of the uplink packet including one or more sets of QFI and RQI or one or more sets of QFI and information indicating the deactivation request. Here, in a case that the device in the core network is requested from UE_A 10 to deactivate multiple QoS flows, the device in the core network may accept the deactivation request to deactivate all of the QoS flows, reject the deactivation request to deactivate all of the QoS flows, or accept the deactivation request to deactivate some of the QoS flows and reject the deactivation request to deactivate the rest of the QoS flows. In a case that the device in the core network accepts the deactivation request to deactivate a certain QoS flow, the device in the core network transmits, to the UE_A 10, the QFI corresponding to the QoS flow and information indicating that the deactivation request is accepted, both of which are included in the header of the downlink packet. In a case that the device in the core network rejects the deactivation request to deactivate a certain QoS flow, the device in the core network transmits, to the UE_A 10, the QFI corresponding to the QoS flow and information indicating that the deactivation request is rejected, both of which are included in the header of the downlink packet. Note that these information included in the header of one downlink packet may be transmitted, or these information included in the headers of different downlink packets may be transmitted. In a case that the device in the core network accepts or rejects the deactivation requests to deactivate all QoS flows, the device in the core network may not include the QFI in the header. Note that an operation in which the device in the core network includes the information such as the QFI and the RQI in the header of the downlink packet may be an operation in which the device in the core network includes the information such as the QFI and the RQI in the downlink packet.

The UE_A 10, in a case of receiving the header of the downlink packet including the QFI and the information indicating that the deactivation request is accepted, the UE_A 10 deletes the configuration related to the RQoS corresponding to the QoS flow identified by the QFI, even in a case that the RQoS timer value does not lapse. In other words, the UE_A 10, in a case of receiving the header of the downlink packet including the QFI and the information indicating that the deactivation request is accepted, the UE_A 10 deletes the configuration related to the RQoS corresponding to the QoS flow identified by the QFI, even in a case that the running RQoS timer does not expire. At this time, the UE_A 10 applies a default QoS to that QoS flow. In contrast, in a case that the UE_A 10 receives the header of the downlink packet including the QFI and the information indicating that the deactivation request is rejected, the UE_A 10 maintain the configuration for the RQoS corresponding to the QoS flow identified by the QFI.

Note that, in the description of the first deactivation procedure, all of the various information are included in the header and transmitted, but the present embodiment is not limited thereto. For example, in a case that there is uplink data to be transmitted, the UE_A 10 may transmit at least a portion, of the various information, that is included in the uplink data, while the various information have been included in the header of the uplink packet and transmitted. At this time, the network side can recognize the meaning of various information included in the uplink data. In a case that there is downlink data to be transmitted, the network may transmit at least a portion, of the various information, that is included in the downlink data, while the various information have been included in the header of the downlink packet and transmitted. At this time, the UE_A 10 side can recognize the meaning of various information included in the downlink data.

1.3.5.2. Overview of Second RQoS Deactivation Procedure

Next, a case of the second deactivation procedure is described. The device in the core network may deactivate all of one or more QoS flows, deactivate some of the QoS flows, or deactivate and deactivate some of the QoS flows. In a case that the device in the core network deactivates a certain QoS flow, the device in the core network includes the QFI corresponding to the QoS flow and information indicating that the QoS flow is deactivated in the header of the downlink packet, and transmits them to the UE_A 10. In the case of deactivating a certain QoS flow, these information may be included in the header of one downlink packet and be transmitted, or be included in the headers of different downlink packets and be transmitted. In a case that the device in the core network deactivates all QoS flows, the device in the core network may not include the QFI in the header. Note that in a case that the device in the core network does not deactivate a certain QoS flow, the device in the core network transmits nothing.

The UE_A 10, in a case of receiving the header of the downlink packet including the QFI and the information indicating that the QoS flow is deactivated, the UE_A 10 deletes the configuration related to the RQoS corresponding to the QoS flow identified by the QFI, even in a case that the RQoS timer value does not lapse. In other words, the UE_A 10, in a case of receiving the header of the downlink packet including the QFI and the information indicating that the QoS flow is deactivated, the UE_A 10 deletes the configuration related to the RQoS corresponding to the QoS flow identified by the QFI, even in a case that the running RQoS timer does not expire. At this time, the UE_A 10 applies a default QoS to that QoS flow. In contrast, in a case that the UE_A 10 does not receive the header of the downlink packet including the QFI and the information indicating that the QoS flow is deactivated, the UE_A 10 maintain the configuration for the RQoS corresponding to the QoS flow identified by the QFI.

Note that, in the description of the second deactivation procedure, all of the various information are included in the header and transmitted, but the present embodiment is not limited thereto. For example, in a case that there is downlink data to be transmitted, the network may transmit at least a portion, of the various information, that is included in the downlink data, while the various information have been included in the header of the downlink packet and transmitted. At this time, the UE_A 10 side can recognize the meaning of various information included in the downlink data.

2. Modification Example

A program running on a device or apparatus according to the present invention may serve as a program that controls a Central Processing Unit (CPU) and the like to cause a computer to operate in such a manner as to realize the functions of the embodiment according to the present invention. Programs or information handled by the programs are temporarily stored in a volatile memory such as a Random Access Memory (RAM), a non-volatile memory such as a flash memory, a Hard Disk Drive (HDD), or another storage device system.

Note that a program for realizing such functions of the embodiment according to the present invention may be recorded on a computer-readable recording medium. This configuration may be realized by causing a computer system to read the program recorded on the recording medium for execution. It is assumed that the "computer system" refers to a computer system built into the apparatuses, and the computer system includes an operating system and hardware components such as a peripheral device. Furthermore, the "computer-readable recording medium" may be any of a semiconductor recording medium, an optical recording medium, a magnetic recording medium, a medium dynamically retaining the program for a short time, or any other computer readable recording medium.

Furthermore, each functional block or various characteristics of the apparatuses used in the above-described embodiment may be implemented or performed on an electric circuit, for example, an integrated circuit or multiple integrated circuits. An electric circuit designed to perform the functions described in the present specification may include a general-purpose processor, a Digital Signal Processor (DSP), an Application Specific Integrated Circuit (ASIC), a Field Programmable Gate Array (FPGA), or other programmable logic devices, discrete gates or transistor logic, discrete hardware components, or a combination thereof. The general-purpose processor may be a microprocessor, or may be a processor of a known type, a controller, a micro-controller, or a state machine instead. The above-mentioned electric circuit may include a digital circuit, or may include an analog circuit. Furthermore, in a case that with advances in semiconductor technology, a circuit integration technology with which the current integrated circuit is replaced appears, one or more aspects according to the present invention can also use a new integrated circuit based on the relevant technology.

The present invention is not intended to be limited to the embodiment described above. In the embodiment, apparatuses have been described as an example, but the invention of the present application is not limited to these apparatuses, and is applicable to a terminal apparatus or a communication apparatus of a fixed-type or a stationary-type electronic apparatus installed indoors or outdoors, for example, an AV apparatus, a kitchen apparatus, a cleaning or washing machine, an air-conditioning apparatus, office equipment, a vending machine, and other household apparatuses.

The embodiments of the present invention have been described in detail above referring to the drawings, but the specific configuration is not limited to the embodiments and includes, for example, an amendment to a design that falls within the scope that does not depart from the gist of the present invention. Various modifications are possible within the scope of the present invention defined by claims, and embodiments that are made by suitably combining technical means disclosed according to the different embodiments are also included in the technical scope of the present invention.

Furthermore, a configuration in which constituent elements, described in the respective embodiments and having mutually the same effects, are substituted for one another is also included in the technical scope of the present invention.

REFERENCE SIGNS LIST

1 Mobile communication system
5 DN_A
10 UE_A
45 eNB_A
80 E-UTRAN_A
105 DN_B
120 5G-RAN_A
122 NR node_A
125 WLAN ANc
126 WAG_A
190 Core network_B
230 SMF_A
232 SMF_B
235 UPF_A
237 UPF_B
240 AMF_A

The invention claimed is:

1. A User Equipment (UE), comprising:
transmitting and receiving circuitry configured to:
   transmit, to a Session Management Function (SMF), a Protocol Data Unit (PDU) session establishment request message indicating a request for establishment of a PDU session; and
   in response to transmitting the PDU session establishment request message to the SMF, receive, from the SMF, identification information indicating that the request is rejected, the identification information further indicating a timer value; and
a controller configured to, in a case that the timer value indicates neither zero nor deactivated, start a timer with the timer value based on Single-Network Slice Selection Assistance Information (S-NSSAI),
wherein:
the timer is configured on a per-slice basis;
while the UE is in a state in which the PDU session is not established, a transmission of another PDU session establishment request message is prohibited until the timer expires; and
the S-NSSAI is associated with a Public Land Mobile Network (PLMN) that is registered by the UE.

2. A communication method performed by a User Equipment (UE), the communication method comprising:
transmitting, to a Session Management Function (SMF), a Protocol Data Unit (PDU) session establishment request message indicating a request for establishment of a PDU session;
in response to transmitting the PDU session establishment request message to the SMF, receiving, from the SMF, identification information indicating that the request is rejected, the identification information further indicating a timer value; and
in a case that the timer value indicates neither zero nor deactivated, starting a timer with the timer value based on Single-Network Slice Selection Assistance Information (S-NSSAI),
wherein:
the timer is configured on a per-slice basis;
while the UE is in a state in which the PDU session is not established, a transmission of another PDU session establishment request message is prohibited until the timer expires; and
the S-NSSAI is associated with a Public Land Mobile Network (PLMN) that is registered by the UE.

* * * * *